US008681291B2

(12) United States Patent
Takama et al.

(10) Patent No.: US 8,681,291 B2
(45) Date of Patent: Mar. 25, 2014

(54) DISPLAY APPARATUS

(75) Inventors: Daisuke Takama, Kanagawa (JP);
Amane Higashi, Kanagawa (JP);
Yasuyuki Teranishi, Kanagawa (JP);
Shiichiro Sarai, Kanagawa (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 458 days.

(21) Appl. No.: 12/994,662

(22) PCT Filed: May 25, 2009

(86) PCT No.: PCT/JP2009/059514
§ 371 (c)(1),
(2), (4) Date: Nov. 24, 2010

(87) PCT Pub. No.: WO2009/145136
PCT Pub. Date: Dec. 3, 2009

(65) Prior Publication Data
US 2011/0069254 A1 Mar. 24, 2011

(30) Foreign Application Priority Data

May 29, 2008 (JP) ................. P2008-141363
Apr. 20, 2009 (JP) ................. P2009-102160

(51) Int. Cl.
*G02F 1/1335* (2006.01)
*G02F 1/1347* (2006.01)
*G02F 1/13* (2006.01)

(52) U.S. Cl.
USPC ............... 349/62; 349/74; 349/199; 349/200

(58) Field of Classification Search
USPC ...................... 349/62, 74, 199, 200
See application file for complete search history.

(56) References Cited

U.S. PATENT DOCUMENTS

| 5,585,817 | A | * | 12/1996 | Itoh et al. ............... 345/104 |
| 6,317,190 | B1 | * | 11/2001 | Winarski et al. .......... 349/200 |
| 6,768,536 | B2 | | 7/2004 | Okuwaki et al. |
| 8,125,580 | B2 | * | 2/2012 | Takama et al. ............ 349/12 |
| 2003/0048394 | A1 | * | 3/2003 | Okuwaki et al. .......... 349/5 |
| 2003/0098938 | A1 | * | 5/2003 | Okuwaki et al. .......... 349/95 |

FOREIGN PATENT DOCUMENTS

| JP | 2002-268141 | 9/2002 |
| JP | 2003-161810 | 6/2003 |
| JP | 2005-010228 | 1/2005 |
| JP | 2008-064828 | 3/2008 |

OTHER PUBLICATIONS

Birendra Bahadur, Liquid Crystals Applications and Uses 1990, World Scientific, vol. 1, pp. 171-194.*

* cited by examiner

*Primary Examiner* — Edward Glick
*Assistant Examiner* — David Chung
(74) *Attorney, Agent, or Firm* — K&L Gates LLP

(57) ABSTRACT

A display apparatus that includes a light amount adjustment section includes a lens provided corresponding to a light receiving region of a photo-sensor element. The light amount adjustment section varies the focus position of the lens with respect to the light receiving region of the photo-sensor element to adjust the amount of light to be introduced to the light receiving region.

20 Claims, 45 Drawing Sheets

FIG.10
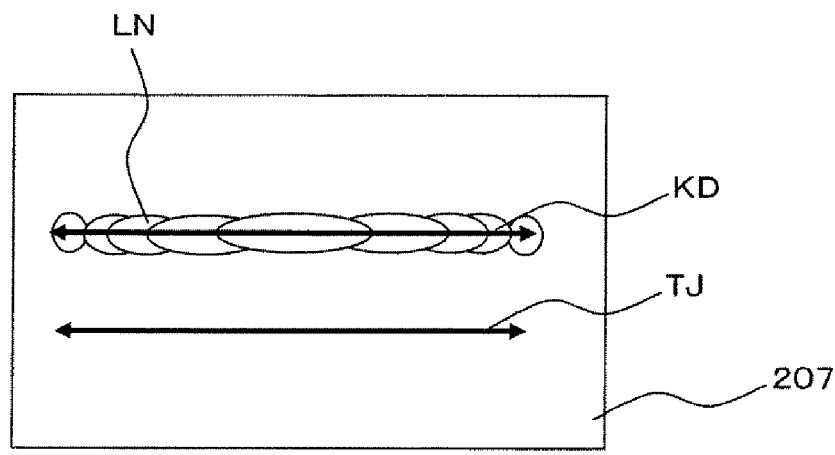
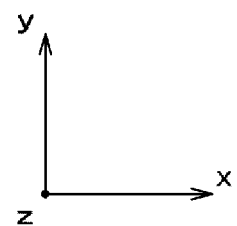

FIG.16
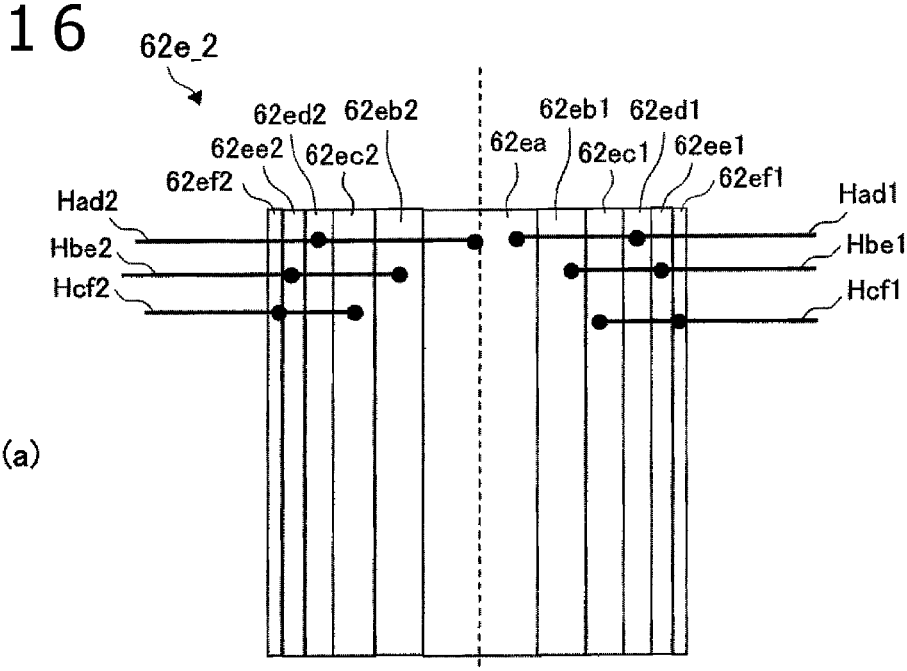
(a)
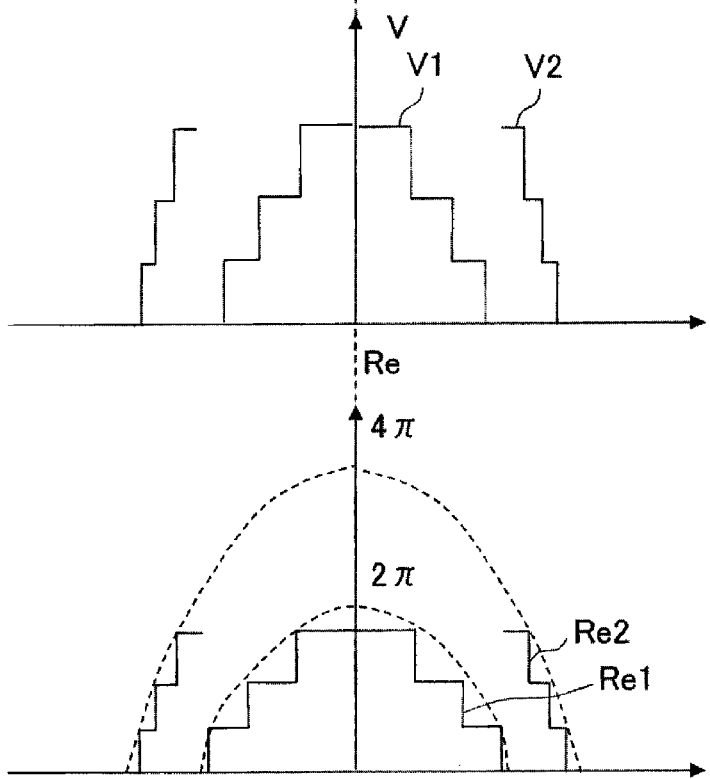
(b)
(c)

DISPLAY APPARATUS

CROSS REFERENCE TO RELATED APPLICATIONS

The present application is a National Stage of International Application No. PCT/JP2009/059514 filed on May, 25, 2009 and which claims priority to Japanese Patent Application Nos. JP 2008-141363 filed on May 29, 2008 and JP 2009-102160 filed on Apr. 20, 2009, the entire contents of which are being incorporated herein by reference.

BACKGROUND

The present disclosure relates to a display apparatus. Specifically, the present disclosure relates to a display apparatus which includes a display panel having a plurality of pixels disposed in a pixel region thereof such that an image is displayed in the image display region and the display panel includes photo-sensor elements which receive light to generate reception light data.

Display apparatus such as a liquid crystal display apparatus and an organic EL display apparatus have such advantages that they are small in thickness, light in weight and low in power consumption.

Among such display apparatus, the liquid crystal display apparatus has a liquid crystal panel as a display panel wherein a liquid crystal layer is filled between a pair of substrates. The liquid crystal panel is, for example, of the transmission type, and illumination light emitted from an illumination apparatus such as a backlight provided on the rear face of the liquid crystal panel is modulated by and transmitted through the liquid crystal panel. Then, display of an image is carried out on the front face of the liquid crystal panel with the modulated illumination light.

This liquid crystal panel is, for example, of the active matrix type and has a TFT array substrate on which a plurality of thin film transistors (TFT: Thin Film Transistor) which function as pixel switching elements. And, an opposing substrate is opposed to the TFT array substrate, and a liquid crystal layer is provided between the TFT array substrate and the opposing substrate. In the liquid crystal panel of the active matrix type, a pixel switching element inputs a potential to a pixel electrode to vary the voltage to be applied to the liquid crystal layer to control the transmission factor of light to be transmitted through the pixel to modulate the light.

In regard to such a liquid crystal panel as described above, a liquid crystal panel has been proposed wherein photo-sensor elements for receiving light to obtain reception light data are built in the pixel region in addition to the TFTs which function as the pixel switching elements described above (refer to, for example, Patent Document 1 and Patent Document 2).

The liquid crystal panel described above can implement a function as a user interface by utilizing the built-in photo-sensor elements as position sensor elements (refer to, for example, Patent Document 1 and Patent Document 2). Therefore, a liquid crystal panel of the type described is called I/O touch panel (Integrated-Optical touch panel). In this liquid crystal panel, the necessity for installing a touch panel of the resistive film type or the capacitive type separately on the front face of the liquid crystal panel is eliminated. Accordingly, reduction in size and thickness of the apparatus can be implemented readily. Further, where a touch panel of the resistive film type or the capacitive type is installed, in some cases, light transmitted through the pixel region is decreased or interference of light is caused by the touch panel. Therefore, deterioration of the quality of the display image can be prevented.

In such a liquid crystal panel, for example, light reflected by a detection object body such as a finger of a user or a touch pen brought into touch with the front face side of the liquid crystal panel is received by a photo-sensor element built in as a position sensor element. Thereafter, the position at which the detection object body touches is specified based on reception light data obtained by the photo-sensor element, and an operation corresponding to the specified position is carried out by the liquid crystal display apparatus per se or some other electronic apparatus connected to the liquid crystal display apparatus.

Prior Art Document

Patent Document
Patent Document 1: Japanese Patent Laid-Open No. 2006-127212
Patent Document 2: Japanese Patent Laid-Open No. 2007-128497

SUMMARY

When a photo-sensor element receives light under an environment in which the intensity of light is high, the reception light data value sometimes exceeds a dynamic range to cause saturation of a sensor output. Therefore, it is sometimes difficult to precisely detect the position of a detection object body.

Particularly under an outdoor environment, the external light intensity sometimes becomes 10,000 to 100,000 luxes or more, and since the intensity of light is high in comparison with that under an environment of artificial indoor illumination, occurrence of the failure sometimes becomes tangible.

Further, since the amount of light received by a photo-sensor element is small, the S/N ratio of reception light data sometimes drops, resulting in difficulty to precisely detect the position of the detection object body.

In order to eliminate this failure, it seems a possible idea for a liquid crystal panel to have built therein a plurality of types of photo-sensor elements having a plurality of dynamic ranges such that stepwise dynamic ranges are assured. However, since a large number of photo-sensor elements are installed, the transmission factor of light transmitted through the liquid crystal panel drops, and this sometimes deteriorates the display quality.

Accordingly, an embodiment provides a display apparatus which implements assurance of a dynamic range of photo-sensor elements and so forth and can improve the image quality.

Technical Solution

A display apparatus of the present embodiment has a display panel including a photo-sensor element having a light receiving region for receiving light to generate reception light data, a light amount adjustment section adapted to adjust the amount of light to be introduced to the light receiving region of the photo-sensor element, and a control section adapted to control operation of the light amount adjustment section, the light amount adjustment section including a lens provided corresponding to the light receiving region of the photo-sensor element, the light amount adjustment section varying the focus position of the lens with respect to the light receiving region of the photo-sensor element to adjust the amount of light to be introduced to the light receiving region.

Preferably, the control section controls the operation of the light amount adjustment section based on the reception light data generated by the photo-sensor element.

Preferably, the lens is greater than the light receiving region.

Preferably, the lens of the light amount adjustment section is a liquid crystal lens, and the light amount adjustment section applies a voltage to liquid crystal which configures the liquid crystal lens to vary the orientation direction of liquid crystal molecules of the liquid crystal to vary the focal length of the liquid crystal lens to adjust the amount of light to be introduced to the photo-sensor element.

Preferably, the liquid crystal lens is a Fresnel lens.

Preferably, the display panel includes a first substrate, a second substrate opposed in a spaced relationship from the first substrate, and a liquid crystal layer sandwiched between the first substrate and the second substrate and oriented at the liquid crystal molecules thereof, the photo-sensor element being provided on a face of the first substrate on the side opposing to the second substrate, the liquid crystal lens being provided at a portion, which corresponds to the light receiving region, of a face of the second substrate on the opposite side to the side opposing to the first substrate, the light amount adjustment section varying the focal length of the liquid crystal lens to adjust the amount of light to be introduced to the light receiving region of the photo-sensor element from the side of the first substrate toward the side of the second substrate.

Preferably, the display panel includes a first substrate, a second substrate opposed in a spaced relationship from the first substrate, and a liquid crystal layer sandwiched between the first substrate and the second substrate and oriented at the liquid crystal molecules thereof, the photo-sensor element being provided on a face of the first substrate on the side opposing to the second substrate, the liquid crystal lens being configured such that a focal length thereof varies in response to a voltage applied to the liquid crystal at a portion of the liquid crystal layer corresponding to the light receiving region, the light amount adjustment section varying the focal length of the liquid crystal lens to adjust the amount of light to be introduced to the light receiving region of the photo-sensor element from the side of the first substrate toward the side of the second substrate.

Preferably, the display panel has a light blocking wall provided in such a manner as to surround portions of the first substrate and the second substrate corresponding to the light receiving region.

Preferably, the lens of the light amount adjustment section is a liquid lens, and the light amount adjustment section applies a voltage to the liquid lens to vary the focal length of the liquid lens to adjust the amount of light to be introduced to the photo-sensor element.

Preferably, the display panel includes a first substrate, a second substrate opposed in a spaced relationship from the first substrate, and a liquid crystal layer sandwiched between the first substrate and the second substrate and oriented at the liquid crystal molecules thereof, the photo-sensor element being provided on a face of the first substrate on the side opposing to the second substrate, the liquid lens being provided at a portion, which corresponds to the light receiving region, of a face of the second substrate on the opposite side to the side opposing to the first substrate, the light amount adjustment section varying the focal length of the liquid lens to adjust the amount of light to be introduced to the light receiving region of the photo-sensor element from the side of the first substrate toward the side of the second substrate.

Preferably, the light amount adjustment section includes a lens moving section for moving the lens so that the focus position of the lens moves in a direction of a face of the display panel to adjust the amount of light to be introduced to the photo-sensor element.

Preferably, the control section adjusts operation of the light amount adjustment section such that, when the reception light data generated by the photo-sensor element is higher than a reference value, the amount of light to be introduced to the photo-sensor element is reduced.

Preferably, the display apparatus further includes a position detection section adapted to detect the position of a detection object body positioned on the side of one face of the display panel, the display panel being configured such that an image is displayed on the side of the one face thereof, the photo-sensor element being configured such that a plurality of such photo-sensor elements are disposed in the pixel region of the display panel in which an image is displayed and receive light advancing from the side of the one face of the display panel toward the side of the other face, the position detection section detecting the position of the detection object body based on the reception light data generated by the plural photo-sensor elements disposed in the pixel region.

Preferably, the control section controls so that image pickup operation for causing the photo-sensor elements to receive light and display operation for causing the display panel to display an image are executed time-divisionally with each other.

In the present embodiment, the light amount adjustment section includes the lens provided corresponding to the light receiving region of the photo-sensor element. The light amount adjustment section varies the focus position of the lens with respect to the light receiving region of the photo-sensor element to adjust the amount of light to be introduced to the light receiving region.

A display apparatus of an embodiment has a display panel on which a photo-sensor element which receives incident light at a light receiving region thereof to generate reception light data, a polarizing plate disposed on a face of the display panel to which the incident light is introduced, and a liquid crystal lens adapted to condense the incident light on the light receiving region, the polarizing plate being disposed such that a transmission axis thereof runs in a direction of a refractive index difference distribution of the liquid crystal lens.

Preferably, the display panel includes a first substrate, a second substrate opposed in a spaced relationship from the first substrate, and a liquid crystal layer sandwiched between the first substrate and the second substrate and oriented at the liquid crystal molecules thereof, the photo-sensor element being provided on a face of the first substrate on the side opposing to the second substrate, the liquid crystal lens being provided at a portion, which corresponds to the light receiving region, of a face of the second substrate on the opposite side to the side opposing to the first substrate, incident light which is successively transmitted through the liquid crystal lens and the polarizing plate and is introduced to the photo-sensor element being received by the photo-sensor element at the light receiving region.

Preferably, the liquid crystal lens is formed by hardening of ultraviolet curing liquid crystal or thermosetting liquid crystal and has a fixed focal length.

Preferably, the display panel includes a first substrate, a second substrate opposed in a spaced relationship from the first substrate, and a liquid crystal layer sandwiched between the first substrate and the second substrate and oriented at the liquid crystal molecules thereof, the photo-sensor element being provided on a face of the first substrate on the side opposing to the second substrate, the liquid crystal lens being formed by application of a voltage to liquid crystal at a portion of the liquid crystal layer which corresponds to the light receiving region, incident light which is successively transmitted through the liquid crystal lens and the polarizing plate and is introduced to the photo-sensor element being received by the photo-sensor element at the light receiving region.

In the present embodiment, the polarizing plate is disposed such that the transmission axis thereof runs along the direction of the refractive index difference distribution of the liquid crystal lens. Consequently, polarized light transmitted through the polarizing plate is condensed by the liquid crystal lens and received by the light receiving region of the photo-sensor element.

According to the present embodiment, a display apparatus which implements assurance of a dynamic range of a photo-sensor element and can improve the image quality can be provided.

Additional features and advantages are described herein, and will be apparent from, the following Detailed Description and the figures.

BRIEF DESCRIPTION OF THE FIGURES

FIG. 10 is a top plan view illustrating a relationship of a liquid crystal lens formed in a liquid crystal layer and a transmission axis of a second polarizing plate in the embodiment 1.

FIG. 16 is views showing a portion of the second transparent electrode formed in the sensor region including the region corresponding to the light receiving region of the photo-sensor element in a further modification to the embodiment 2.

DETAILED DESCRIPTION

Embodiments are described below.
The description is given in the following order.
1. Embodiment 1 (in the case of an externally provided liquid crystal lens)
2. Embodiment 2 (in the case of an externally provided liquid crystal lens)
3. Embodiment 3 (in the case of an externally provided liquid crystal lens)
4. Embodiment 4 (in the case wherein a liquid crystal lens is built in)
5. Embodiment 5 (in the case wherein a liquid crystal lens is built in)
6. Embodiment 6 (in the case wherein a liquid crystal lens is built in)
7. Embodiment 7 (in the case wherein a liquid crystal lens is built in)
8. Embodiment 8 (in the case of an externally provided liquid lens)
9. Embodiment 9 (in the case of an externally provided convex lens)
10. Embodiment 10 (in the case in which a liquid crystal lens is built in and a light blocking wall 203S is installed)
11. Embodiment 11 (in the case wherein an externally provided liquid crystal lens is of the fixed focus type)
12. Others <1. Embodiment 1 (In the Case of an Externally Provided Liquid Crystal Lens)>

(A) General Configuration of the Liquid Crystal Display Apparatus

Figure 1:
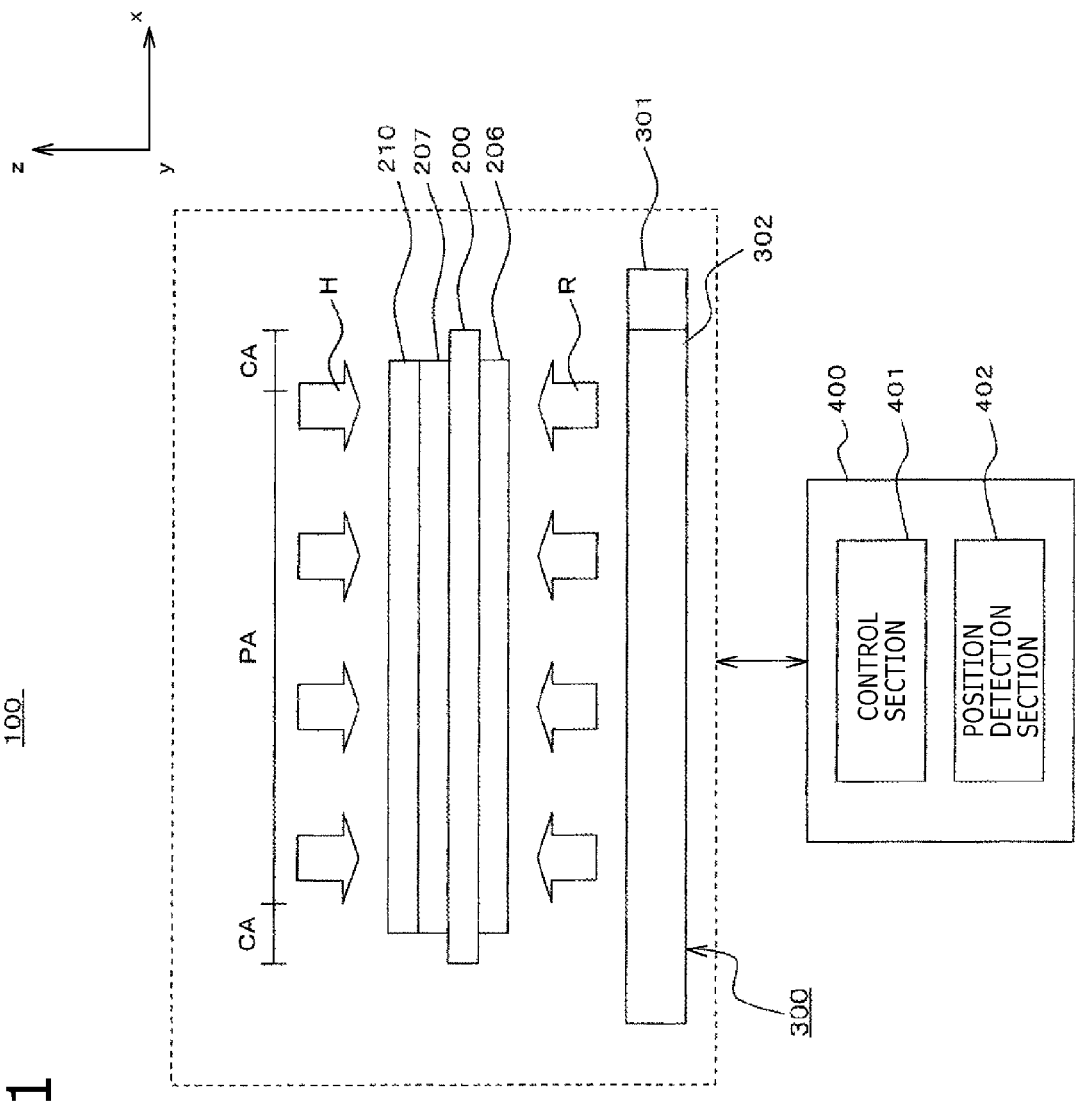
FIG. 1 is a view schematically showing a configuration of essential part of a liquid crystal display apparatus in an embodiment 1.

FIG. 1 is a view schematically showing a configuration of essential part of a liquid crystal display apparatus 100 in an embodiment 1.

As shown in FIG. 1, the liquid crystal display apparatus 100 of the present embodiment includes a liquid crystal panel 200, a light amount adjustment section 210, a backlight 300 and a data processing device 400. The components are successively described.

(A1) Outline of the Liquid Crystal Panel 200

The liquid crystal panel 200 is described.

As shown in FIG. 1, the liquid crystal panel 200 has a first polarizing plate 206 disposed on one face thereof in such a manner as to oppose to the liquid crystal panel 200 and has a second polarizing plate 207 disposed on the other face thereof in such a manner as to oppose to the liquid crystal panel 200. And, on the side of the one face, the backlight 300 is disposed in such a manner as to oppose to the liquid crystal panel 200 through the first polarization panel 206.

Figure 2:
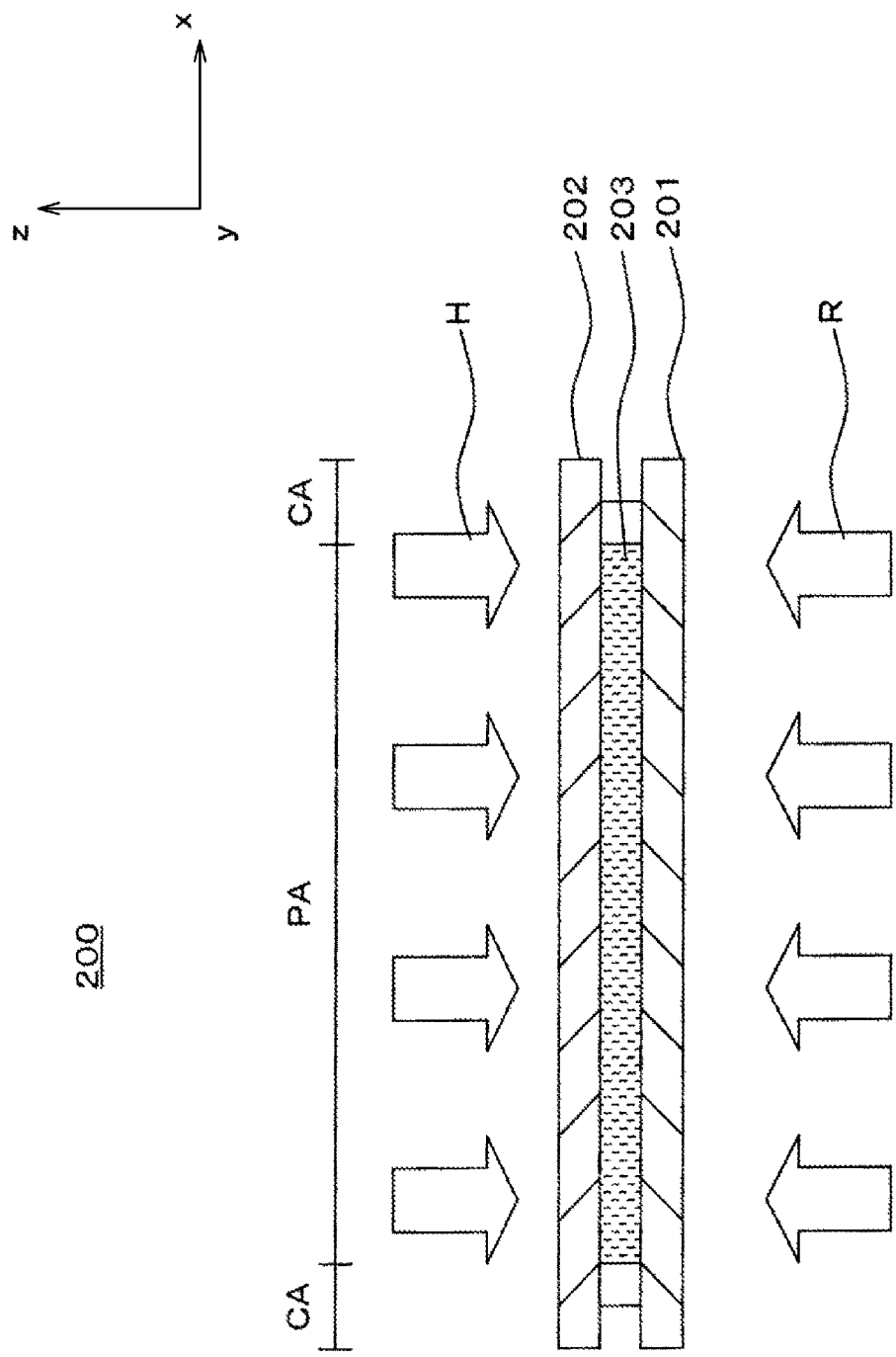
FIG. 2 is a sectional view showing essential part of a liquid crystal panel in the embodiment 1 according to the present invention.
Figure 3:
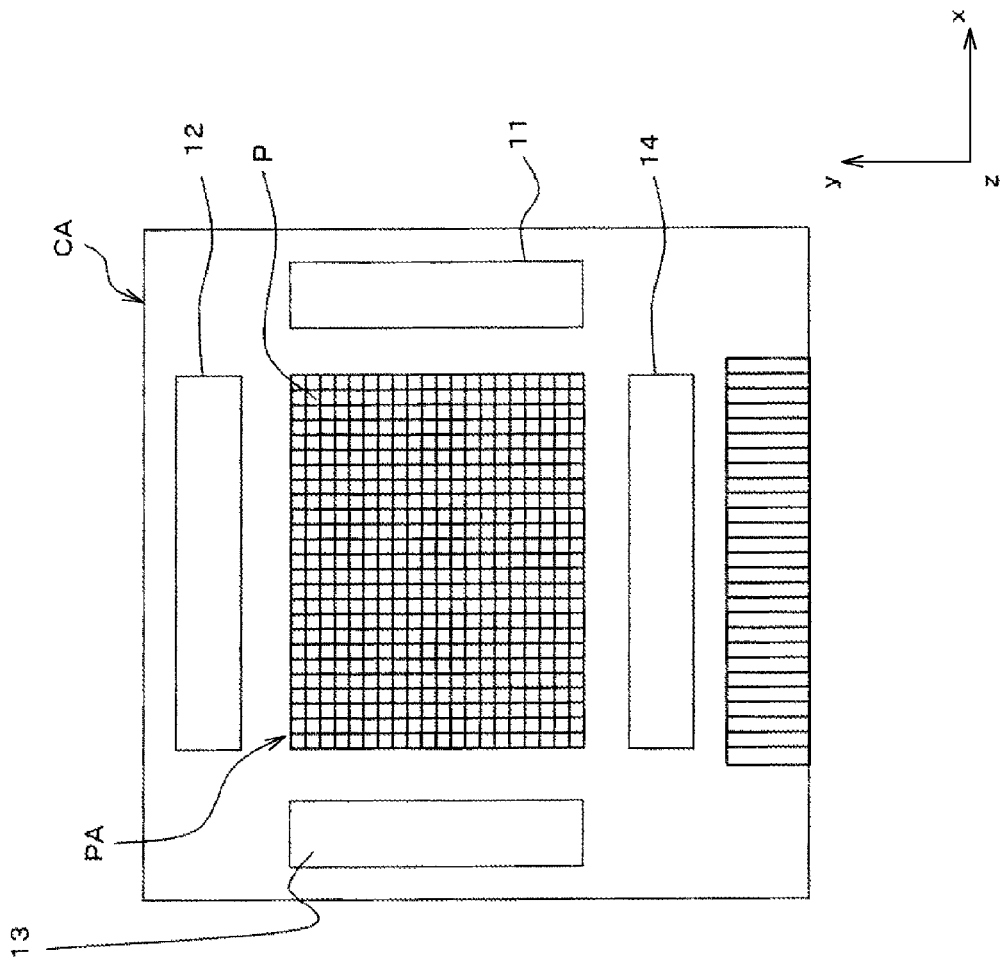
FIG. 3 is a plan view showing essential part of the liquid crystal display panel in the embodiment 1.

FIG. 2 is a sectional view showing essential part of the liquid crystal panel 200 in the embodiment 1 according to the present embodiment. Further, FIG. 3 is a plan view showing essential part of the liquid crystal panel 200 in the embodiment 1.

The liquid crystal panel 200 is of the active matrix type and has a TFT array substrate 201, an opposing substrate 202 and a liquid crystal layer 203 as shown in FIG. 2.

As shown in FIG. 2, in the liquid crystal panel 200, the TFT array substrate 201 and the opposing substrate 202 are opposed in a spaced relationship from each other. And, the liquid crystal layer 203 is provided in such a manner as to be sandwiched by the TFT array substrate 201 and the opposing substrate 202.

In the present embodiment, the liquid crystal panel 200 is a transmission type liquid crystal panel. Therefore, as shown in FIG. 2, in the liquid crystal panel 200, illumination light R emitted from the backlight 300 is irradiated upon the reverse face of the TFT array substrate 201 on the opposite side to the face opposing to the opposing substrate 202 through the first polarizing plate 206. And, in the liquid crystal panel 200, the illumination light R is transmitted to the front face and then emitted through the second polarizing plate 207.

As shown in FIG. 3, a pixel region PA is provided on the liquid crystal panel 200.

As shown in FIG. 3, in the pixel region PA of the liquid crystal panel 200, a plurality of pixels P are disposed in a juxtaposed relationship in a matrix in the horizontal direction x and the vertical direction y. As shown in FIG. 2, in the pixel region PA, the illumination light R irradiated on the back face side of the liquid crystal panel 200 is modulated and then the modulated illumination light R is transmitted to the front face side so that an image is displayed.

While details are hereinafter described, in the pixel region PA, each pixel P includes a TFT (not shown) which functions as a pixel switching element and, the TFT which is a pixel switching element switching controls the pixel P to modulate the illumination light R. And, the modulated illumination light R is emitted to the front face side so that an image is displayed in the pixel region PA. Here, for example, a color image is displayed.

Further, in the present embodiment, the liquid crystal panel 200 is configured as a so-called I/O touch panel, and a photosensor element (not shown) which functions as a position sensor element is provided in the pixel P. While details are hereinafter described, the photo-sensor element is, for example, a photodiode, and as shown in FIG. 2, the photo-sensor element receives incident light H entering from the front face side of the liquid crystal panel 200 in a light receiving region thereof and carries out photoelectric conversion to generate reception light data. In short, the photo-sensor element receives reflection light directed from the side of the opposing substrate 202 toward the side of the TFT array substrate 201 to generate the reception light data. For example, when a detection object body such as a finger of a user or a touch pen touches with or is positioned closely to the front face side of the liquid crystal panel 200, the photo-sensor elements receive light reflected by the detection object body to generate reception light data.

Further, as shown in FIG. 3, the liquid crystal panel 200 has a peripheral region CA provided thereon in such a manner as to surround the periphery of the pixel region PA.

As shown in FIG. 3, in the peripheral region CA of the liquid crystal panel 200, a displaying vertical driving circuit 11, a displaying horizontal driving circuit 12, a sensor vertical driving circuit 13 and a sensor horizontal driving circuit 14 are formed. For example, the circuits are configured from semiconductor devices formed similarly to the TFT (not shown) which functions as the pixel switching element and the photo-sensor element (not shown) which functions as the position sensor element.

And, the displaying vertical driving circuit 11 and the displaying horizontal driving circuit 12 drive the TFTs provided as the pixel switching elements so as to correspond to the pixels P in the pixel region PA to execute image display. And, the sensor vertical driving circuit 13 and the sensor horizontal driving circuit 14 drive photo-sensor elements (not shown) provided as the position sensor elements so as to correspond to the pixels P in the pixel region PA to collect reception light data.

In particular, the displaying vertical driving circuit 11 extends in the vertical direction y as shown in FIG. 3. And, the displaying vertical driving circuit 11 is connected to the gate electrode of the TFTs (not shown) formed as the pixel switching elements so as to correspond to a plurality of pixels P in the vertical direction y. And, the displaying vertical driving circuit 11 successively supplies a scanning signal to the plural TFTs juxtaposed in the vertical direction y based on a control signal supplied thereto. Here, a gate line (not shown) is connected to the plural TFTs formed corresponding to the plural pixels P juxtaposed in the horizontal direction x, and a plurality of such gate lines are formed so as to correspond to the plural pixels P juxtaposed in the vertical direction y. Therefore, the displaying vertical driving circuit 11 successively supplies the scanning signal to the plural gate lines.

As shown in FIG. 3, the displaying horizontal driving circuit 12 extends in the horizontal direction x. And, the displaying horizontal driving circuit 12 is connected to the source electrode of the TFTs (not shown) formed as the pixel switching elements so as to correspond to the plural pixels P in the horizontal direction x. And, the displaying horizontal driving circuit 12 successively supplies a data signal to the plural TFTs juxtaposed in the vertical direction y based on a control signal supplied thereto. Here, a signal line (not shown) is connected to the plural TFTs formed corresponding to the plural pixels P juxtaposed in the vertical direction y, and a plurality of such signal lines are formed so as to correspond to the plural pixels P juxtaposed in the horizontal direction x. Therefore, the displaying horizontal driving circuit 12 successively supplies an image data signal to the plural signal lines.

As shown in FIG. 3, the sensor vertical driving circuit 13 extends in the vertical direction y. And, the sensor vertical driving circuit 13 is connected to the photo-sensor elements (not shown) formed as position sensor elements so as to correspond to the plural pixels P in the vertical direction y. And, the sensor vertical driving circuit 13 selects a photo-sensor element from which reception light data is to be read out from among the plural photo-sensor elements juxtaposed in the vertical direction y based on a control signal supplied thereto. Here, a gate line (not shown) is connected to the plural photo-sensor elements formed corresponding to the plural pixels P juxtaposed in the horizontal direction x, and a plurality of such gate lines are formed so as to correspond to the plural pixels P juxtaposed in the vertical direction y. Therefore, the sensor vertical driving circuit 13 supplies a scanning signal so as to successively select the plural gate lines.

As shown in FIG. 3, the sensor horizontal driving circuit 14 extends in the horizontal direction x. And, the sensor horizontal driving circuit 14 is connected to the photo-sensor elements (not shown) formed as the position sensor elements so as to correspond to the plural pixels P in the horizontal direction x. And, the sensor horizontal driving circuit 14 successively reads out reception light data from the plural photo-sensor elements juxtaposed in the vertical direction y based on a control signal supplied thereto. Here, a signal readout line (not shown) is connected to the plural photo-sensor elements formed corresponding to the plural pixels P juxtaposed in the vertical direction y, and a plurality of such signal readout lines are formed so as to correspond to the plural pixels P juxtaposed in the horizontal direction. Therefore, the sensor horizontal driving circuit 14 successively reads out the reception light data from the photo-sensor elements through the plural signal readout lines and then outputs the read out data to a position detection section 402.

(A2) Outline of the Light Amount Adjustment Section 210

The light amount adjustment section 210 is described.

As shown in FIG. 1, the light amount adjustment section 210 opposes to the front face of the liquid crystal panel 200 and adjusts the amount of incident light H to enter the pixel region PA on the front face side of the liquid crystal panel 200.

While details are hereinafter described, the light amount adjustment section 210 includes a lens, and varies the focal position of the lens with respect to the light receiving region in which the photo-sensor elements receive light to produce reception light data thereby to adjust the amount of light to enter the photo-sensor elements.

(A3) Outline of the Backlight 300

The backlight 300 is described.

As shown in FIG. 1, the backlight 300 is provided on the back face side of the liquid crystal panel 200 in such a manner as to oppose to the back face of the liquid crystal panel 200 and emits illumination light R to the pixel region PA of the liquid crystal panel 200.

Here, as shown in FIG. 1, the backlight 300 includes a light source 301 and a light guide plate 302 for diffusing light irradiated from the light source 301 to convert the light into planar light, and irradiates planar light as illumination light R upon the overall face of the pixel region PA of the liquid crystal panel 200.

In the present embodiment, the light source 301 of the backlight 300 is provided at one end portion of the light guide plate 302 and outputs visible rays. In particular, the light source 301 is a white LED and irradiates a white visible ray from an irradiation face thereof. And, the white visible ray irradiated from the light source 301 is diffused by the light guide plate 302 and then is irradiated as planar light on the back face of the liquid crystal panel 200 from one face of the light guide plate 302.

(A4) Outline of the Data Processing Device 400

The data processing device 400 is described.

As shown in FIG. 1, the data processing device 400 has a control section 401 and a position detection section 402. The data processing device 400 includes a computer and is configured so that the computer operates as the components with a program.

The control section 401 of the data processing device 400 is configured so as to control operation of the liquid crystal panel 200, light amount adjustment section 210 and backlight 300.

Here, the control section 401 supplies a control signal to the liquid crystal panel 200 to control operation of the plural pixel switching elements (not shown) provided in the liquid crystal panel 200. For example, the control section 401 controls the pixel switching elements to execute line sequential driving.

Further, the control section 401 supplies a control signal to the backlight 300 to control operation of the backlight 300 so that the illumination light R is irradiated from the backlight 300. In this manner, the control section 401 controls operation of the liquid crystal panel 200 and the backlight 300 to display an image in the pixel region PA of the liquid crystal panel 200. In short, the control section 401 executes displaying operation for displaying an image in the pixel region PA.

Further, the control section 401 supplies a control signal to the liquid crystal panel 200 to control operation of the plural photo-sensor elements (not shown) provided as the position sensor elements in the liquid crystal panel 200 and collects reception light data from the photo-sensor elements. For example, the control section 401 executes line sequential driving to collect reception light data. In short, the control section 401 executes image pickup operation for causing the photo-sensor elements to receive light.

In the present embodiment, the control section 401 controls such that image pickup operation for causing the photo-sensor elements to receive light and displaying operation for displaying an image in the pixel region PA of the liquid crystal panel 200 are executed time-divisionally from each other. In particular, the control section 401 executes the image pickup operation and the displaying operation at points of time different from each other.

Further, the control section 401 supplies a control signal to the light amount adjustment section 210 to control operation of the light amount adjustment section 210. In the present embodiment, the control section 401 controls operation of the light amount adjustment section 210 based on the reception light data generated by the photo-sensor elements.

In particular, where the value of the reception light data generated by a photo-sensor element is higher than a reference value, the control section 401 adjusts operation of the light amount adjustment section 210 so that the amount of the incident light H to be introduced to the photo-sensor element is reduced. In particular, the control section 401 carries out a comparison process between the value of the reception light data produced by the photo-sensor element and a reference value set in advance with each other, and, where the value of the reception light data is higher than the reference value, the control section 401 carries out such control as described above. For example, where the value of the reception light data produced by the photo-sensor element is equal to an upper limit value of a dynamic range, operation of the light amount adjustment section 210 is adjusted such that the amount of the incident light H to be introduced to the photo-sensor element is reduced.

The position detection section 402 of the data processing device 400 detects a position at which a detection object body such as a finger of the user or a touch pen touches with or is positioned closely to the pixel region PA on the front face side of the liquid crystal panel 200. Here, the position detection section 402 carries out the position detection based on the reception light data collected from the plural photo-sensor elements (not shown) provided on the liquid crystal panel 200. For example, the position detection section 402 detects a coordinate position at which the signal intensity of the reception light data is higher than a reference value as a coordinate position at which the detection body touches with the pixel region PA.

(B) Detailed Configuration of the Liquid Crystal Display Apparatus

Figure 4:
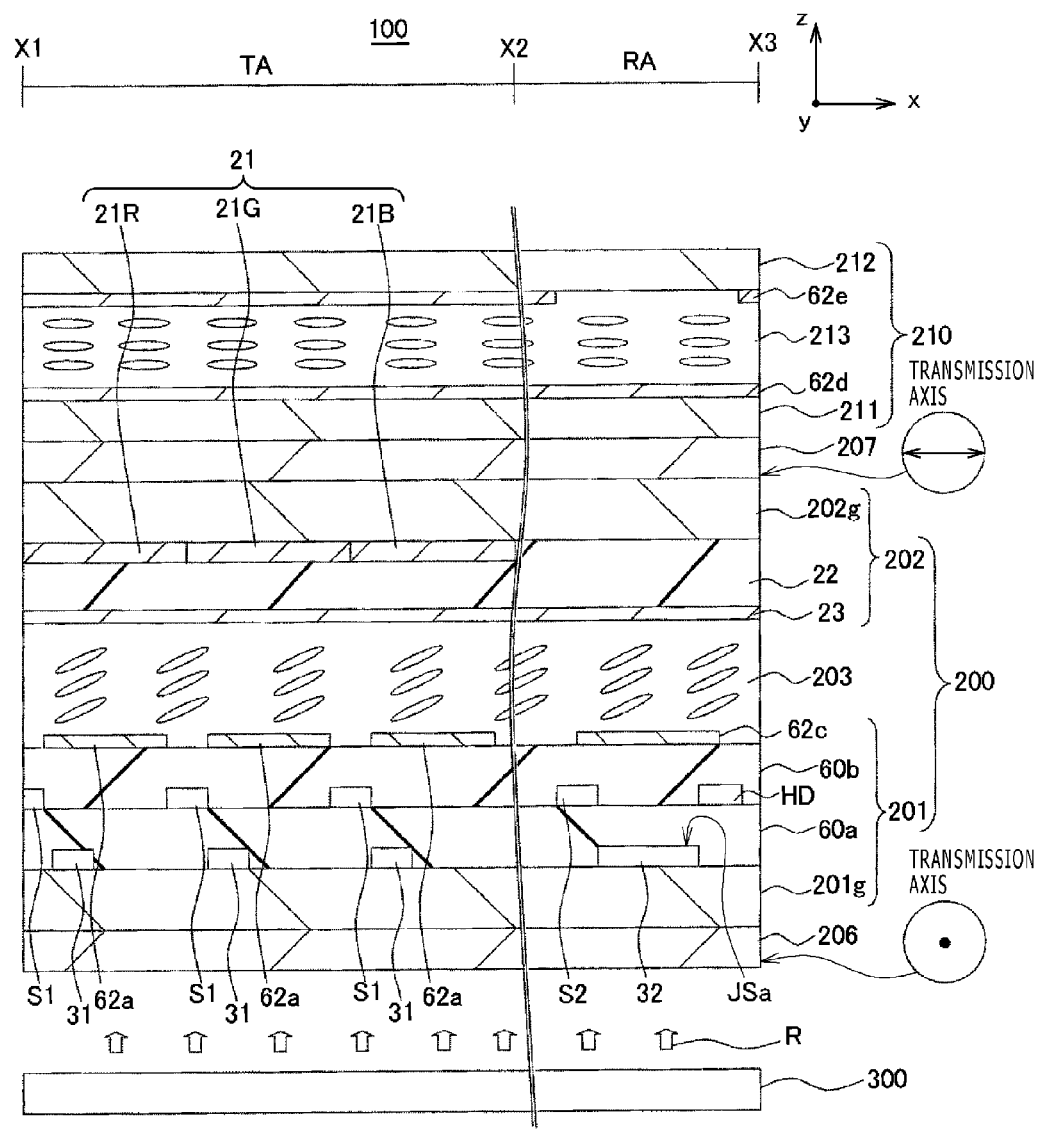
FIG. 4 is a sectional view showing, in an enlarged scale, essential part of the liquid crystal display apparatus in the embodiment 1.

FIG. 4 is a sectional view showing, in an enlarged scale, essential part of the liquid crystal display apparatus 100 in embodiment 1. In FIG. 4, a portion corresponding to pixels P provided in the pixel region PA is shown.

As shown in FIG. 4, the liquid crystal display apparatus 100 includes the liquid crystal panel 200, and the liquid crystal panel 200 includes the TFT array substrate 201, opposing substrate 202 and liquid crystal layer 203. As shown in FIG. 4, in the liquid crystal panel 200, the TFT array substrate 201 and the opposing substrate 202 are pasted with each other in a spaced relationship from each other, and the liquid crystal layer 203 is provided in the space between the TFT array substrate 201 and the opposing substrate 202.

And, the liquid crystal panel 200 has the first polarizing plate 206 disposed in an opposed state on one face thereof and has the second polarizing plate 207 disposed in an opposed state on the other face thereof. The liquid crystal panel 200 is, for example, a TN (TN: Twisted Nematic) type liquid crystal panel, and transmission axes of the first polarizing plate 206 and the second polarizing plate 207 are disposed in a crossing relationship with each other so as to be ready for a normally white system.

In particular, as shown in FIG. 4, the first polarizing plate 206 is disposed on the face on the opposite side to the side of the TFT array substrate 201 opposing to the opposing substrate 202. The first polarizing plate 206 is disposed such that the transmission axis thereof runs, for example, along the y direction.

On the other hand, as shown in FIG. 4, the second polarizing plate 207 is disposed on the face on the opposite side to the side of the opposing substrate 202 opposing to the TFT array substrate 201. The second polarizing plate 207 is disposed such that the transmission axis thereof runs, for example, along the x direction.

While details are hereinafter described, the second polarizing plate 207 is provided such that the transmission axis thereof runs along a direction of a refractive index difference distribution of a liquid crystal lens (not shown) provided on the light amount adjustment section 210.

(B1) On the TFT Array Substrate 201

The TFT array substrate 201 of the liquid crystal panel 200 is described.

As shown in FIG. 4, the TFT array substrate 201 includes a glass substrate 201g. The glass substrate 201g is a substrate of an insulator which transmits light therethrough and is formed from glass. And, as shown in FIG. 4, on the face of the glass substrate 201g on the side opposing to the opposing substrate 202, pixel switching elements 31, a photo-sensor element 32, pixel electrodes 62a and a transparent electrode 62c are formed.

The components provided on the TFT array substrate 201 are successively described.

As shown in FIG. 4, the pixel switching elements 31 of the TFT array substrate 201 are formed in a displaying region TA of the pixel region PA.

Figure 5:
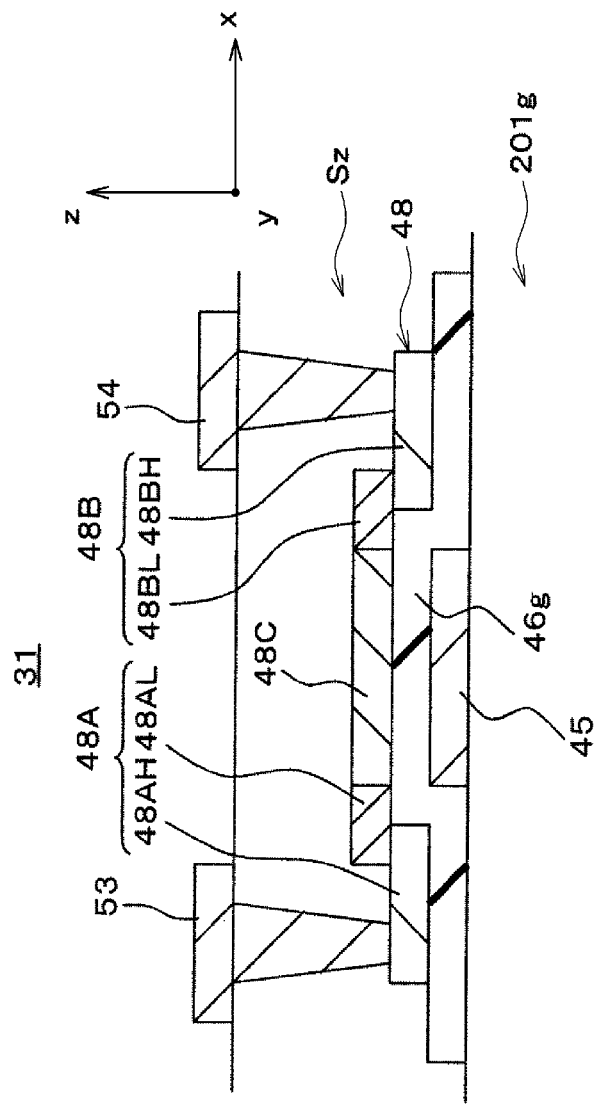
FIG. 5 is a sectional view showing essential part of a pixel switching element in the embodiment 1.

FIG. 5 is a sectional view showing essential part of a pixel switching element 31 in embodiment 1.

As shown in FIG. 5, the pixel switching element 31 includes a gate electrode 45, a gate insulating film 46g and a semiconductor layer 48 and is formed as a bottom gate type TFT having an LDD (Lightly Doped Drain) structure. For example, the pixel switching element 31 is formed as an N-channel type TFT.

In particular, in the pixel switching element 31, the gate electrode 45 is formed using a metal material such as molybdenum (Mo). Here, as shown in FIG. 5, the gate electrode 45 is provided on the face of the glass substrate 201g in such a manner as to oppose to a channel region 48C of the semiconductor layer 48 through the gate insulating film 46g. And, the gate electrode 45 is electrically connected to a scanning line (not shown).

Further, in the pixel switching element 31, the gate insulating film 46g is formed, for example, in such a manner as to cover the gate electrode 45 as shown in FIG. 5. Here, the gate insulating film 46g is formed by successively laminating a silicon nitride film (not shown) and a silicon oxide film (not shown) from the side of the glass substrate 201g.

Further, in the pixel switching element 31, the semiconductor layer 48 is formed, for example, from polycrystalline silicon. As shown in FIG. 5, in the semiconductor layer 48, the channel region 48C is formed so as to correspond to the gate electrode 45 and a pair of source-drain regions 48A and 48B are formed in such a manner as to sandwich the channel region 48C. In the paired source-drain regions 48A and 48B, a pair of low-concentration impurity regions 48AL and 48BL are formed in such a manner as to sandwich the channel region 48C. Further, a pair of high-concentration impurity regions 48AH and 48BH having a higher impurity concentration than that of the low-concentration impurity regions 48AL and 48BL are formed in such a manner as to sandwich the paired low-density impurity regions 48AL and 48BL. And, as shown in FIG. 5, the semiconductor layer 48 is covered with an inter-layer insulating film Sz. The inter-layer insulating film Sz is formed, for example, from a silicon nitride film, a silicon oxide film or the like.

And, in the pixel switching element 31, the source electrode 53 and the drain electrode 54 are formed using a conductive material such as aluminum. The source electrode 53 is provided so as to be electrically connected to the source-drain region 48A, for example, by filling a conductive material into a contact hole which extends through the inter-layer insulating film Sz and pattern processing the filled material. And, the drain electrode 54 is provided so as to be electrically connected to the source-drain region 48B by filling a conductive material into a contact hole which extends through the inter-layer insulating film Sz and pattern processing the filled material similarly.

As shown in FIG. 4, the pixel switching element 31 is covered with an inter-layer insulating film 60a. Though not shown, the source electrode 53 shown in FIG. 5 is electrically connected to a data line S1 provided on the inter-layer insulating film 60a. Further, as shown in FIG. 4, a flattening film 60b is provided on the inter-layer insulating film 60a in such a manner as to cover the data line S1. Though not shown, the drain electrode 54 shown in FIG. 5 is electrically connected to a pixel electrode 62a provided on the flattening film 60b.

As shown in FIG. 4, in the TFT array substrate 201, the photo-sensor element 32 is formed in a sensor region RA of the pixel region PA.

Figure 6:
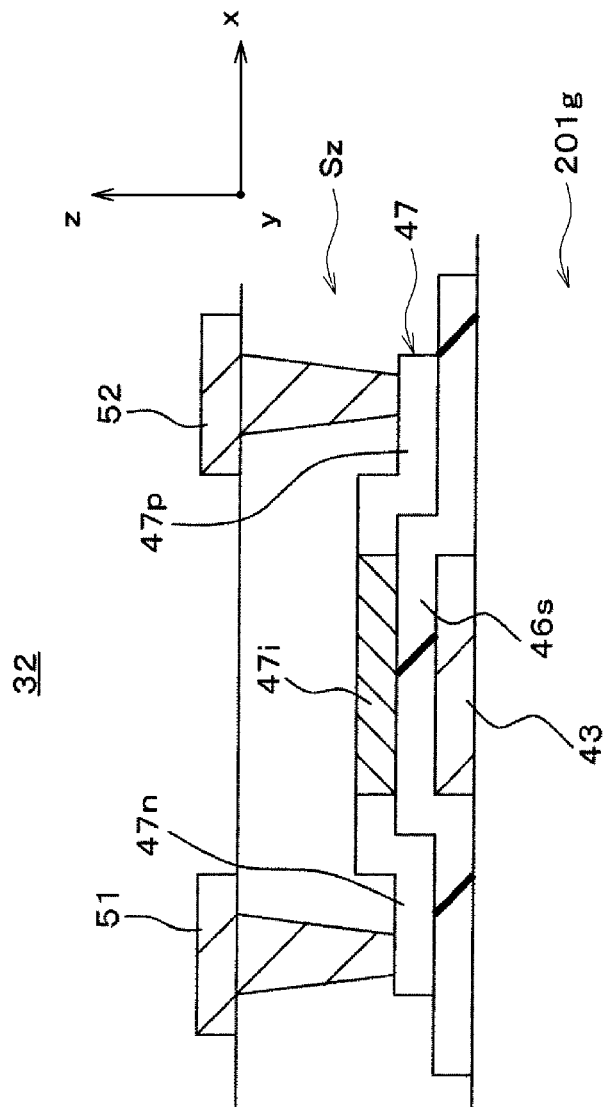
FIG. 6 is a sectional view showing essential part of a photo-sensor element in the embodiment 1.

FIG. 6 is a sectional view showing essential part of the photo-sensor element 32 in the embodiment 1.

The photo-sensor element 32 is, for example, a photodiode and includes a metal reflection film 43 and a semiconductor layer 47 as shown in FIG. 6. And, the photo-sensor element 32 receives and photoelectrically converts incident light to generate reception light data, and the generated data is read out. For example, the photo-sensor element 32 is configured such that, when a reverse bias is applied thereto, photocurrent is read out as the reception light data.

In particular, in the photo-sensor element 32, the metal reflection film 43 is formed using a metal material such as molybdenum (Mo) similarly to the gate electrode 45. As shown in FIG. 6, the metal reflection film 43 is provided on the face of the glass substrate 201g in such a manner as to oppose to an i-layer 47i of the semiconductor layer 47 with an insulating film 46s interpolated therebetween. And, the metal reflection film 43 reflects illumination light entering from the side of the face on the opposite side to the face of the glass substrate 201g on which the metal reflection film 43 is provided into the semiconductor layer 47 to block the light.

Further, in the photo-sensor element 32, the semiconductor layer 47 is formed on the face of the glass substrate 201g as shown in FIG. 6. The semiconductor layer 47 is formed, for example, from polycrystalline silicon, and is formed by pattern processing a semiconductor thin film same as the semiconductor layer 48 of the pixel switching element 31.

The semiconductor layer 47 includes a p layer 47p, an n layer 47n and an i layer 47i and is configured such that the photo-sensor element 32 has a PIN structure. The semiconductor layer 47 receives incident light H introduced thereto to carry out photoelectric conversion of the incident light H to generate electric charge. In other words, the semiconductor layer 47 is formed as a photoelectric conversion layer. Here, the p layer 47p is formed by doping p-type impurity in a high concentration and the n layer 47n is formed by doping n-type impurity in a high concentration, and the i layer 47i has high resistance and is interposed between the p layer 47p and the n layer 47n.

The semiconductor layer 47 is provided such that the n layer 47n, i layer 47i and p layer 47p are successively juxtaposed along a planar direction xy of the glass substrate 201g.

In particular, in the semiconductor layer 47, the i layer 47i is provided so as to oppose to the metal reflection layer 43 with the insulating film 46s interposed therebetween. And, the n layer 47n and the p layer 47p are provided in such a manner as to sandwich the i layer 47i in the planar direction xy of the glass substrate 201g. In other words, the photo-sensor element 32 is configured such that the semiconductor layer 47 which carries out photoelectric conversion has a lateral type structure in which current flows in the planar direction xy of the liquid crystal panel 200.

And, in the photo-sensor element 32, a first electrode 51 is provided so as to be connected to the n layer 47n. Here, the n layer 47n extends in the planar direction xy of the glass substrate 201g from a portion at which it corresponds to the i layer 47i, and the first electrode 51 is formed on the surface of the extending portion. For example, the first electrode 51 is formed from a metal material such as aluminum.

And, in the photo-sensor element 32, a second electrode 52 is provided so as to be electrically connected to the p layer 47p. Here, the p layer 47p extends in the planar direction xy of the glass substrate 201g from a portion at which it corresponds to the i layer 47i, and the second electrode 52 is formed on the surface of the extending portion. For example, the second electrode 52 is formed from a metal material such as aluminum.

The first electrode 51 and the second electrode 52 are formed by forming the inter-layer insulating film Sz in such a manner as to cover the semiconductor layer 47 and providing a contact hole so that the surface of the n layer 47n and the p layer 47p is exposed and then filling a conductive material into the contact hole. For example, the first and second electrodes 51 and 52 are formed by filling a conductive material such as a metal material into the contact hole and then carrying out pattern processing.

And, as shown in FIG. 4, the photo-sensor element 32 is covered with the inter-layer insulating film 60a, and the photo-sensor element 32 is driven through a driving wiring line HD provided on the inter-layer insulating film 60a. And, the reception light data generated by photoelectric conversion by the photo-sensor element 32 is read out through a data line S2 provided on the inter-layer insulating film 60a.

Further, as shown in FIG. 4, the pixel electrode 62a of the TFT array substrate 201 is formed on the flattening film 60b so as to correspond to the displaying region TA and is connected to the drain electrode 54 of the pixel switching element 31. The pixel electrode 62a is a so-called transparent electrode and is formed, for example, using ITO. And, the pixel electrode 62a applies a voltage to the liquid crystal layer 203 between the pixel electrode 62a and the opposing electrode 23 provided on the opposing substrate 202 shown in FIG. 4 so as to modulate light illuminated by the backlight 300.

Further, as shown in FIG. 4, the transparent electrode 62c of the TFT array substrate 201 is formed on the flattening film 60b so as to correspond to the sensor region RA. The transparent electrode 62c is formed, for example, using ITO similarly to the pixel electrode 62a. Different from the pixel electrode 62a, the transparent electrode 62c is not electrically connected to the pixel switching element 31 but is provided independently of the pixel electrode 62a.

(B2) On the Opposing Substrate 202

The opposing substrate 202 of the liquid crystal panel 200 is described.

The opposing substrate 202 includes a glass substrate 202g of an insulator which transmits light therethrough similarly as in the case of the TFT array substrate 201, and, as shown in FIG. 4, the opposing substrate 202 opposes to the TFT array substrate 201 in a spaced relationship from each other. And, in the opposing substrate 202, as shown in FIG. 4, a color filter layer 21 and an opposing electrode 23 are formed on the glass substrate 202g.

As shown in FIG. 4, the color filer layer 21 of the opposing substrate 202 is formed on the face of the opposing substrate 202 on the side opposing to the TFT array substrate 201 in the display region TA of the pixel region PA. The color filter layer 21 is configured such that the illumination light R emitted from the backlight 300 is colored and is transmitted from the side of the TFT array substrate 201 to the side of the opposing substrate 202. Here, as shown in FIG. 4, the color filter layer 21 including a set of a red filter layer 21R, a green filter layer 21G and a blue filter layer 21B is provided for each pixel P. And, in the TFT array substrate 201, the pixel switching element 31 and the pixel electrode 62a described above are provided so as to correspond individually to the red filter layer 21R, green filter layer 21 G and blue filter layer 21B.

And, as shown in FIG. 4, the opposing electrode 23 of the opposing substrate 202 is formed on the face of the opposing substrate 202 on the side opposing to the TFT array substrate 201. The opposing electrode 23 is a so-called transparent electrode and is formed, for example, from ITO. Here, as shown in FIG. 4, the flattening film 22 is provided in such a manner as to cover the color filter layer 21, and the opposing electrode 23 is provided in a solid state on the overall face of the flattening film 22 so as to function as a common electrode.

(B3) On the Liquid Crystal Layer 203

The liquid crystal layer 203 of the liquid crystal panel 200 is described.

As shown in FIG. 4, the liquid crystal layer 203 is sandwiched between the TFT array substrate 201 and the opposing substrate 202. For example, the liquid crystal layer 203 is encapsulated in a space, in which a predetermined distance is maintained by a spacer (not shown), between the TFT array substrate 201 and the opposing substrate 202. And, the liquid crystal layer 203 is oriented by a liquid crystal orientation film (not shown) formed on the TFT array substrate 201 and the opposing substrate 202.

(C) Detailed Configuration of the Light Amount Adjustment Section 210

As shown in FIG. 4, the liquid crystal displaying apparatus 100 includes the light amount adjustment section 210. The light amount adjustment section 210 has a form of a panel and is disposed on the front face side of the liquid crystal panel 200 in such a manner as to oppose to the liquid crystal panel 200.

As shown in FIG. 4, the light amount adjustment section 210 includes a first glass substrate 211, a second glass substrate 212 and a liquid crystal layer 213, and the first glass substrate 211 and the second glass substrate 212 are pasted with each other with a space left therebetween. And, in the light amount adjustment section 210, the liquid crystal layer 213 is provided in the space between the first glass substrate 211 and the second glass substrate 212.

Here, in the light amount adjustment section 210, the first glass substrate 211, liquid crystal layer 213 and second glass substrate 212 are disposed in a juxtaposed relationship with each other in order from the side of the liquid crystal panel 200. The light amount adjustment section 210 is configured so as to adjust the amount of light to be introduced to the i layer 47i of the photo-sensor element 32.

While details are hereinafter described, the light amount adjustment section 210 is configured such that liquid crystal of the liquid crystal layer 213 at a portion corresponding to the sensor region RA functions as a liquid crystal lens. And, a voltage is applied to the liquid crystal which configures the liquid crystal lens to vary the orientation direction of liquid crystal molecules of the liquid crystal to vary the focal length of the liquid crystal lens thereby to adjust the amount of light to be introduced to a light receiving region JSa of the photo-sensor element 32.

The components of the light amount adjustment section 210 are successively described.

In the light amount adjustment section 210, the first glass substrate 211 is a substrate of an insulator which transmits light therethrough and is formed from glass. And, the first glass substrate 211 is disposed on the liquid crystal panel 200 on the side of the opposing substrate 202 so as to oppose to the opposing substrate 202. And, as shown in FIG. 4, a first transparent electrode 62d is formed on the face of the first glass substrate 211 on the opposite side to the face opposing to the opposing substrate 202 and on the side opposing to the second glass substrate 212.

In the first glass substrate 211, the first transparent electrode 62d is formed, for example, using ITO and transmits light therethrough. Here, as shown in FIG. 4, the first transparent electrode 62d is formed so as to cover all over the overall area of the face of the first glass substrate 211 on the side opposing to the second glass substrate 212.

In the light amount adjustment section 210, the second glass substrate 212 is a substrate of an insulator which transmits light therethrough and is formed from glass. And, the second glass substrate 212 is disposed so as to oppose to the opposing substrate 202 of the liquid crystal panel 200 through the first glass substrate 211 and the liquid crystal layer 213. And, as shown in FIG. 4, in the second glass substrate 212, a second transparent electrode 62e is formed on the face on the side opposing to the first glass substrate 211.

In the second glass substrate 212, the second transparent electrode 62e is formed, for example, using ITO and transmits light therethrough.

Figure 7:
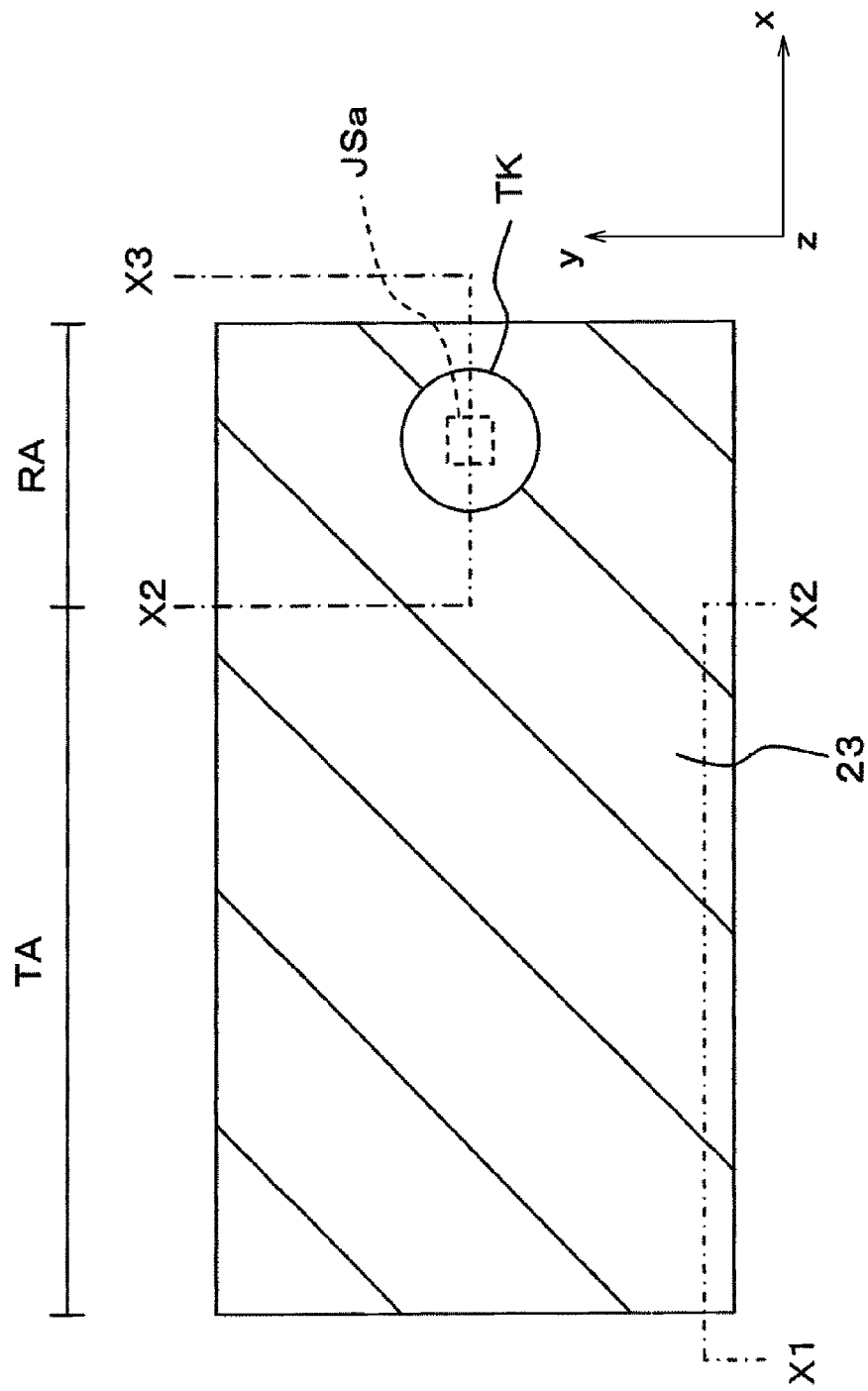
FIG. 7 is a plan view showing a second transparent electrode in the embodiment 1.

FIG. 7 is a top plan view showing the second transparent electrode 62e in embodiment 1.

As shown in FIG. 4, the second transparent electrode 62e of the second glass substrate 212 is formed so as to cover the face of the second glass substrate 212 on the side opposing to the first glass substrate 211. And, in the second transparent electrode 62e, an opening TK is provided at a portion of the sensor region RA including a region corresponding to the light receiving region JSa of the photo-sensor element 32. In the present embodiment, the opening TK of the second transparent electrode 62e is formed in a circular shape having an area greater than the area of the light receiving region JSa of the photo-sensor element 32.

As shown in FIG. 4, in the light amount adjustment section 210, the liquid crystal layer 213 is sandwiched between the first glass substrate 211 and the second glass substrate 212. For example, the liquid crystal layer 213 is encapsulated in the space, in which the predetermined distance is maintained by the spacer (not shown), between the first glass substrate 211 and the second glass substrate 212. And, the liquid crystal layer 213 is orientated by the liquid crystal orientation film (not shown) formed on the first glass substrate 211 and the second glass substrate 212. For example, the liquid crystal layer 213 is formed from a liquid crystal material of dielectric constant anisotropy $\Delta\epsilon > 0$, and, as shown in FIG. 4, the liquid crystal layer 213 is horizontally orientated such that the major axis direction of liquid crystal molecules runs along a direction of the face on which the first glass substrate 211 and the second glass substrate 212 oppose to each other.

(D) Operation

Operation is described where, in the liquid crystal display apparatus 100 described above, when a detection object body such as a finger of the human body is touched with or moved on the front face side of the liquid crystal panel 200, the position of the detection object body is detected.

Figure 8:
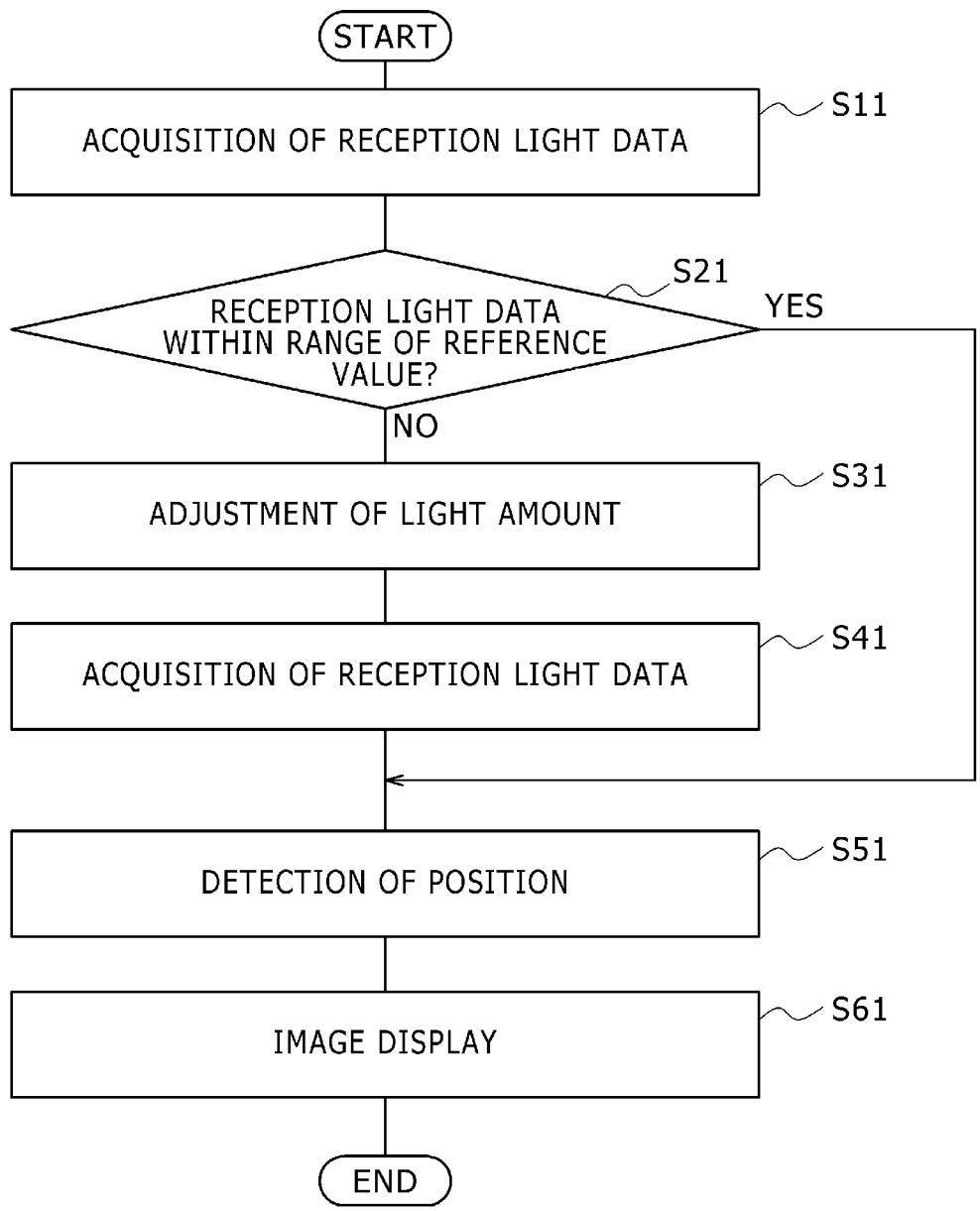
FIG. 8 is a flow chart illustrating operation when the position of a detection object body is detected in the embodiment 1.

FIG. 8 is a flow chart illustrating operation when the position of a detection object body is detected in embodiment 1.

First, as illustrated in FIG. 8, acquisition of reception light data is carried out (S11).

Here, the photo-sensor element 32 provided in the sensor region RA on the liquid crystal panel 200 receives incident light H to generate reception light data.

Figure 9:
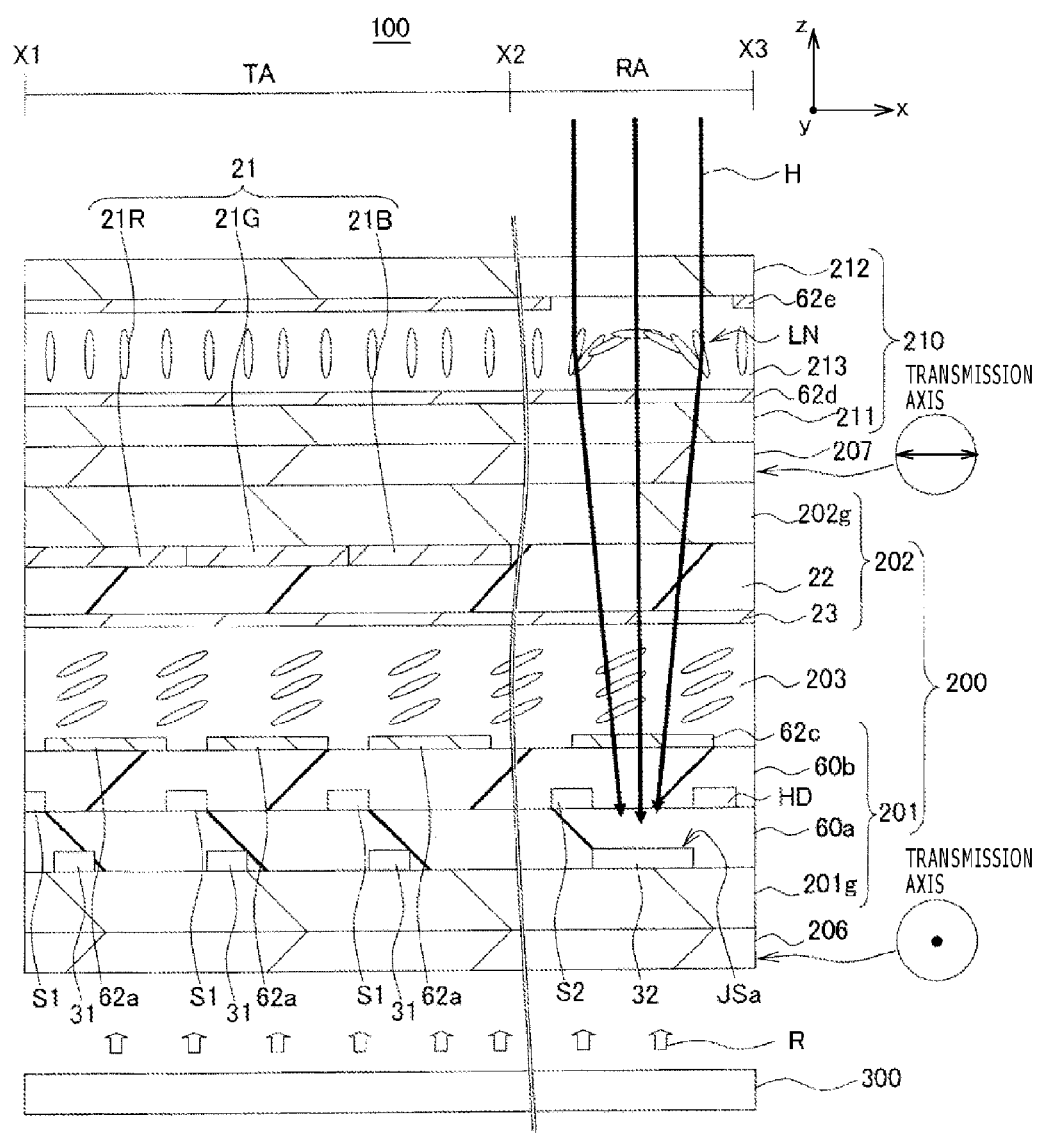
FIG. 9 is a sectional view illustrating a manner when a photo-sensor element 32 in the liquid crystal display apparatus generates reception light data in the embodiment 1.

FIG. 9 is a sectional view illustrating a manner when the photo-sensor element 32 in the liquid crystal display apparatus 100 generates reception light data in embodiment 1.

In the present embodiment, a voltage is applied to the liquid crystal layer 213 between the first transparent electrode 62d and the second transparent electrode 62e in the light amount adjustment section 210 to place the liquid crystal layer 213 into a state in which a portion of the liquid crystal layer 213 corresponding to the sensor region RA is caused to function as a liquid crystal lens LN as illustrated in FIG. 9. In short, the light amount adjustment section 210 forms the liquid crystal lens LN which is a refractive index distribution type lens. Here, a focus of the liquid crystal lens LN in the light amount adjustment section 210 is placed into a state in which, for example, it is adjusted to the center of the light receiving region JSa of the photo-sensor element 32.

In particular, a potential difference is generated between the first transparent electrode 62d and the second transparent electrode 62e. By this, while the central portion of the opening TK of the second transparent electrode 62e is placed into a state in which the liquid crystal molecules do not rotate and the orientation direction is maintained and consequently the phase difference is great, the amount of rotation of the liquid crystal molecules increases and the phase difference decreases from the central portion toward an end portion of the opening TK.

The liquid crystal lens LN which is a refractive index distribution type lens has polarization dependency. Therefore, in the present embodiment, where the direction of the refractive index difference distribution in the liquid crystal lens LN runs along the x direction, the incident light H introduced into the liquid crystal lens LN is transmitted as polarized light oscillating in the x direction to the second polarizing plate 207 as shown in FIG. 9.

As shown in FIG. 9, the second polarizing plate 207 is disposed such that the transmission axis thereof runs along the x direction. Therefore, in the present embodiment, the incident light H can be condensed on the light receiving region JSa of the photo-sensor element 32 as described above.

And, as described above, the incident light H condensed from the front face side of the liquid crystal panel 200 on the photo-sensor element 32 is received at the light receiving region JSa by the photo-sensor element 32 and photoelectrically converted to generate reception light data.

FIG. 10 is a top plan view illustrating a relationship between the liquid crystal lens LN formed on the liquid crystal layer 213 and the second polarizing plate 207 in embodiment 1.

As shown in FIG. 10, the liquid crystal lens LN includes a portion at which the direction KD of the refractive index difference distribution is same as the x direction. Further, as shown in FIG. 10, a transmission axis TJ of the second polarizing plate 207 runs along the x direction. In this manner, the second polarizing plate 207 includes a portion at which the direction KD of the refractive index difference distribution in the liquid crystal lens LN and the direction of the transmission axis TJ of the second polarizing plate 207 coincide with each other. Therefore, the incident light H (visible ray) transmitted as polarized light through the liquid crystal lens is transmitted through the second polarizing plate 207. Accordingly, the incident light H can be condensed on the light receiving region JSa of the photo-sensor element 32. It is to be noted that, in FIG. 10, where the direction KD of the refractive index difference distribution in the liquid crystal lens LN and the direction of the transmission axis TJ of the second polarizing plate 207 do not coincide with each other, the light transmitted through the liquid crystal lens LN is introduced to the light receiving region JSa without being condensed so that reception light data is generated.

Then, as illustrated in FIG. 8, it is decided whether or not the reception light data is within a range of a reference value (S21).

Here, the control section 401 decides whether or not the value of the reception light data generated by the photo-sensor element 32 is higher than the reference value.

In the present embodiment, for example, where the value of the reception light data generated by the photo-sensor element 32 is equal to an upper limit value of a dynamic range, it is decided that the value of the reception light data is out of the range of the reference value. However, where the value of the reception light data is not equal to the upper limit value, the control section 401 decides that the value of the reception light data is within the range of the reference value.

And, as illustrated in FIG. 8, where the reception light data is within the range of the reference value (Yes), detection of the position is carried out (S51). Detailed contents of the present step are hereinafter described.

On the other hand, as illustrated in FIG. 8, where the reception light data is not within the range of the reference value (No), adjustment of the light amount is carried out (S31).

Here, the control section 401 supplies a control signal to the light amount adjustment section 210 to control operation of the light amount adjustment section 210.

In the present embodiment, the control section 401 adjusts operation of the light amount adjustment section 210 so that the amount of the incident light H to be introduced to the photo-sensor element is reduced.

For example, the control section 401 adjusts operation of the light amount adjustment section 210 so that the light amount adjustment section 210 is placed into a state in which a potential difference distribution is eliminated between the first transparent electrode 62d and the second transparent electrode 62e. Consequently, the incident light H entering from the front face side of the liquid crystal panel 200 is introduced into the photo-sensor element 32 without being condensed.

In short, the focus of the liquid crystal lens of the light amount adjustment section 210 is placed into a state in which it is not adjusted to the light receiving region JSa of the photo-sensor element 32 to allow the incident light H from the front face side of the liquid crystal panel 200 toward the photo-sensor element 32 to be introduced to the light receiving region JSa of the photo-sensor element 32.

It is to be noted that the focal length of the liquid crystal lens may be varied among a plurality of stages based on the reception light data. For example, a lookup table in which values of the reception light data and values of the voltage to be applied to the liquid crystal layer 213 when reception light data is acquired are associated with each other is stored in advance in a storage medium. Then, the control section 401 extracts a voltage value corresponding to the value of the reception light data acquired as described above from the lookup table and carries out control so that a voltage is applied with the extracted voltage value to the liquid crystal layer 213.

Then, acquisition of reception light data is carried out as illustrated in FIG. 8 (S41).

Here, the photo-sensor element 32 provided in the sensor region RA in the liquid crystal panel 200 receives the incident light H to generate reception light data.

In the present embodiment, the light amount adjustment section 210 eliminates the potential difference distribution between the first transparent electrode 62d and the second transparent electrode 62e to establish the state in which the incident light H entering from the front face side of the liquid crystal panel 200 is not condensed as described hereinabove. And, in this state, the photo-sensor element 32 receives the incident light H at the light receiving region JSa thereof to generate reception light data.

Then, detection of the position is carried out as illustrated in FIG. 8 (S51).

Here, the position detection section 402 detects the position in the pixel region PA at which a detection object body contacts with or is positioned closely to the pixel region PA based on the reception light data collected from the plural photo-sensor elements 32 provided on the liquid crystal panel 200 in such a manner as described above. For example, the position detection section 402 detects a coordinate position at which the signal intensity of the reception light data is higher than the reference value as the coordinate position at which a detection object body touches with the pixel region PA.

Then, image display is carried out as illustrated in FIG. 8 (S61).

Here, image display is carried out in the state in which the light amount adjustment section 210 eliminates the potential difference distribution between the first transparent electrode 62d and the second transparent electrode 62e so that the incident light H entering from the front face side of the 200 is not condensed.

By time-divisionally carrying out image pickup of collecting reception light data and image display of displaying an image in this manner, the present embodiment can carry out condensation of light with a higher efficiency.

(E) Summary

As described above, in the present embodiment, the photo-sensor element 32 which receives incident light H at the light receiving region JSa thereof to generate reception light data is provided in the pixel region PA in which an image is displayed on the liquid crystal panel 200. And, the light amount adjustment section 210 for adjusting the amount of light to be introduced into the light receiving region JSa of the photo-sensor element 32 is disposed in an opposing relationship to the liquid crystal panel 200, and operation of the light amount adjustment section 210 is controlled by the control section 401. Here, the control section 401 controls operation of the light amount adjustment section 210 based on the reception light data generated by the photo-sensor element 32. In particular, the light amount adjustment section 210 includes a liquid crystal lens and applies a voltage to the liquid crystal which configures the liquid crystal lens to vary the orientation direction of liquid crystal molecules thereby to vary the focal length of the liquid crystal lens to adjust the amount of light to be introduced into the light receiving region JSa of the photo-sensor element 32. For example, where the value of the reception light data generated by the photo-sensor element 32 is equal to the upper limit value of the dynamic range, the light amount adjustment section 210 carries out adjustment so that the amount of the incident light H to be introduced to the photo-sensor element 32 may decrease.

Accordingly, the present embodiment can assure a dynamic range of the photo-sensor element 32. Further, in the present embodiment, since there is no necessity to provide a plurality of kinds of photo-sensor elements 32 in order to assure the dynamic range, drop of the light transmission factor does not occur. Therefore, the present embodiment can improve the image quality.

Further, in the present embodiment, the opening TK of the second transparent electrode 62e is formed such that it has an area greater than the area of the light receiving region JSa of the photo-sensor element 32 as shown in FIG. 7. In the present embodiment, by the formation of the opening TK, the liquid crystal lens is provided such that the size thereof is greater than the light receiving region JSa of the photo-sensor element 32 in the sensor region RA. In short, in the present embodiment, the liquid crystal lens size is greater than the size of an active region of the photo-sensor element 32. Therefore, the present embodiment has an effect that light can be condensed effectively.

Further, in the present embodiment, a liquid crystal lens which is a refractive index distribution type lens which does not utilize refraction at the surface thereof is used to condense the incident light H on the light receiving region JSa of the photo-sensor element 32. Where a lens such as a spherical lens which utilizes refraction at the surface thereof is used, incident light is sometimes reflected regularly on the surface of the lens, and this deteriorates the visibility. However, in the present embodiment, since the liquid crystal lens having a flat surface is used, appearance of the fault just described can be suppressed. Further, since the liquid crystal lens has polarization dependency, it does not have a bad influence on display light which is polarized light, and deterioration of the image quality on the liquid crystal panel can be prevented.

(F) Others

It is to be noted that, while, in the present embodiment, the opening TK of the second transparent electrode 62e is formed in a circular shape, the present invention is not limited to this.

Figure 11:
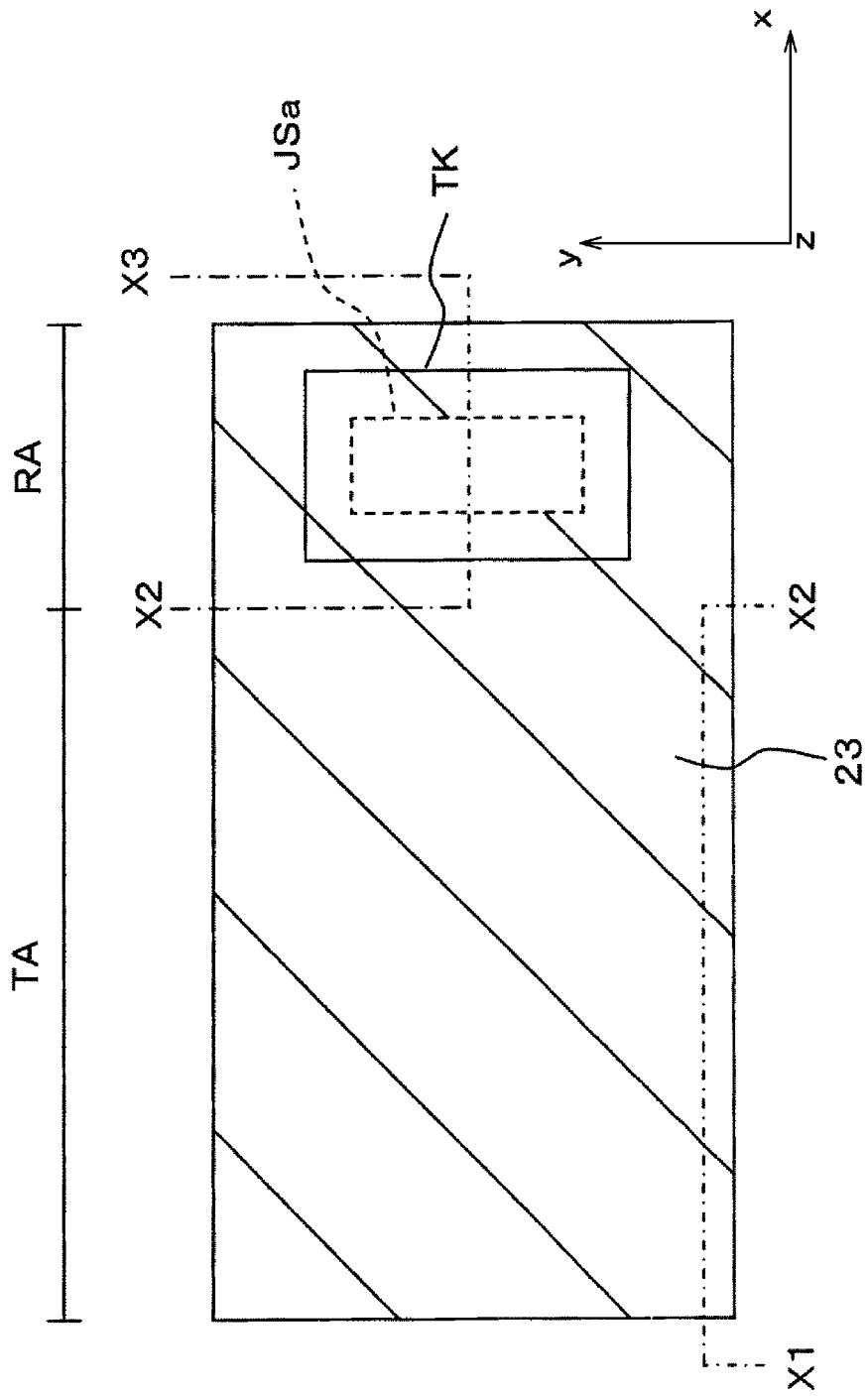
FIG. 11 is a plan view showing a modification to the second transparent electrode in the embodiment 1.

FIG. 11 is a plan view showing a modification to the second transparent electrode 62e in the embodiment 1.

The opening TK of the second transparent electrode 62e may be formed in a rectangular shape as shown in FIG. 11. In this instance, the liquid crystal lens described above can be made function as a cylindrical lens. In this instance, where the direction of the refractive index difference distribution of the liquid crystal lens coincides with the x direction, the transmission axis of the second polarizing plate 207 is disposed so as to run along the x direction similarly as described hereinabove. By this, the incident light H can be condensed on the light receiving region JSa of the photo-sensor element 32.

<2. Embodiment 2 (In the Case of an Externally Provided Liquid Crystal Lens)>

In the following, an embodiment 2 is described.

(A) Configuration and so Forth of the Liquid Crystal Display Apparatus

Figure 12:
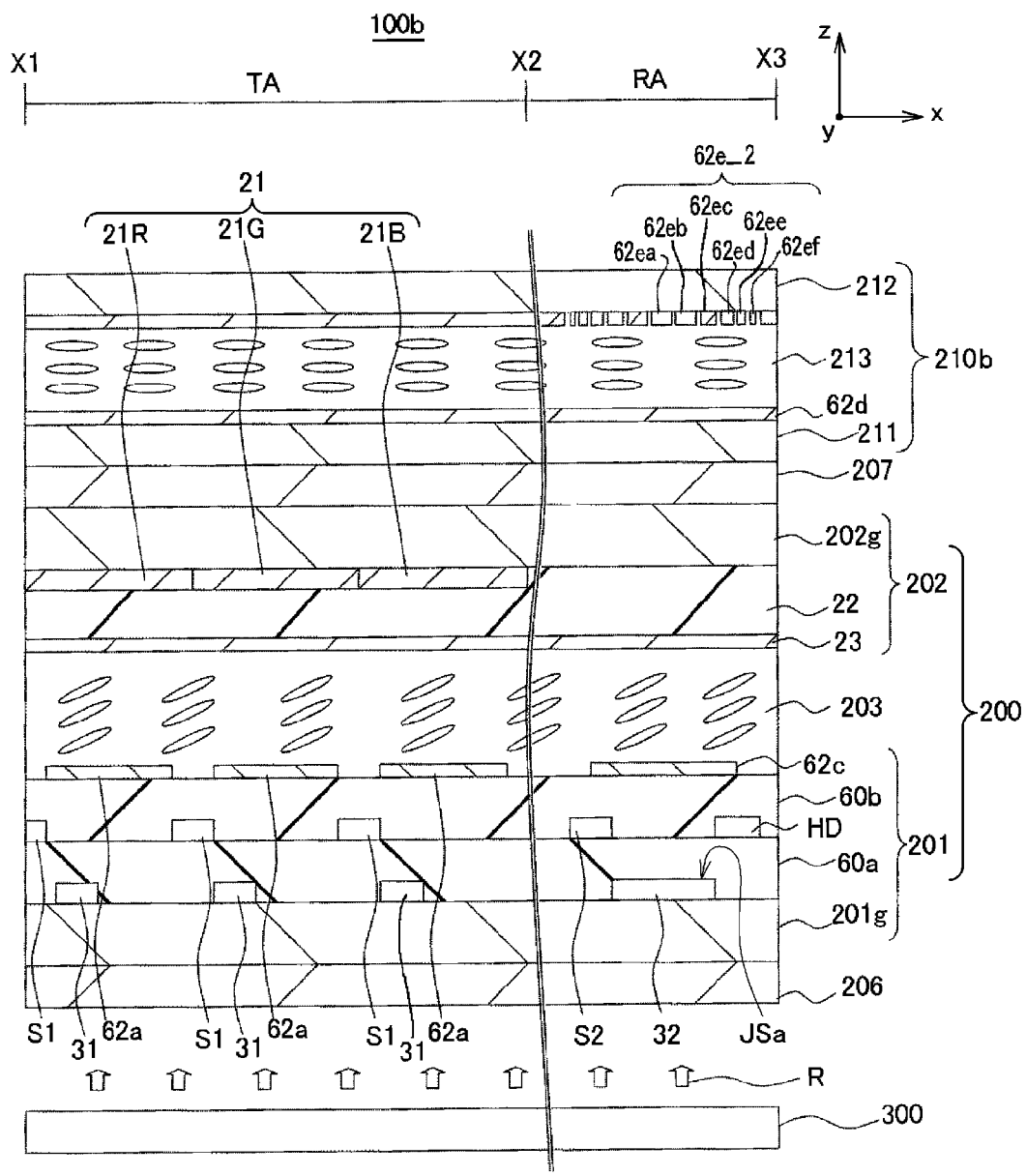
FIG. 12 is a sectional view showing, in an enlarged scale, essential part of a liquid crystal display apparatus in an embodiment 2.

FIG. 12 is a sectional view showing, in an enlarged scale, essential part of the liquid crystal display apparatus 100b in embodiment 2. In FIG. 12, a portion corresponding to pixels P provided in a pixel region PA is shown.

As shown in FIG. 12, the present embodiment is different from embodiment 1 in a second transparent electrode 62e_2 of a light amount adjustment section 210b. Except this, the present embodiment is similar to embodiment 1. Therefore, description of overlapping portions is omitted.

As shown in FIG. 12, the second transparent electrode 62e_2 of the light amount adjustment section 210b is formed in such a manner as to cover a face of the second glass substrate 212 on the side opposing to the first glass substrate 211 similarly as in the case of the embodiment 1.

Here, however, a portion of the photo-sensor element 32 including a region corresponding to the light receiving region JSa of the photo-sensor element 32 in the sensor region RA is different from that of the embodiment 1 and has a plurality of transparent electrodes 62ea, 62eb, 62ec, 62ed, 62ee and 62ef formed in a spaced relationship from each other thereon.

Figure 13:
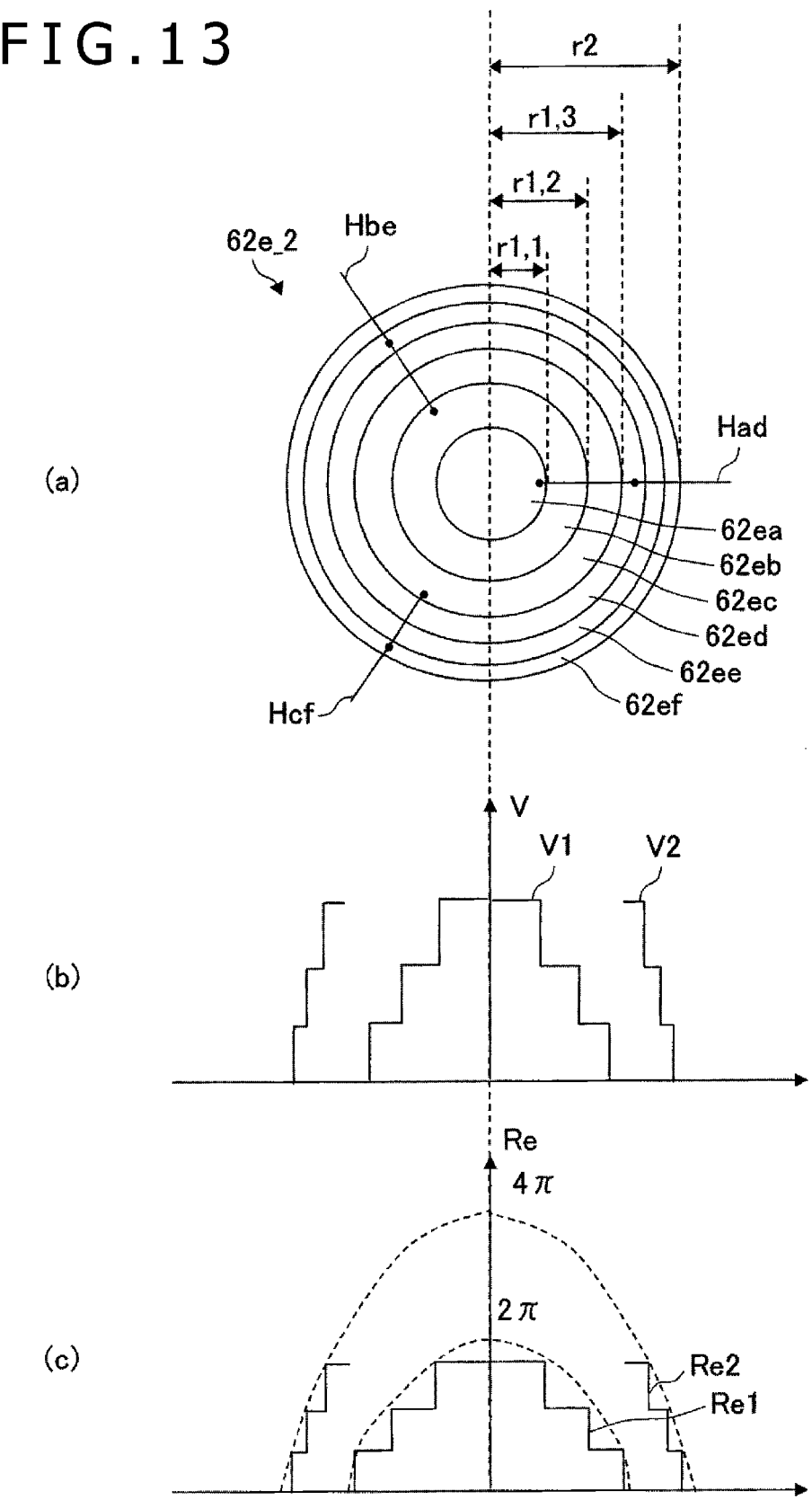
FIG. 13 is views showing a portion of a second transparent electrode formed in a sensor region including a region corresponding to a light receiving region of a photo-sensor element in the embodiment 2.

FIG. 13 is views showing the portion of the second transparent electrode 62e_2 formed in the sensor region RA including the region corresponding to the light receiving region JSa of the photo-sensor element 32 in embodiment 2.

Referring to FIG. 13, (a) is a plan view. Meanwhile, (b) illustrates a distribution of the voltage V applied to the liquid crystal layer 213 sandwiched between the second transparent electrode 62e_2 and the first transparent electrode 62d in an associated relationship with the second transparent electrode 62e_2. And, (c) illustrates a distribution of the phase difference Re obtained from the liquid crystal layer 213 when the voltage V is applied as illustrated in (b) in an associated relationship with the second transparent electrode 62e_2.

As shown in (a) of FIG. 13, among the plural transparent electrodes 62ea, 62eb, 62ec, 62ed, 62ee and 62ef which configure the second transparent electrode 62e_2 of the light amount adjustment section 210b, the transparent electrode 62ea of a circular shape is provided at the center. Then, the plural transparent electrodes 62eb, 62ec, 62ed, 62ee and 62ef are formed so as to describe circles around the transparent electrode 62ea. The plural transparent electrodes 62eb, 62ec, 62ed, 62ee and 62ef formed so as to describe circles are formed such that the radius successively increases from the center toward the periphery around the circular transparent electrode 62ea at the center. In the present embodiment, the lines describing the circles are formed such that the width thereof successively decreases from the center toward the periphery.

And, as shown in (a) of FIG. 13. a plurality of wiring lines Had, Hbe and Hcf are connected to the plural transparent electrodes 62ea, 62eb, 62ec, 62ed, 62ee and 62ef described above.

Here, as shown in (a) of FIG. 13, the wiring line Had is formed so as to electrically connect the transparent electrode 62ea at the center and the transparent electrode 62ed formed fourthly from the center toward the periphery. And, the wiring line Hbe is formed so as to electrically connect the transparent electrode 62eb formed secondly from the center toward the periphery and the transparent electrode 62ee formed fifthly. And, the wiring line Hcf is formed so as to electrically connect the transparent electrode 62ec formed thirdly from the center toward the periphery and the transparent electrode 62ef formed sixthly.

Although the wiring lines Had, Hbe and Hcf are not shown in FIG. 12, they are provided on a face of the second glass substrate 212 on the side opposing to the first glass substrate 211. And, the wiring lines Had, Hbe and Hcf are covered with an interlayer insulating film (not shown), and the second transparent electrode 62e_2 is formed on the interlayer insulating film. It is to be noted that, in (a) of FIG. 13, the plural wiring lines Had, Hbe and Hcf are indicated by straight lines, and contacts at which they are connected to the plural transparent electrodes 62ea, 62eb, 62ec, 62ed, 62ee and 62ef are indicated by points.

The plural transparent electrodes 62ea, 62eb, 62ec, 62ed, 62ee and 62ef which configure this second transparent electrode 62e_2 are formed so as to satisfy the relationships of expressions (1) and (2) given below. By the configuration just described, in the present embodiment, it is possible to cause the liquid crystal layer 213 sandwiched between them and the first transparent electrode 62d to function as liquid crystal lenses of a Fresnel lens.

[Expression 1]

$$r_m = \sqrt{2m\lambda f} \quad m=1, 2, \ldots, M \quad (1)$$

[Expression 2]

$$r_{m,n} = \sqrt{2[(m-1)+n/L]\lambda f} \quad n=1, 2 \ldots L \quad (2)$$

It is to be noted that, in the expressions (1) and (2) given above, r is a Fresnel zone; λ is the wavelength of incident light; f is the focal length of the liquid crystal lenses; M is the Fresnel zone number; and L is the division number of the Fresnel zones.

In the present embodiment, as shown in (a) of FIG. 13, M=2 and L=3. And, the plural transparent electrodes 62ea, 62eb, 62ec, 62ed, 62ee and 62ef are formed such that r thereof corresponds to the distances from the center of the circles to outside end portions thereof.

And, to the liquid crystal layer 213 sandwiched between the plural transparent electrodes 62ea, 62eb, 62ec, 62ed, 62ee and 62ef which configure the second transparent electrode 62e_2 and the first transparent electrode 62d, a voltage V is applied as illustrated in (b) of FIG. 13. Consequently, a phase difference Re is generated in the liquid crystal layer 213 as illustrated in (c) of FIG. 13.

In particular, by applying a voltage to the liquid crystal layer 213 as indicated as a first voltage distribution V1 in (b) of FIG. 13, a first phase difference distribution Re1 illustrated in (c) of FIG. 13 can be obtained. Further, by applying a voltage to the liquid crystal layer 213 as indicated as a second voltage distribution V2 in (b) of FIG. 13, a second phase difference distribution Re2 in (c) of FIG. 13 can be obtained. Therefore, by carrying out voltage application of the first voltage distribution V1 and voltage application of the second voltage distribution V2 simultaneously, it is possible to cause the liquid crystal to function as a lens of a convex shape as indicated by a broken line in the form of a parabola in (c) of FIG. 13.

(B) Summary

Therefore, in the present embodiment, since the light amount adjustment section 210b can function as a Fresnel lens whose focal length can be varied in response to a voltage, it is possible to vary the amount of light to be introduced into the light receiving region JSa of the photo-sensor element 32. It is to be noted that, if the light amount exceeds the dynamic range of the photo-sensor element 32, the light amount adjustment section 210b is adjusted so that it may not exhibit the function as a lens. For example, to the fourth transparent electrode 62ed and the fifth transparent electrode 62ee from the inner side among the plural transparent electrodes 62ea, 62eb, 62ec, 62ed, 62ee and 62ef, an equal potential is applied.

Accordingly, in the present embodiment, the dynamic range of the photo-sensor element 32 can be assured similarly as in the embodiment 1.

(C) Others

It is to be noted that the pattern of the portion of the second transparent electrode 62e_2 formed in the sensor region RA including the region corresponding to the light receiving region JSa of the photo-sensor element 32 is not limited to that described hereinabove.

Figure 14:
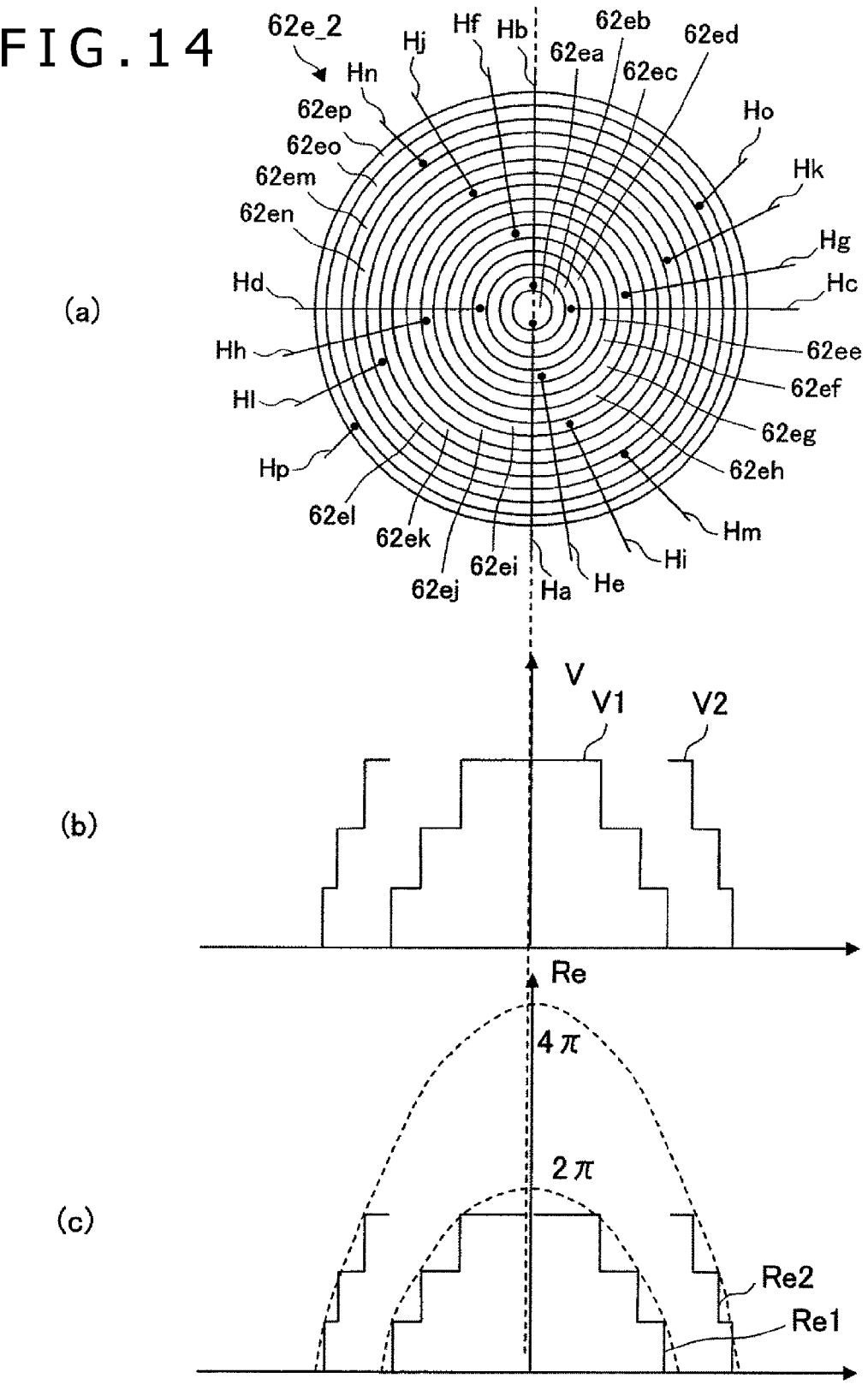
FIG. 14 is views showing a portion of the second transparent electrode formed in the sensor region including the region corresponding to the light receiving region of the photo-sensor element in a modification to the embodiment 2.

FIG. 14 is views showing a portion of the second transparent electrode 62e_2 formed in the sensor region RA including the region corresponding to the light receiving region JSa of the photo-sensor element 32 in a modification to embodiment 2.

Referring to FIG. 14, (a) is a plan view. Meanwhile, (b) illustrates a distribution of the voltage V applied to the liquid crystal layer 213 sandwiched between the second transparent electrode 62e_2 and the first transparent electrode 62d in an associated relationship with the second transparent electrode 62e_2. And, (c) illustrates a distribution of the phase difference Re obtained on the liquid crystal layer 213 when the voltage V is applied as illustrated in FIG. (b) in an associated relationship with the second transparent electrode 62e_2.

As shown in (a) of FIG. 14, the second transparent electrode 62e_2 of the light amount adjustment section 210b includes a plurality of transparent electrodes 62ea to 62ep successively formed in spaced relationship from each other from the center. Among the plural transparent electrodes 62ea to 62ep, the transparent electrode 62ea of a circular shape is provided at the center, and the plural transparent electrodes 62eb to 62ep are formed in such a manner as to describe circles around the transparent electrode 62ea. The plural transparent electrodes 62eb to 62ep formed so as to describe circles are formed such that the radius successively increases from the center toward the periphery around the circular transparent electrode 62ea at the center. And, the lines describing the circles are formed such that the widths thereof are very small and equal to each other.

And, wiring lines Ha to Hp are electrically connected independently of each other to the plural transparent electrodes 62ea to 62ep, respectively.

And, a voltage V is applied as illustrated in (b) of FIG. 14 between the plural transparent electrodes 62ea to 62ep which configure the second transparent electrode 62e_2 and the first transparent electrode 62d. Consequently, a phase difference Re appears in the liquid crystal layer 213 as illustrated in (c) of FIG. 14.

Here, application of the voltage V is carried out similarly as in the case of the example described hereinabove with reference to FIG. 13.

Figure 15:
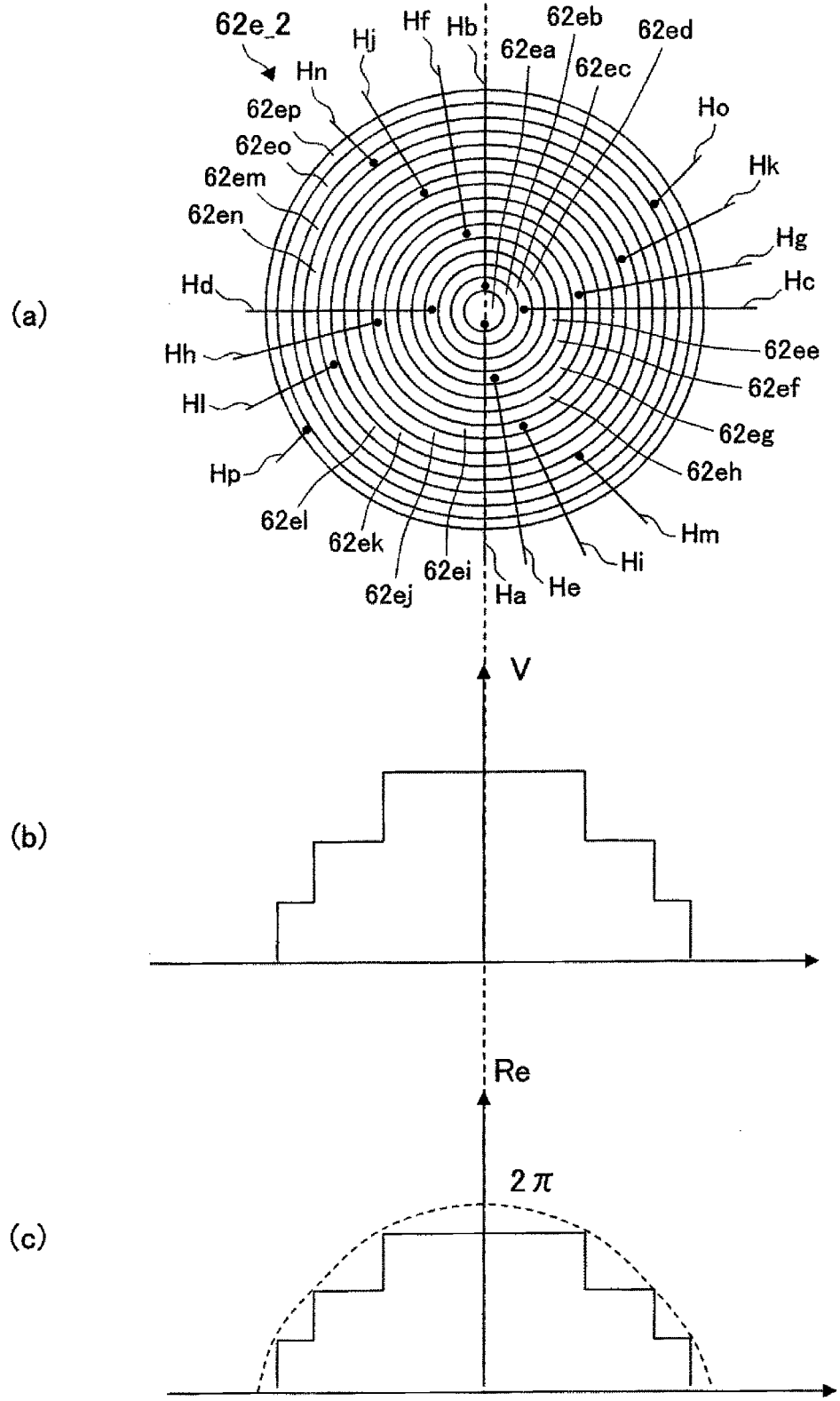
FIG. 15 is views showing a portion of the second transparent electrode formed in the sensor region including the region corresponding to the light receiving region of the photo-sensor element in another modification to the embodiment 2.

FIG. 15 is views illustrating a portion of the second transparent electrode 62e_2 formed in the sensor region RA including the region corresponding to the light receiving region JSa of the photo-sensor element 32 in another modification to embodiment 2.

Referring to FIG. 15, (a) is a plan view. Meanwhile, (b) illustrates a distribution of the voltage V applied to the liquid crystal layer 213 sandwiched between the second transparent electrode 62e_2 and the first transparent electrode 62d in an associated relationship with the second transparent electrode 62e_2. And, (c) illustrates a distribution of the phase difference Re obtained on the liquid crystal layer 213 when the voltage V is applied as illustrated in (b) in an associated relationship with the second transparent electrode 62e_2.

As shown in (a) of FIG. 15, the second transparent electrode 62e_2 of the light amount adjustment section 210b is formed similarly to the second transparent electrode 62e_2 shown in FIG. 14. In short, in the second transparent electrode 62e_2 of the light amount adjustment section 210b, a plurality of transparent electrodes 62ea to 62ep are formed in a successively spaced relationship from each other from the center.

And, a voltage V is applied as illustrated in (b) of FIG. 15 between the plural transparent electrodes 62ea to 62ep which configure the second transparent electrode 62e_2 and the first transparent electrode 62d. Consequently, as illustrated in (c) of FIG. 15, a phase difference Re is generated in the liquid crystal layer 213. Therefore, since the light amount adjustment section 210b can function as a Fresnel lens whose focal length can be varied in response to the voltage, the amount of light to be introduced into the light receiving region JSa of the photo-sensor element 32 can be varied.

FIG. 16 is views showing a portion of the second transparent electrode 62e_2 formed in the sensor region RA including the region corresponding to the light receiving region JSa of the photo-sensor element 32 in a further modification to embodiment 2.

Referring to FIG. 16, (a) is a plan view. Meanwhile, (b) illustrates a distribution of the voltage V applied to the liquid crystal layer 213 sandwiched between the second transparent electrode 62e_2 and the first transparent electrode 62d in an associated relationship with the second transparent electrode 62e_2. And, (c) illustrates a distribution of the phase difference Re obtained on the liquid crystal layer 213 when the voltage V is applied as illustrated in (b) in an associated relationship with the second transparent electrode 62e_2.

As illustrated in (a) of FIG. 16, the second transparent electrode 62e_2 includes a plurality of transparent electrodes 62ea, 62eb1, 62eb2, 62ec1, 62ec2, 62ed1, 62ed2, 62ee1, 62ee2, 62ef1 and 62ef2 formed in a spaced relationship from each other. Among the plural transparent electrodes 62ea, 62eb1, 62eb2, . . . , 62ef1 and 62ef2 which configure the second transparent electrode 62e_2, the transparent electrode 62ea extending like a stripe is provided at the center. And, the plural transparent electrodes 62eb1, 62eb2, 62ec1, 62ec2, 62ed1, 62ed2, 62ee1, 62ee2, 62ef1 and 62ef2 are formed so as to extend like stripes in such a manner as to sandwich the transparent electrode 62ea at the center between the opposite ends. The transparent electrodes 62eb1, 62eb2, 62ec1, . . . , 62e1 and 62ef2 are formed such that the line width successively decreases from the center toward the outer side at the opposite ends of the transparent electrode 62ea at the center.

And, as shown in (a) of FIG. 16, a plurality of wring lines Had1, Had2, Hbe1, Hbe2, Hcf1 and Hcf2 are connected to the plural transparent electrodes 62ea, 62eb1, 62eb2, . . . , 62ef1 and 62ef2.

Here, the wiring lines Had1 and Had2 are formed so as to electrically connect the transparent electrode 62ea at the center and the transparent electrodes 62ed1 and 62ed2 formed fourthly from the center toward the outer side as shown in FIG. 16. And, the wring lines Heb1 and Hbe2 are formed so as to electrically connect the transparent electrodes 62eb1 and 62eb2 formed secondly from the center toward the outer side and the transparent electrodes 62ee1 and 62ee2 formed fifthly to each other, respectively. And, the wring lines Hcf1 and Hcf2 are formed so as to electrically connect the transparent electrodes 62ec1 and 62ec2 formed thirdly from the center toward the outer side and the transparent electrodes 62ef1 and 62ef2 formed sixthly to each other. While those wiring lines Had1, Had2, Heb1, Hbe2, Hcf1 and Hcf2 are not shown in FIG. 12, they are provided on a face of the second glass substrate 212 on the side opposing to the first glass substrate 211. And, those wiring lines Had1, Had2, Heb1, Hbe2, Hcf1 and Hcf2 are covered with an interlayer insulating film (not shown), and the second transparent electrode 62e_2 is formed on the interlayer insulation film.

The transparent electrodes 62ea, 62eb1, 62eb2, 62ec1, 62ec2, 62d1, 62d2, 62ee1, 62ee2, 62ef1 and 62ef2 which configure the second transparent electrode 62e_2 are formed so as to satisfy the relationships of the expressions (1) and (2) given hereinabove. By such formation, the liquid crystal layer 213 sandwiched between the second transparent electrode 62e_2 and the first transparent electrode 62d can be caused to function as liquid crystal lenses of a Fresnel lens.

In the present embodiment, as shown in (a) of FIG. 16, M=2 and L=3. And, the individual portions are formed such that r thereof corresponds to the distances from the center axis to outer side end portions of the transparent electrodes 62ea, 62eb, 62ec, 62ed, 62ee and 62ef.

And, a voltage V is applied as illustrated in (b) of FIG. 16 between the transparent electrodes 62ea, 62eb, 62ec, 62ed, 62ee and 62ef which configure the second transparent electrode 62e_2 and the first transparent electrode 62d. Consequently, a phase difference Re is generated on the liquid crystal layer 213 as illustrated in (c) of FIG. 16.

Here, application of the voltage V is carried out similarly as in the case of the example described hereinabove with reference to FIG. 13.

In the example shown in FIG. 16, it is possible to cause a liquid crystal lens to function as a cylindrical lens, and the example has an advantage that the area of the light receiving region JSa in which the photo-sensor element 32 can receive light can be made great.

Figure 17:
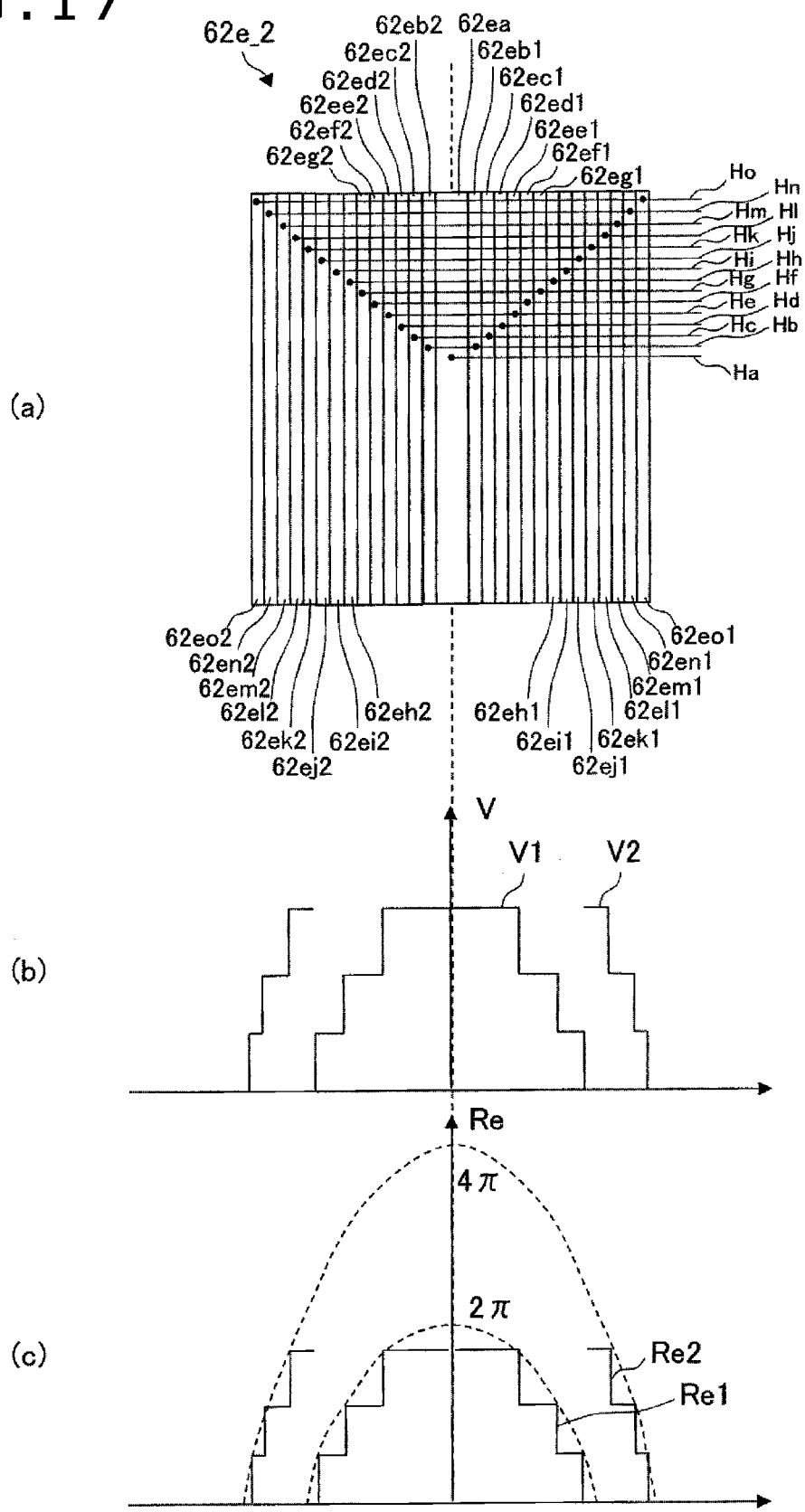
FIG. 17 is views showing a portion of the second transparent electrode formed in the sensor region including the region corresponding to the light receiving region of the photo-sensor element in a still further modification to the embodiment 2.

FIG. 17 is views showing a portion of the second transparent electrode 62e_2 formed in the sensor region RA including the region corresponding to the light receiving region JSa of the photo-sensor element 32 in a still further modification to embodiment 2.

Referring to FIG. 17, (a) is a plan view. Meanwhile, (b) illustrates a distribution of the voltage V applied to the liquid crystal layer 213 sandwiched between the second transparent electrode 62e_2 and the first transparent electrode 62d in an associated relationship with the second transparent electrode 62e_2. And, (c) illustrates a distribution of the phase difference Re obtained on the liquid crystal layer 213 when the voltage V is applied as illustrated in (b) in an associated relationship with the second transparent electrode 62e_2.

As illustrated in (a) of FIG. 17, the second transparent electrode 62e_2 includes a plurality of transparent electrodes 62ea, 62eb1, 62eb2, 62ec1, 62ec2, . . . , 62eo1 and 62eo2 formed in a spaced relationship from each other. Among the plural transparent electrodes 62ea, 62eb1, 62eb2, 62ec1, 62ec2, . . . , 62eo1 and 62eo2, the transparent electrode 62ea extending like a stripe is provided at the center. And, the plural transparent electrodes 62eb1, 62eb2, 62ec1, 62ec2, . . . , 62eo1 and 62eo2 are formed so as to extend like stripes in such a manner as to sandwich the transparent electrode 62ea at the center between the opposite ends. The plural transparent electrodes 62eb1, 62eb2, 62ec1, 62ec2, . . . , 62eo1 and 62eo2 formed like stripes are formed such that line widths are very small and equal to each other at the opposite ends of the transparent electrode 62ea at the center.

And, as shown in (a) of FIG. 17, a plurality of wiring lines Ha, Hb, Hc, . . . , Ho are connected to the plural transparent electrodes 62ea, 62eb1, 62eb2, 62ec1, 62ec2, . . . , 62eo1 and 62eo2.

Here, the wiring line Ha is formed on the transparent electrode 62ea at the center. And, the wiring line Hb is formed so as to electrically connect the transparent electrodes 62eb1 and 62eb2 formed firstly from the transparent electrode 62ea at the center toward the outer side to each other. And, the wiring line Hc is formed so as to electrically connect the transparent electrodes 62ec1 and 62ec2 formed secondly from the transparent electrode 62ea at the center toward the outer side to each other. And, the wiring lines Hd, . . . , Ho are formed similarly. And, those wiring lines Ha, Hb, Hc, . . . , Ho are covered with an interlayer insulating film (not shown), and the second transparent electrode 62e_2 is formed on the interlayer insulation film.

And, the voltage V is applied as illustrated in (b) of FIG. 17 between the plural transparent electrodes 62ea to 62eo which configure the second transparent electrode 62e_2 and the first transparent electrode 62d. Consequently, a phase difference Re is generated on the liquid crystal layer 213 as illustrated in (c) of FIG. 17.

Here, the application of the voltage V is carried out in a similar manner as in the case of the example described hereinabove with reference to FIG. 16.

Figure 18:
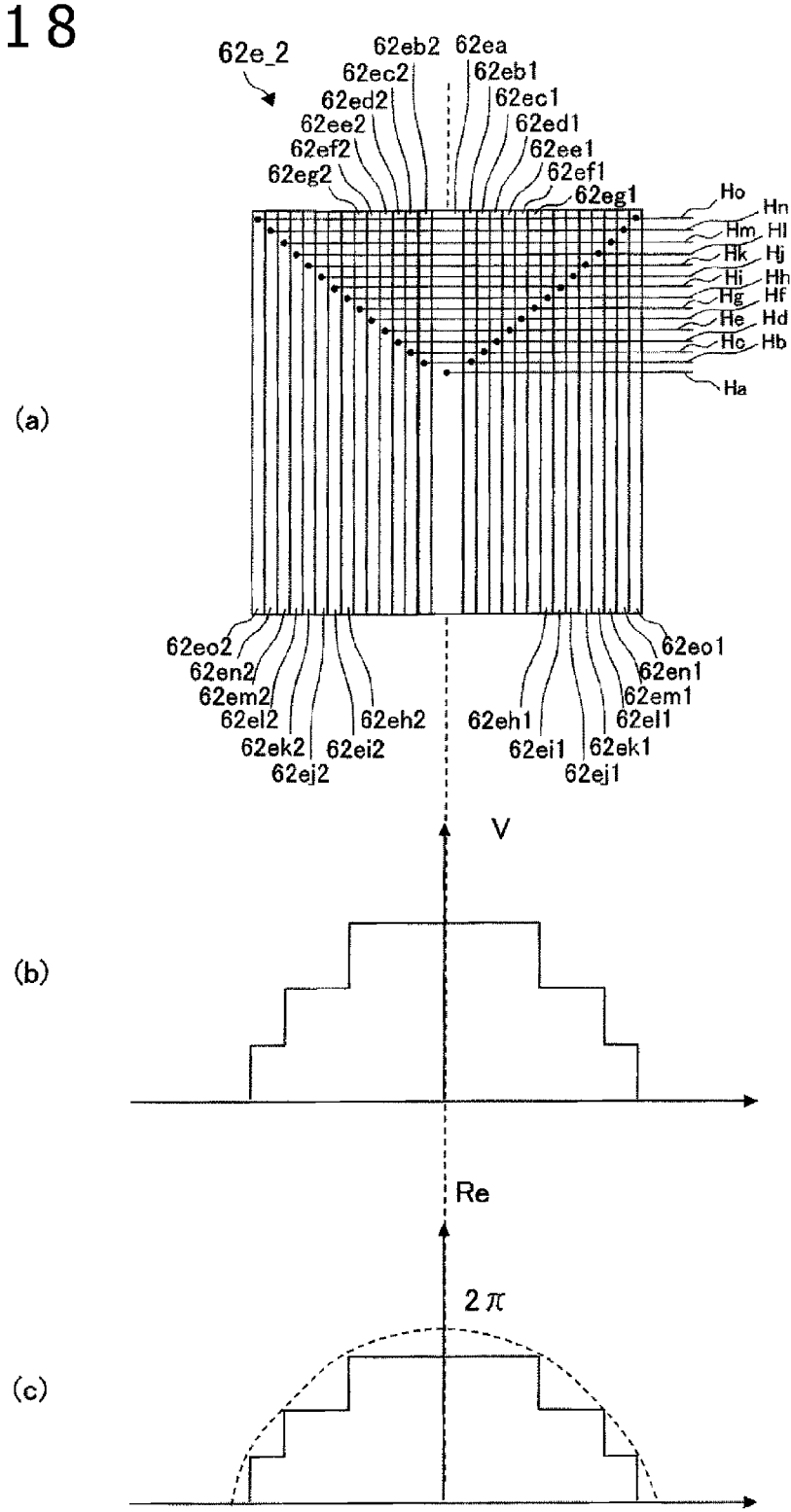
FIG. 18 is views showing a portion of the second transparent electrode formed in the sensor region including the region corresponding to the light receiving region of the photo-sensor element in a yet modification to the embodiment 2.

FIG. 18 is views showing a portion of the second transparent electrode 62e_2 formed in the sensor region RA including the region corresponding to the light receiving region JSa of the photo-sensor element 32 in a yet further modification to embodiment 2.

Referring to FIG. 18, (a) is a plan view. Meanwhile, (b) illustrates a distribution of the voltage V applied to the liquid crystal layer 213 sandwiched between the second transparent electrode 62e_2 and the first transparent electrode 62d in an associated relationship with the second transparent electrode 62e_2. And, (c) illustrates a distribution of the phase difference Re obtained on the liquid crystal layer 213 when the voltage V is applied as illustrated in (b) in an associated relationship with the second transparent electrode 62e_2.

As illustrated in (a) of FIG. 18, the second transparent electrode 62e_2 of the light amount adjustment section 210b is formed similarly to the second transparent electrode 62e_2 shown in FIG. 17.

And, the voltage V is applied as illustrated in (b) of FIG. 18 between the plural transparent electrodes 62ea to 62eo which configure the second transparent electrode 62e_2 and the first transparent electrode 62d. Consequently, a phase difference Re is generated on the liquid crystal layer 213 as illustrated in (c) of FIG. 18.

It is to be noted that, in the present embodiment described above, the liquid crystal layer 213 can be used irrespective of whether $\Delta \in$ is in the positive or the negative. However, in order to carry out reverse driving, $\Delta \in < 0$ is preferable because the range of the phase difference appearing in response to the applied voltage is comparatively great.

<3. Embodiment 3 (In the Case of an Externally Provided Liquid Crystal Lens)>

In the following, an embodiment 3 is described.

(A) Configuration and so Forth of the Liquid Crystal Display Apparatus

Figure 19:
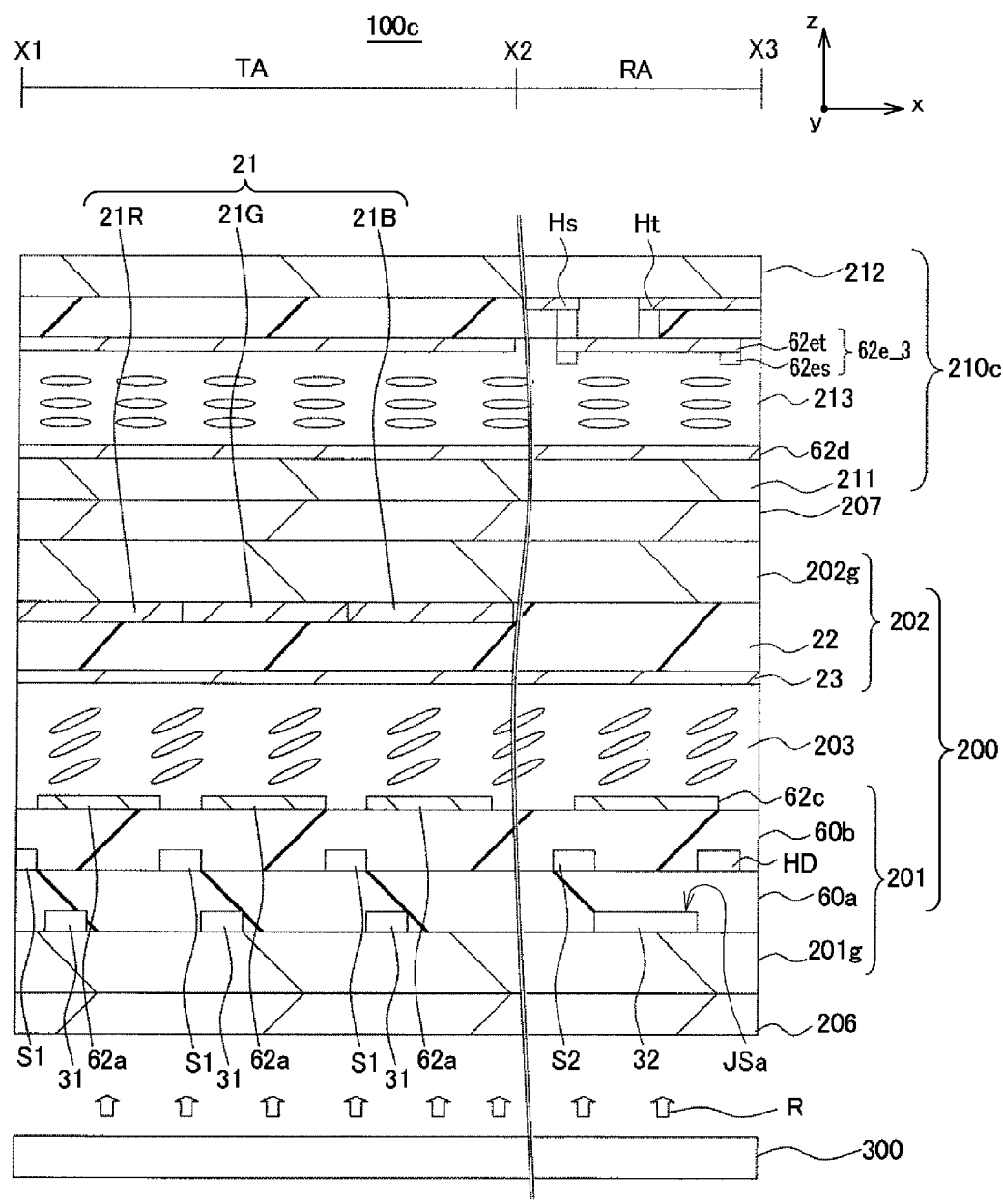
FIG. 19 is a sectional view showing essential part of a liquid crystal display apparatus in an embodiment 3.

FIG. 19 is a sectional view showing essential part of the liquid crystal display apparatus 100c in the embodiment 3 in an enlarged scale. In FIG. 19, a portion corresponding to pixels P provided in a pixel region PA is shown.

As shown in FIG. 19, the present embodiment is different from embodiment 1 in a second transparent electrode 62e_3 of a light amount adjustment section 210c. Except this, the present embodiment is similar to the embodiment 1. Therefore, description of overlapping portions is omitted.

As shown in FIG. 19, the second transparent electrode 62e_3 of the light amount adjustment section 210c is formed in such a manner as to cover a face of the second glass substrate 212 on the side opposing to the first glass substrate 211 similarly as in the case of the embodiment 1.

However, in the present embodiment, as shown in FIG. 19, a portion of the photo-sensor element 32 including a region corresponding to the light receiving region JSa of the photo-sensor element 32 in the sensor region RA is different from that of the embodiment 1 and has a bottom portion 62et and a side wall portion 62es formed thereon.

Figure 20:
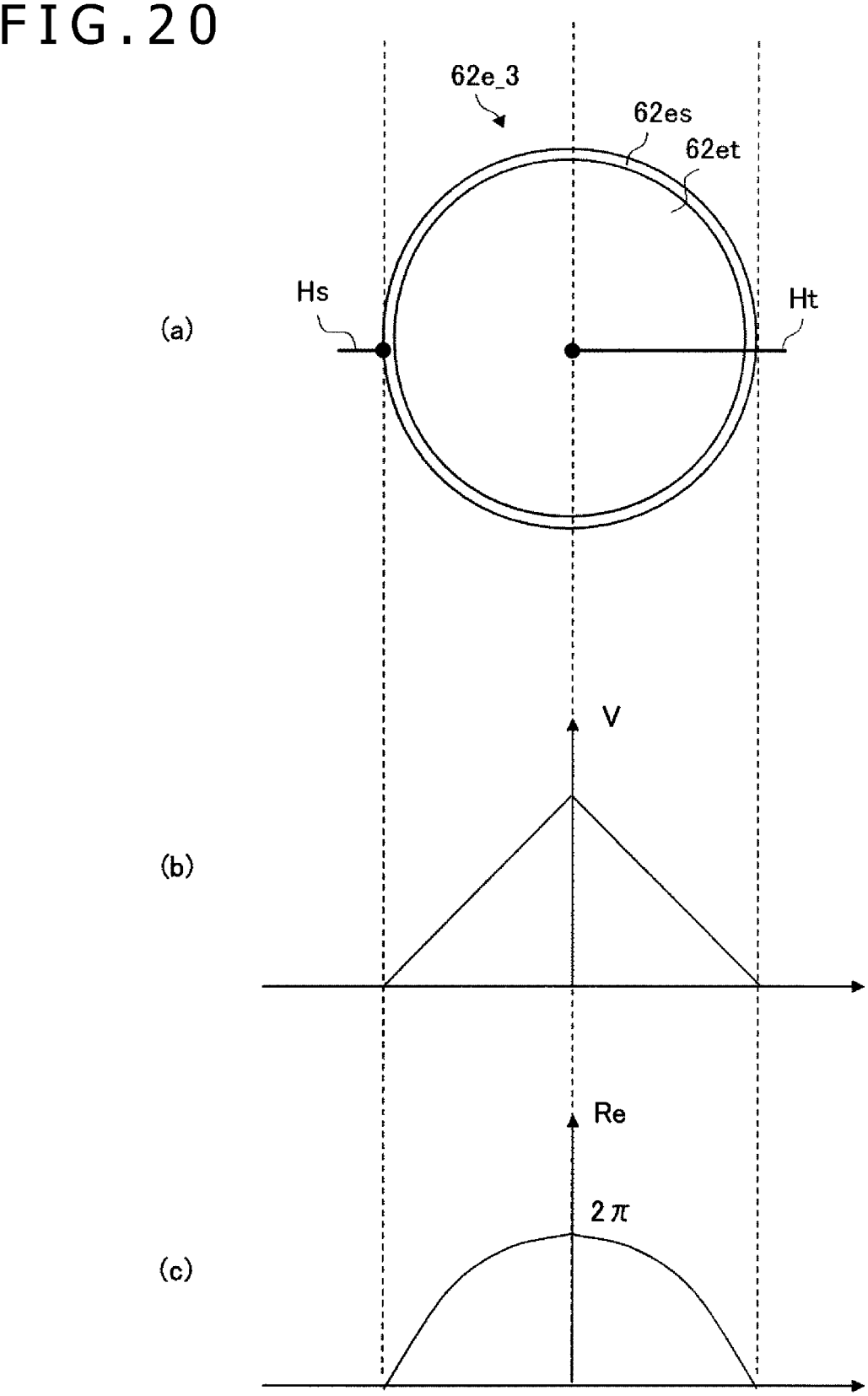
FIG. 20 is views showing a portion of the second transparent electrode formed in the sensor region including the region corresponding to the light receiving region of the photo-sensor element in the embodiment 2.

FIG. 20 is views showing the portion of the second transparent electrode 62e_3 formed in the sensor region RA including the region corresponding to the light receiving region JSa of the photo-sensor element 32 in embodiment 2.

Referring to FIG. 20, (a) is a plan view. Meanwhile, (b) illustrates a distribution of the voltage V applied to the liquid crystal layer 213 sandwiched between the second transparent electrode 62e_3 and the first transparent electrode 62d in an associated relationship with the second transparent electrode 62e_3. And, (c) illustrates a distribution of the phase difference Re obtained from the liquid crystal layer 213 when the voltage V is applied to the liquid crystal layer 213 sandwiched between the second transparent electrode 62e_3 and the first transparent electrode 62d as illustrated in (b) in an associated relationship with the second transparent electrode 62e_3.

As shown in (a) of FIG. 20, the bottom portion 62et which configures the second transparent electrode 62e_3 is formed in the form of a disk. Here, the bottom portion 62et is formed as a disk centered at the center of the light receiving region JSa of the photo-sensor element 32.

And, the side wall portion 62es is provided in such a manner as to describe a circle on and surround the periphery of the bottom portion 62et as shown in FIG. 19 and (a) of FIG. 20, and is formed in such a manner as to project from the face of the bottom portion 62et as shown in FIG. 19.

And, as shown in FIG. 19 and (a) of FIG. 20, a wiring line Ht is connected to the bottom portion 62et. Meanwhile, another wiring line Hs is connected to the side wall portion 62es. And, as shown in FIG. 19, the wiring lines Ht and Hs are provided on a face of the second glass substrate 212 on the side opposing to the first glass substrate 211 and is covered with an interlayer insulating film Sz, and the second transparent electrode 62e described hereinabove is formed on the interlayer insulating film Sz.

And, the voltage V is applied as illustrated in (b) of FIG. 20 to the liquid crystal layer 213 sandwiched between the second transparent electrode 62e_3 and the first transparent electrode 62d. Consequently, a phase difference Re is generated on the liquid crystal layer 213 as illustrated in (c) of FIG. 20.

In particular, such a potential as to generate a potential difference between a central portion of the bottom portion 62et which configures the second transparent electrode 62e_3 and the side wall portion 62es on the periphery of the bottom portion 62et is applied. In short, a voltage is applied to the liquid crystal layer 213 making use of the distribution of the sheet resistance. Here, the voltage is applied so that the phase difference Re may become $2\pi$ at the center of the bottom portion 62et.

Therefore, since it is possible to cause the light amount adjustment section 210c to function as a lens whose focal length can be varied in response to the voltage, the amount of light to be introduced into the light receiving region JSa of the photo-sensor element 32 can be varied.

(B) Summary

Accordingly, according to the present embodiment, a dynamic range of the photo-sensor element 32 can be assured similarly as in embodiment 1.

<4. Embodiment 4 (In the Case Wherein a Liquid Crystal Lens is Built in)>

In the following, an embodiment 4 is described.

(A) Configuration and so Forth of the Liquid Crystal Display Apparatus

Figure 21:
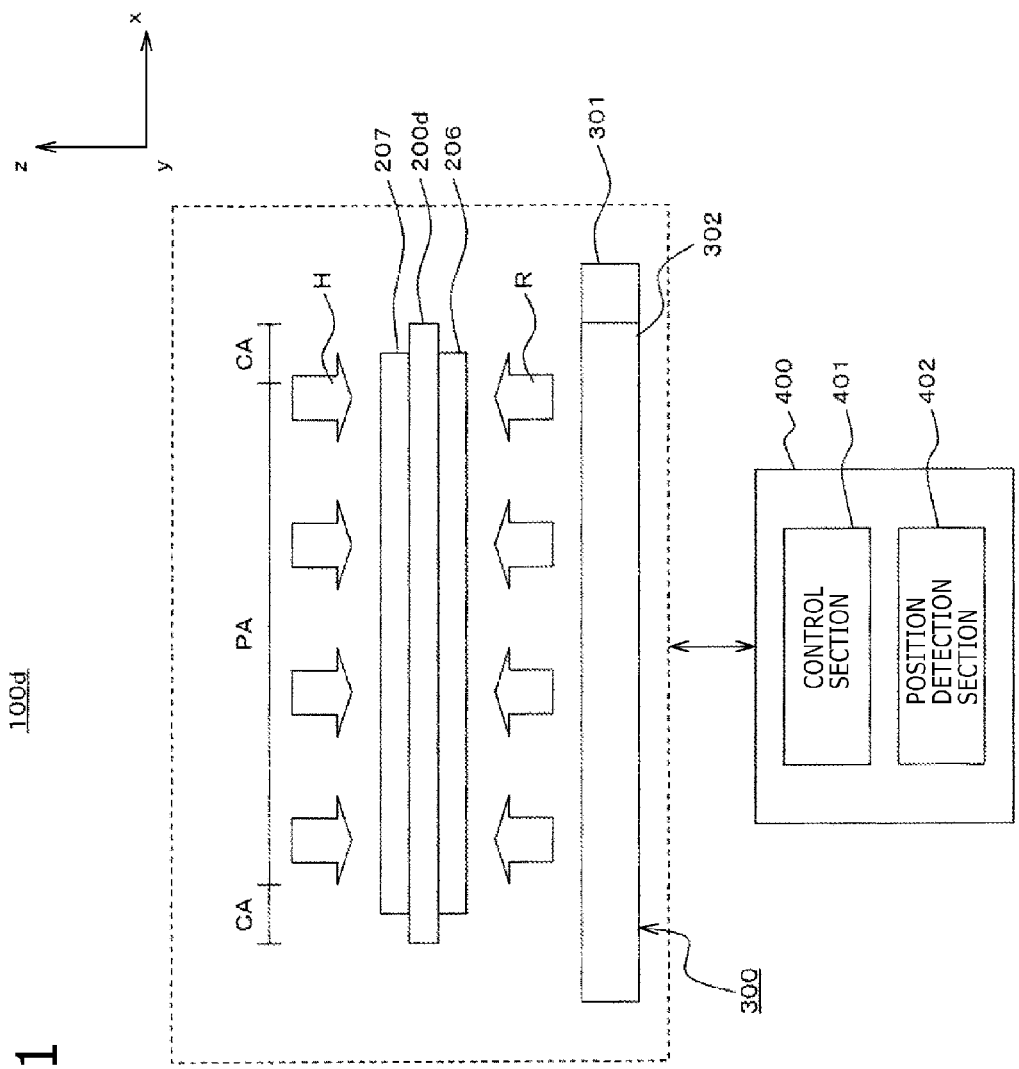
FIG. 21 is a sectional view showing essential part of a liquid crystal display apparatus in an embodiment 4.

FIG. 21 is a view schematically showing a configuration of essential part of a liquid crystal display apparatus 100d in the embodiment.

Figure 22:
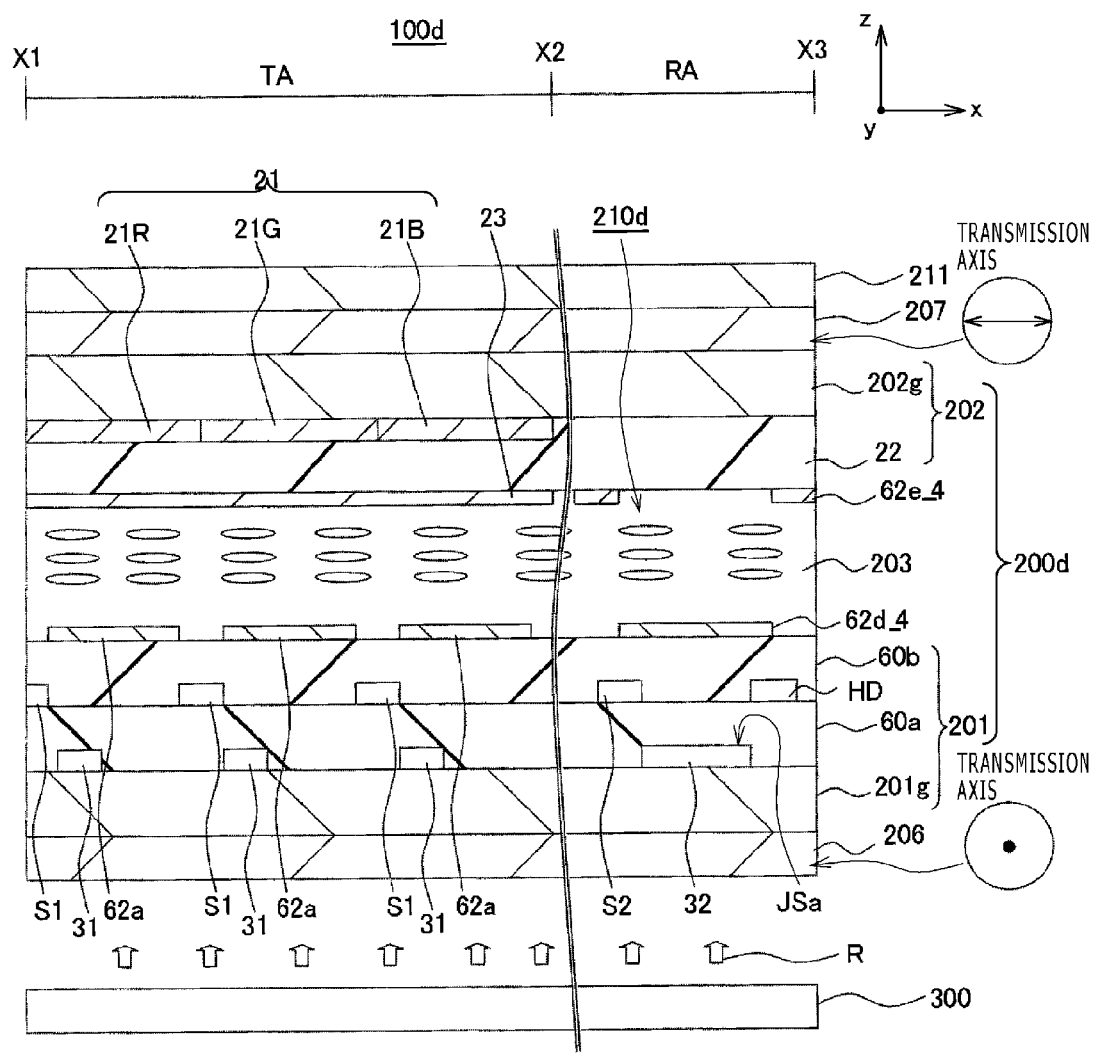
FIG. 22 is a sectional view showing essential part of the liquid crystal display apparatus in the embodiment 4 in an enlarged scale.

Meanwhile, FIG. 22 is a sectional view showing essential part of the liquid crystal display apparatus 100d in embodiment 4 in an enlarged scale. In FIG. 22, a portion corresponding to pixels P provided in a pixel region PA is shown. In FIG. 22, a first polarizing plate 206 and a second polarizing plate 207 are shown in a direction of the transmission axis thereof.

As shown in FIG. 21, in the present embodiment, a light amount adjustment section 210d is not provided outside a liquid crystal panel 200d but is provided inside the liquid crystal panel 200d as shown in FIG. 22. Except this, the present embodiment is similar to embodiment 1. Therefore, description of overlapping portions is omitted.

As shown in FIG. 22, the light amount adjustment section 210d in the present embodiment is configured such that, as shown in FIG. 22, a portion of the liquid crystal layer 203 sandwiched between the TFT array substrate 201 and the opposing substrate 202 which corresponds to the light receiving region JSa of the photo-sensor element 32 functions as a liquid crystal lens (not shown). In short, the light amount adjustment section 210d is configured such that a voltage is applied to the liquid crystal at the portion corresponding to the light receiving region JSa of the photo-sensor element 32 thereby to vary the focal length of the liquid crystal lens.

As shown in FIG. 22, the light amount adjustment section 210d has a first transparent electrode 62d_4 and a second transparent electrode 62e_4 formed in the sensor region RA thereof.

In the light amount adjustment section 210d, the first transparent electrode 62d_4 is provided on a face of the TFT array substrate 201 on the side opposing to the opposing substrate 202 as shown in FIG. 22. Here, the first transparent electrode 62d_4 is formed on the flattening film 60b so as to cover the face of the position of the photo-sensor element 32 opposing to the light receiving region JSa. For example, the first transparent electrode 62d_4 is formed using ITO similarly to the pixel electrode 62a and transmits light therethrough.

Meanwhile, in the light amount adjustment section 210d, the second transparent electrode 62e_4 is formed in such a manner as to cover the face of the opposing substrate 202 on the side opposing to the TFT array substrate 201. This second transparent electrode 62e_4 is formed, for example, using ITO similarly to the first transparent electrode 62d_4 and transmits light therethrough. Here, the second transparent electrode 62e_4 is formed on the flattening film 22 so as to correspond to the sensor region RA.

And, the first polarizing plate 206 is disposed such that the transmission axis thereof runs, for example, along the y direction as illustrated in FIG. 22. Meanwhile, the second polarizing plate 207 is disposed such that the transmission axis thereof, for example, runs along the x direction. The second polarizing plate 207 is disposed such that the transmission axis thereof runs in the direction of the refractive index difference distribution of the liquid crystal lens provided on the light amount adjustment section 210d similarly as in the case of embodiment 1.

Figure 23:
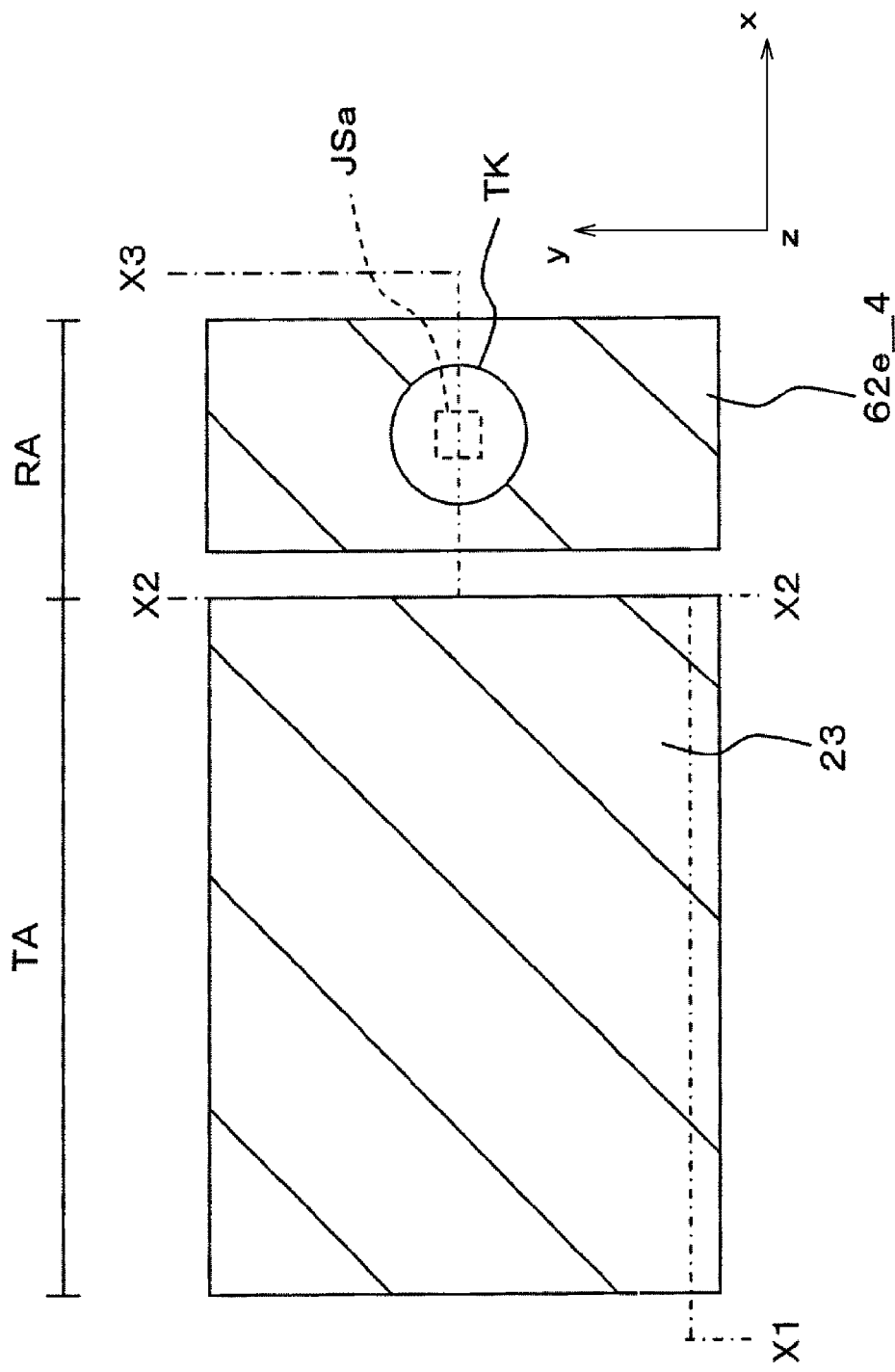
FIG. 23 is a plan view showing a second transparent electrode in the embodiment 4.

FIG. 23 is a plan view showing the second transparent electrode 62e_4 in embodiment 4.

As shown in FIG. 23, an opening TK is provided at a portion of the second transparent electrode 62e_4 including the region corresponding to the light receiving region JSa of the photo-sensor element 32 in the sensor region RA. In the present embodiment, the opening TK of the second transparent electrode 62e_4 is formed such that it has an area greater than the area of the light receiving region JSa of the photo-sensor element 32 and has a circular shape. Further, the second transparent electrode 62e_4 is formed in a spaced relationship from the opposing electrode 23.

And, the liquid crystal layer 203 is formed using a liquid crystal material having, for example, a dielectric constant anisotropy $\Delta \in > 0$, and is oriented horizontally such that the major axis direction of liquid crystal molecules runs along the direction of the face of the TFT array substrate 201 opposing to the opposing substrate 202 as shown in FIG. 22.

In the light amount adjustment section 210d described above, when the portion of the liquid crystal layer 203 corresponding to the sensor region RA is to be caused to function as a liquid crystal lens, a voltage is applied to the liquid crystal layer 203 between the first transparent electrode 62d and the second transparent electrode 62e_4 similarly as in embodiment 1.

Figure 24:
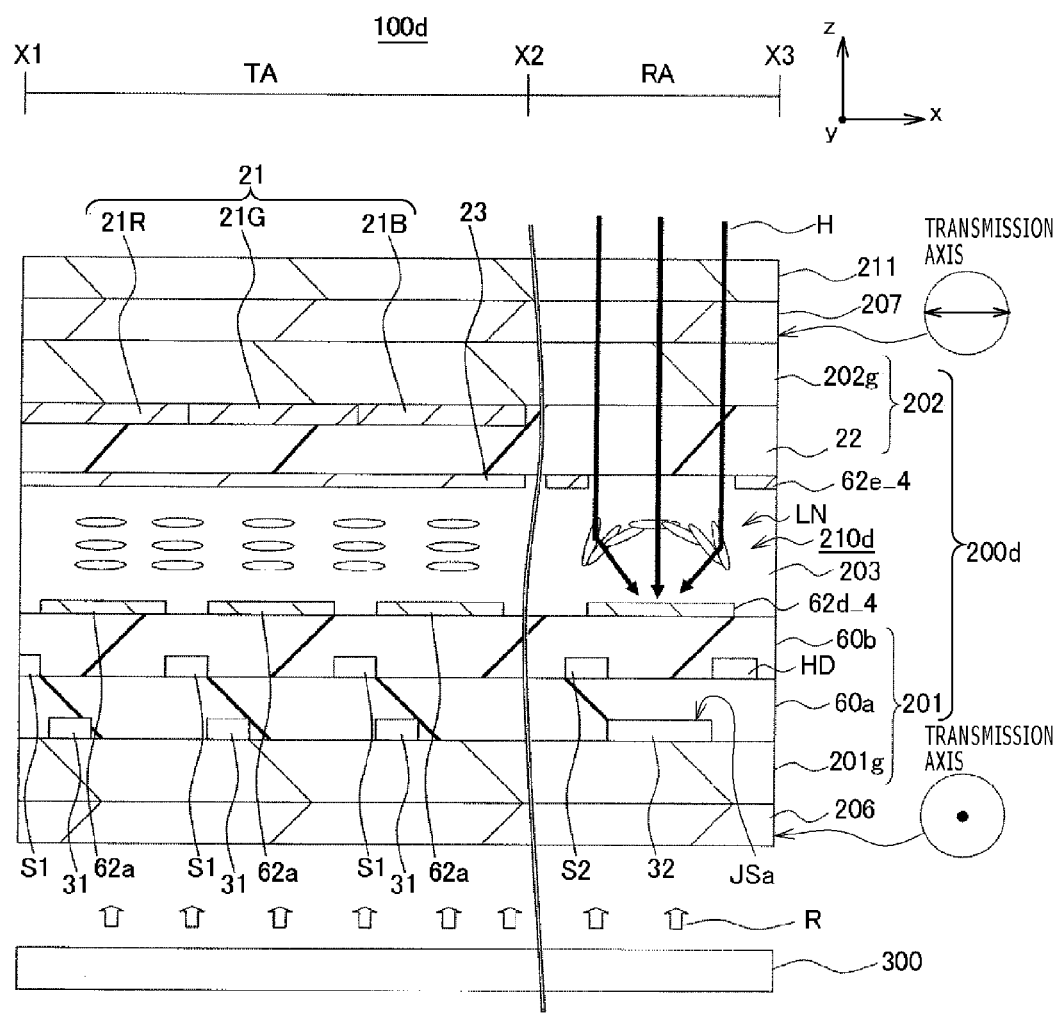
FIG. 24 is a sectional view illustrating a manner when a portion of a liquid crystal layer corresponding to a sensor region functions as a liquid crystal lens in the embodiment 4.

FIG. 24 is a sectional view illustrating a manner when the portion of the liquid crystal layer 203 corresponding to the sensor region RA is caused to function as a liquid crystal lens LN in embodiment 4.

As shown in FIG. 24, where a potential difference distribution is generated between the first transparent electrode 62d_4 and the second transparent electrode 62e_4, at a central portion of the opening TK of the second transparent electrode 62e_4, liquid crystal molecules do not rotate but maintain their orientation direction thereby to establish a state in which the phase difference is great. However, in this instance, the rotation of liquid crystal molecules increases from the center portion of the opening TK toward an end portion thereby to form a state in which the phase difference is small. Where the direction of the refractive index difference distribution of the liquid crystal lens coincides with the x direction, incident light introduced into the liquid crystal lens is transmitted as polarized light oscillating in the x direction to the second polarizing plate 207. The second polarizing plate 207 is disposed such that the transmission axis thereof runs along the x direction. Therefore, in the present embodiment, the incident light H can be condensed on the light receiving region JSa of the photo-sensor element 32.

And, the incident light H condensed on the photo-sensor element 32 from the front face side of the liquid crystal panel 200d as described above is received by the photo-sensor element 32 at the light receiving region JSa and photo-electrically converted to generate reception light data.

(B) Summary

As described above, in the present embodiment, the light amount adjustment section 210d is installed in the liquid crystal panel 200d.

Accordingly, in the present embodiment, a dynamic range of the photo-sensor element 32 can be assured similarly as in embodiment 1, and since it is possible to cause the liquid crystal layer 203 of the liquid crystal panel 200d to function as the liquid crystal lens LN, the production efficiency can be improved. Further, where the light amount adjustment section 210d is externally provided for the liquid crystal panel 200d, although it is difficult to establish accurate alignment, the present embodiment is high in alignment accuracy and can suppress appearance of a dispersion of the light amount adjustment.

It is to be noted that, while, in the present embodiment described above, the second transparent electrode 62e_4 in which the opening TK is provided is provided on the opposing substrate 202, the present invention is not limited to this. For example, even if the second transparent electrode 62e_4 in which the opening TK is provided is provided on the TFT array substrate 201 while the first transparent electrode 62d_4 in which the opening TK is not provided is provided on the opposing substrate 202, similar effects can be achieved.

<5. Embodiment 5 (In the Case Wherein a Liquid Crystal Lens is Built in)>

In the following, an embodiment 5 is described.

(A) Configuration and so Forth of the Liquid Crystal Display Apparatus

Figure 25:
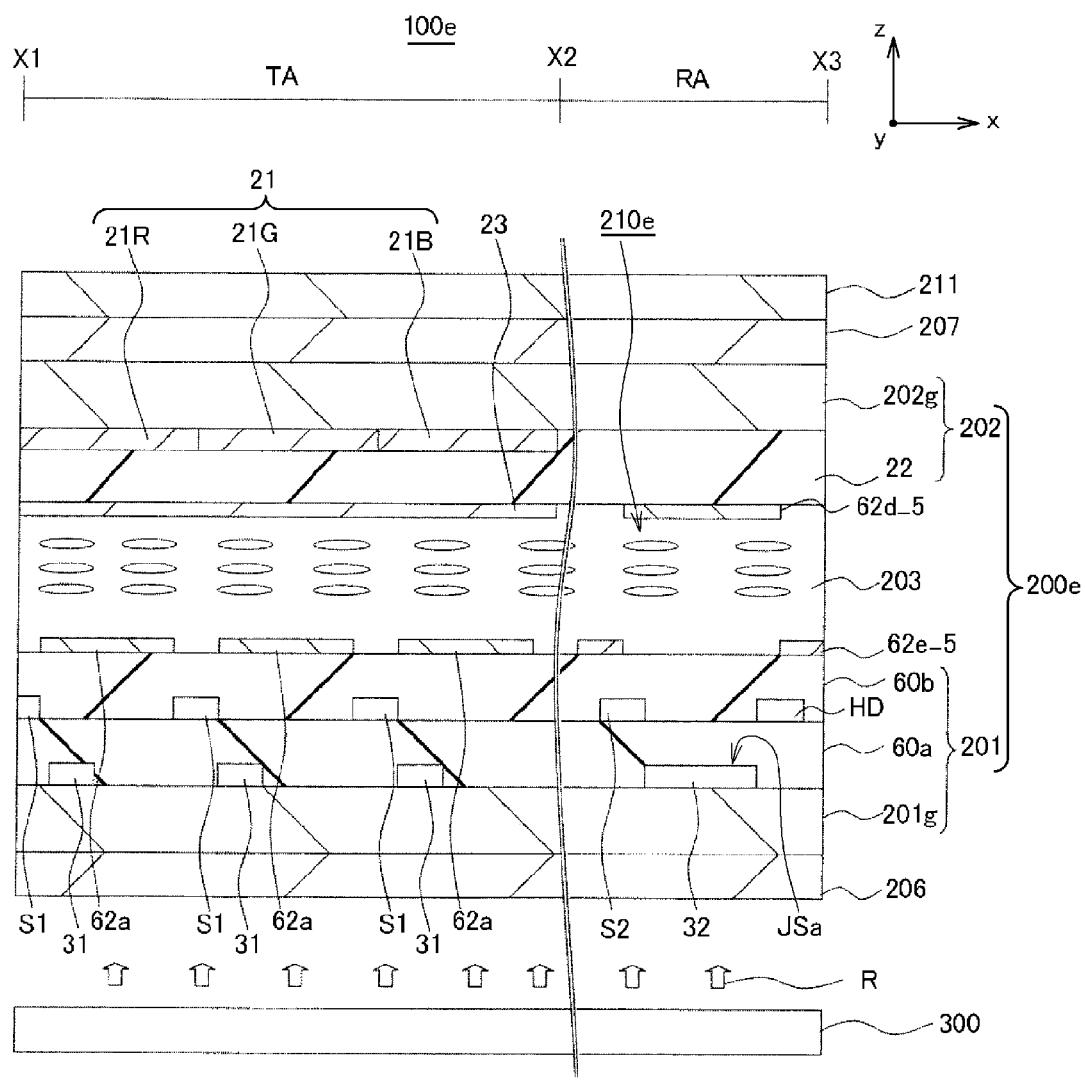
FIG. 25 is a sectional view showing essential part of a liquid crystal display apparatus in an embodiment 5 in an enlarged scale.

FIG. 25 is a sectional view showing essential part of the liquid crystal display apparatus 100e in embodiment 5 in an enlarged scale. In FIG. 25, a portion corresponding to pixels P provided in a pixel region PA is shown.

As shown in FIG. 25, the present embodiment is different from embodiment 1 in the position of a first transparent electrode 62d_5 and a second transparent electrode 62e_5 which configures a light amount adjustment section 210e. Except this, the present embodiment is similar to embodiment 4. Therefore, description of overlapping portions is omitted.

As shown in FIG. 25, the first transparent electrode 62d_5 of the light amount adjustment section 210e is formed on a face of the opposing substrate 202 on the side opposing to the TFT array substrate 201. Here, the first transparent electrode 62d_5 is formed in such a manner as to cover a face of the portion of the flattening film 22 corresponding to the light receiving region JSa of the photo-sensor element 32. For example, the first transparent electrode 62d_5 is formed using ITO similarly to the opposing electrode 23 and transmits light therethrough.

Further, in the light amount adjustment section 210e, the second transparent electrode 62e_5 is formed in such a manner as to cover a face of the TFT array substrate 201 on the side opposing to the opposing substrate 202. This second transparent electrode 62e_5 is formed, for example, using ITO similarly to the first transparent electrode 62d_5 and transmits light therethrough. Here, the second transparent electrode 62e_5 is formed so as to correspond to the sensor region RA on the flattening film 60b.

Figure 26:
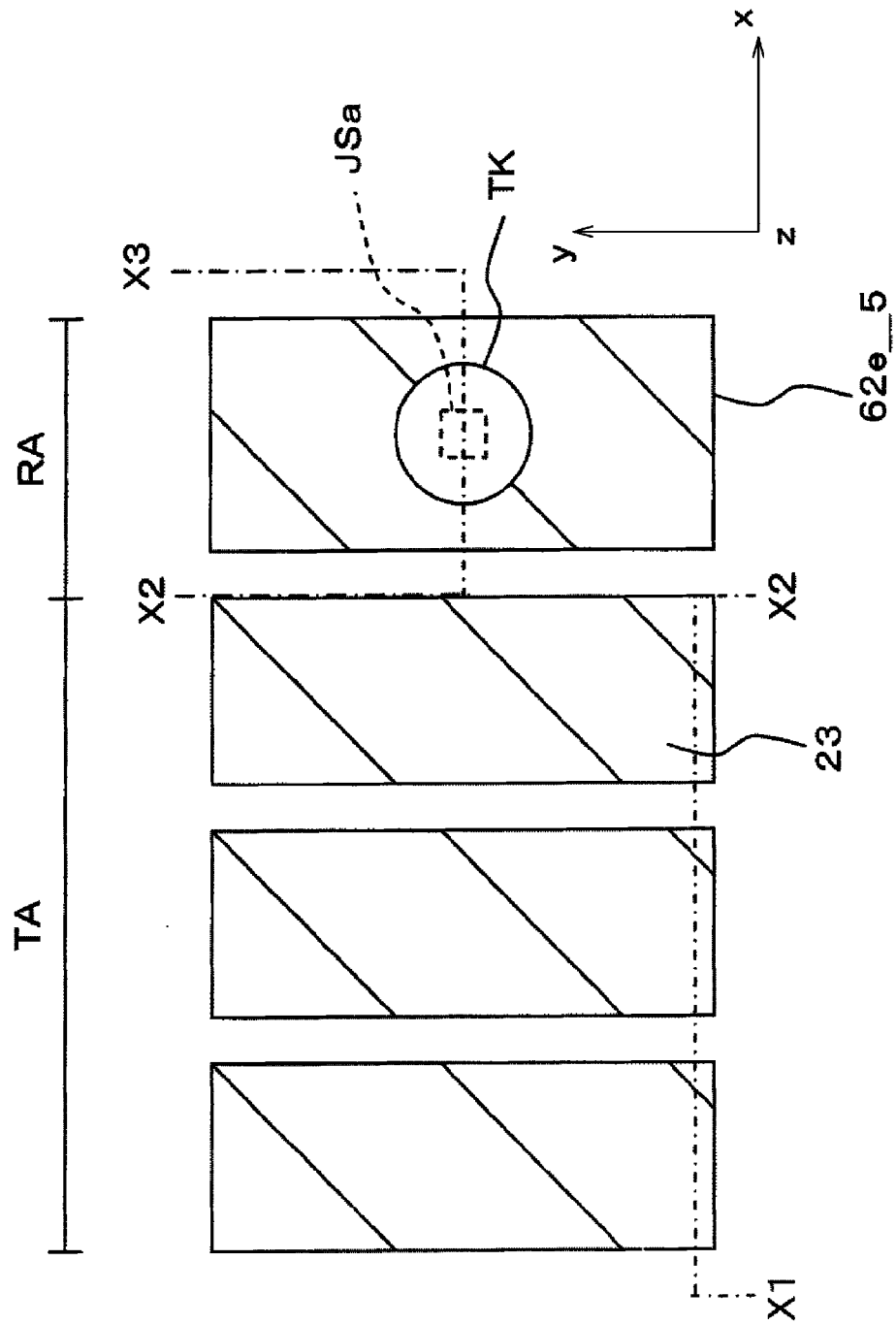
FIG. 26 is a view showing a portion of a second transparent electrode in the embodiment 5.

FIG. 26 is a plan view showing the second transparent electrode 62e_5 in embodiment 5.

As shown in FIG. 26, the second transparent electrode 62e_5 has an opening TK provided at a portion thereof including the region corresponding to the light receiving region JSa of the photo-sensor element 32 in the sensor region RA. In the present embodiment, the opening TK of the second transparent electrode 62e_5 has an area greater than the area of the light receiving region JSa of the photo-sensor element 32 and is formed in a circular shape. Further, the second transparent electrode 62e_5 is formed in a spaced relationship from the pixel electrode 62a.

In the light amount adjustment section 210e described above, in order to cause the portion of the liquid crystal layer 203 corresponding to the sensor region RA to function as a liquid crystal lens, a voltage is applied to the liquid crystal layer 203 between the first transparent electrode 62d_5 and the second transparent electrode 62e_5 similarly as in embodiment 4.

Figure 27:
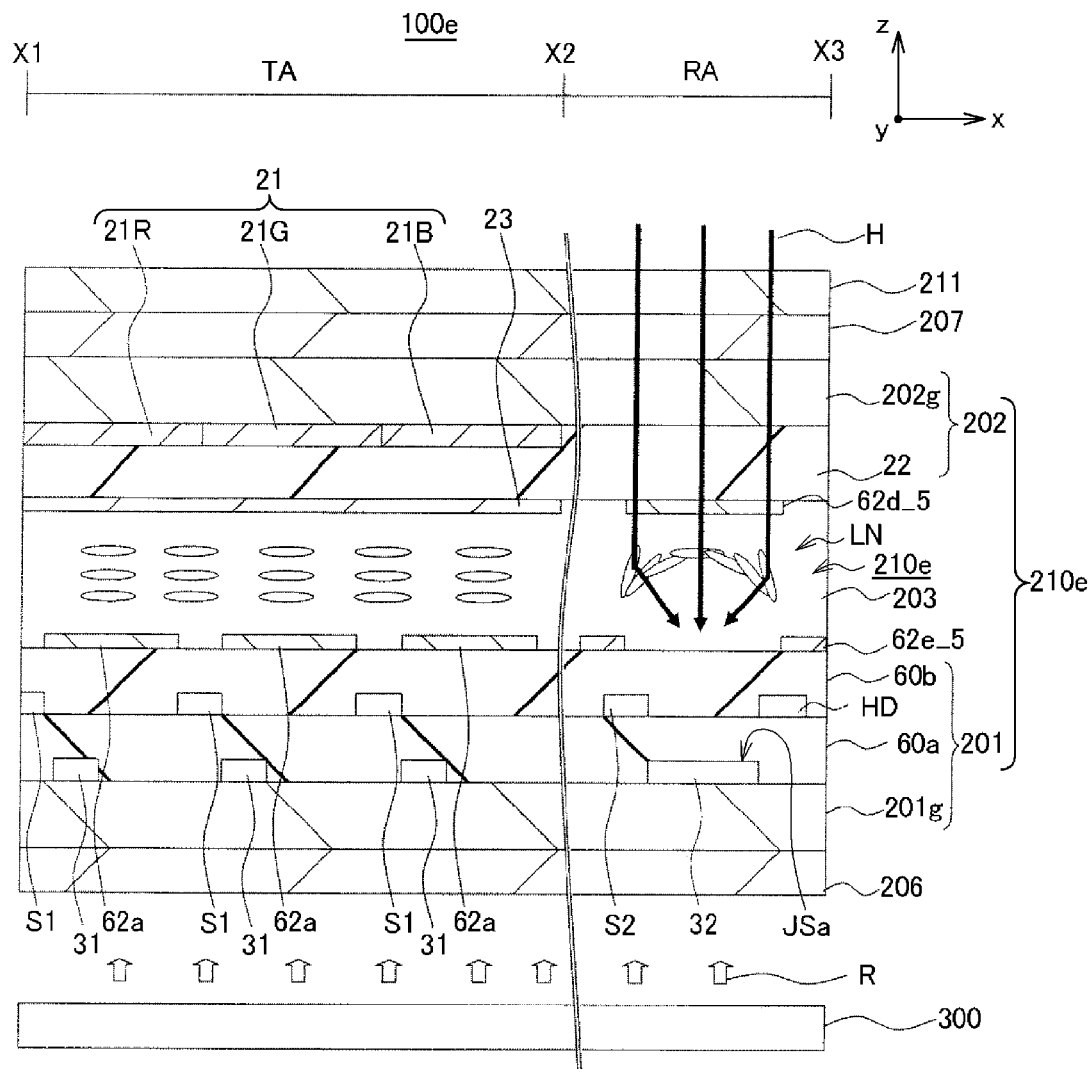
FIG. 27 is a sectional view illustrating a manner when a portion of a liquid crystal layer corresponding to a sensor region functions as a liquid crystal lens in the embodiment 5.

FIG. 27 is a sectional view illustrating a manner when the portion of the liquid crystal layer 203 corresponding to the sensor region RA is caused to function as a liquid crystal lens in embodiment 5.

As shown in FIG. 27, where a potential difference distribution is generated between the first transparent electrode 62d_5 and the second transparent electrode 62e_5, at a central portion of the opening TK of the second transparent electrode 62e_5, liquid crystal molecules do not rotate but maintain their orientation direction and the phase difference is great similarly as in embodiment 4. However, in this instance, the amount of rotation of liquid crystal molecules increases from the central portion toward an end portion of the opening TK to establish a state in which the phase difference is small. Therefore, in the present embodiment, incident light H can be condensed upon the light receiving region JSa of the photo-sensor element 32.

And, the incident light H condensed upon the photo-sensor element 32 from the front face side of the liquid crystal panel 200e is received by the photo-sensor element 32 at the light receiving region JSa and photo-electrically converted to generate reception light data.

(B) Summary

As described above, in the present embodiment, the light amount adjustment section 210e is installed in the inside of the liquid crystal panel 200e similarly as in embodiment 4.

Accordingly, the present embodiment can improve the fabrication efficiency since a dynamic range of the photo-sensor element 32 can be assured and it is possible to cause the liquid crystal layer 203 of the liquid crystal panel 200e to function as the liquid crystal lens LN. Further, in the present embodiment, since an influence of displacement which occurs upon superposition of the TFT array substrate 201 and the opposing substrate 202 is less likely to be had, the alignment accuracy is high and appearance of a dispersion in light amount adjustment can be suppressed in comparison with the case of embodiment 4.

<6. Embodiment 6 (In the Case Wherein a Liquid Crystal Lens is Built in)>

In the following, an embodiment 6 is described.

(A) Configuration and so Forth of the Liquid Crystal Display Apparatus

Figure 28:
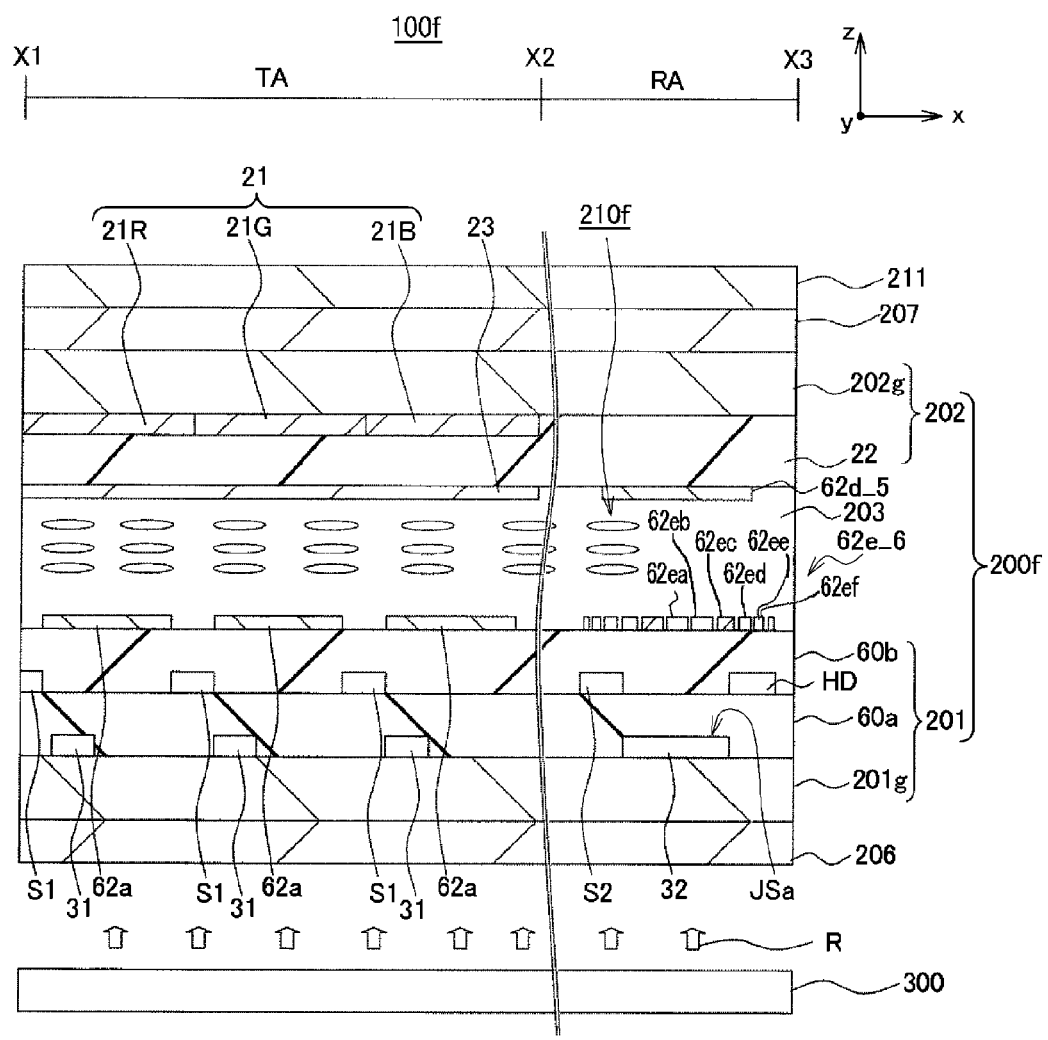
FIG. 28 is a sectional view showing essential part of a liquid crystal display apparatus in an embodiment 6 in an enlarged scale.

FIG. 28 is a sectional view showing essential part of the liquid crystal display apparatus 100f in the embodiment 6 according to the present invention in an enlarged scale. In FIG. 28, a portion corresponding to pixels P provided in a pixel region PA is shown.

As shown in FIG. 28, the present embodiment is different from embodiment 5 in a second transparent electrode 62e_6 of a light amount adjustment section 210f in a liquid crystal panel 200f. Except this, the present embodiment is similar to embodiment 5. Therefore, description of overlapping portions is omitted.

As shown in FIG. 28, the second transparent electrode 62e_6 of the light amount adjustment section 210f is formed in such a manner as to cover a face of the TFT array substrate 201 on the face opposing to the opposing substrate 202 similarly as in the case of embodiment 5.

However, as shown in FIG. 28, at the portion of the photo-sensor element 32 including the region corresponding to the light receiving region JSa in the sensor region RA, different from the embodiment 5, a plurality of transparent electrodes 62ea, 62eb, 62ec, 62ed, 62ee and 62ef are formed in a spaced relationship from each other.

In particular, similarly as in the case shown in FIG. 13 in connection with the embodiment 2, the second transparent electrode 62e_6 of the light amount adjustment section 210f has the transparent electrode 62ea of a circular shape provided at the center thereof. And, the plural transparent electrodes 62ea, 62eb, 62ec, 62ed, 62ee and 62ef are formed so as to describe circles around the transparent electrode 62ea.

Therefore, since the light amount adjustment section 210f can function as a Fresnel lens whose focal length can be varied in response to a voltage, it can vary the amount of light to be introduced to the light receiving region JSa of the photo-sensor element 32.

(B) Summary

Accordingly, the present embodiment can assure a dynamic range of the photo-sensor element 32 similarly to embodiment 5.

<7. Embodiment 7 (In the Case Wherein a Liquid Crystal Lens is Built in)>

In the following, an embodiment 7 is described.

(A) Configuration and so Forth of the Liquid Crystal Display Apparatus

Figure 29:
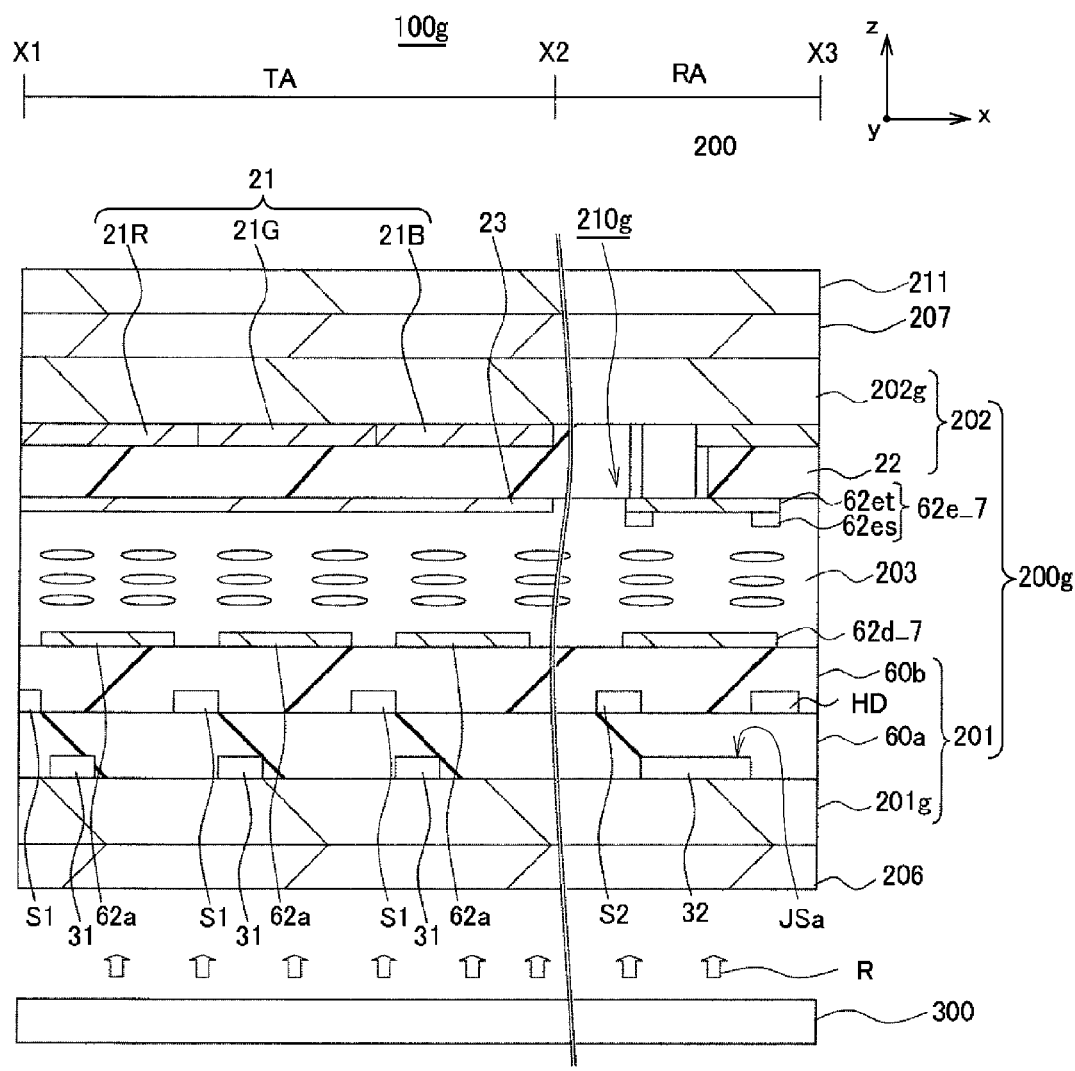
FIG. 29 is a sectional view showing essential part of a liquid crystal display apparatus in an embodiment 7 in an enlarged scale.

FIG. 29 is a sectional view showing essential part of the liquid crystal display apparatus 100g in the embodiment 7 in an enlarged scale. In FIG. 29, a portion corresponding to pixels P provided in a pixel region PA is shown.

As shown in FIG. 29, in a liquid crystal panel 200g in the present embodiment, a second transparent electrode 62e_7 of a light amount adjustment section 210g is formed on an opposing substrate 202 and a first transparent electrode 62d_7 of the light amount adjustment section 210g is formed on a TFT array substrate 201. And, the first transparent electrode 62d_7 is formed in a mode different from that in the embodiment 5. Except them, the present embodiment is similar to embodiment 5. Therefore, description of overlapping portions is omitted.

As shown in FIG. 29, the second transparent electrode 62e_7 of the light amount adjustment section 210g is formed at a portion of a face of the opposing substrate 202 on the side opposing to the TFT array substrate 201 including the region corresponding to the light receiving region JSa of the photo-sensor element 32 in the sensor region RA.

And, in the present embodiment, different from embodiment 5, the second transparent electrode 62e_7 of the light amount adjustment section 210g has a bottom portion 62et and a side wall portion 62es formed thereon as shown in FIG. 29. In particular, similar to the case shown in FIG. 20 in embodiment 3, the bottom portion 62et which configures the second transparent electrode 62e_7 of the light amount adjustment section 210g is formed in a circular shape. Here, the bottom portion 62et is formed in a circular shape centered at the center of the light receiving region JSa of the photo-sensor element 32.

And, the side wall portion 62es is provided so as to surround the periphery of the bottom portion 62et similarly as in the case shown in FIG. 20, and is formed so as to project from the face of the bottom portion 62et similarly as in the case shown in FIG. 19.

Therefore, since the light amount adjustment section 210g can function as a Fresnel lens whose focal length is variable in response to a voltage, the amount of light to be introduced to the light receiving region JSa of the photo-sensor element 32 can be varied.

(B) Summary

Accordingly, the present embodiment can assure a dynamic range of the photo-sensor element 32 similar to embodiment 5.

<8. Embodiment 8 (In the Case of an Externally Provided Liquid Lens)>

In the following, an embodiment 8 is described.

(A) Configuration and so Forth of the Liquid Crystal Display Apparatus

Figure 30:
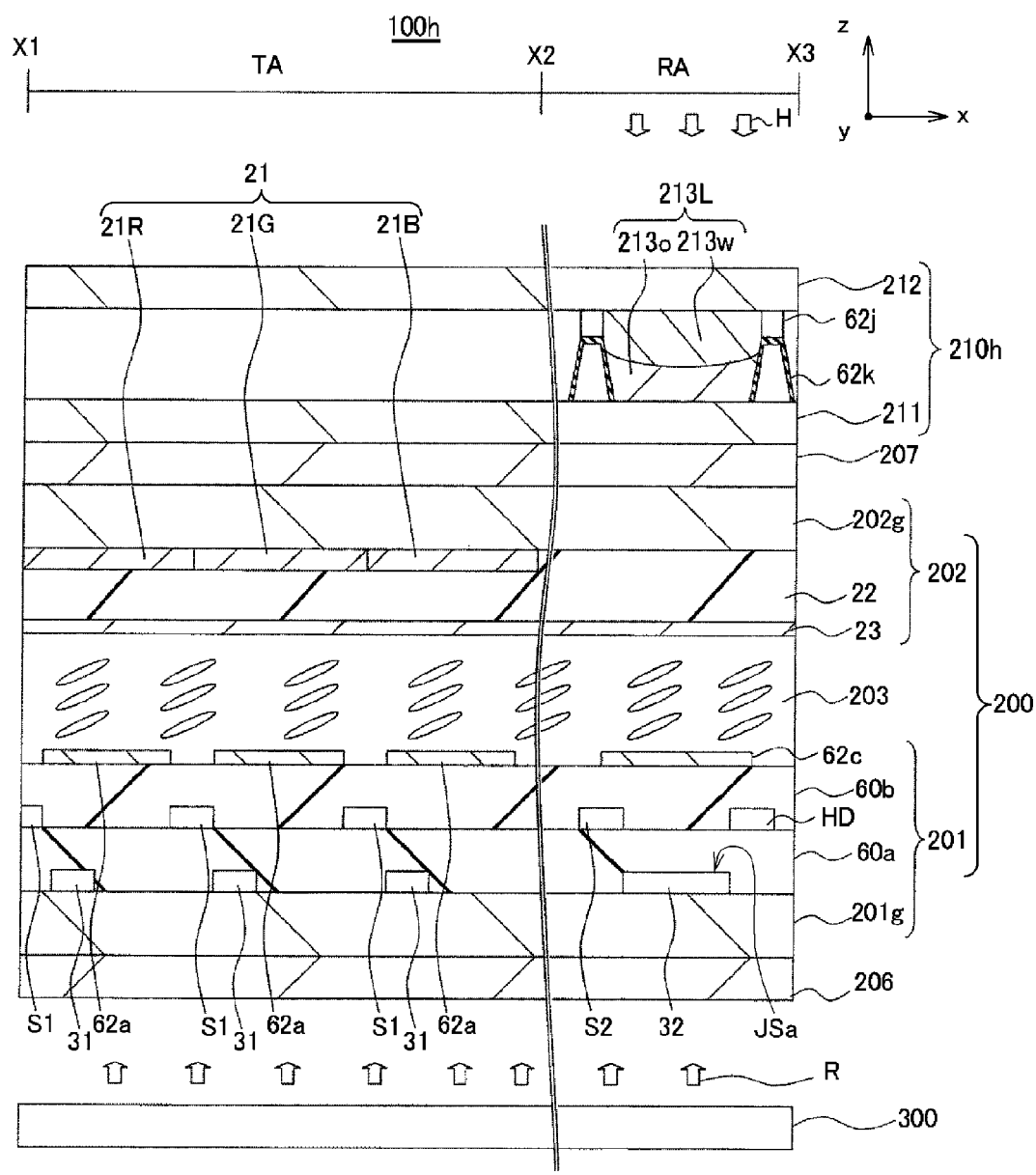
FIG. 30 is a sectional view showing essential part of a liquid crystal display apparatus in an embodiment 8 in an enlarged scale.

FIG. 30 is a sectional view showing essential part of the liquid crystal display apparatus 100h in embodiment 8 in an enlarged scale. In FIG. 30, a portion corresponding to pixels P provided in a pixel region PA is shown.

As shown in FIG. 30, in the present embodiment, a light amount adjustment section 210h is different from that in embodiment 1. Except this, the present embodiment is similar to embodiment 1. Therefore, description of overlapping portions is omitted.

As shown in FIG. 30, in the light amount adjustment section 210h, the first glass substrate 211 and the second glass substrate 212 are disposed in a spaced relationship from and in an opposing relationship to each other similarly as in embodiment 1.

However, in the present embodiment, different from embodiment 1, a liquid crystal lens section 213L is provided between the first glass substrate 211 and the second glass substrate 212.

As shown in FIG. 30, the liquid crystal lens section 213L has a lower electrode 62k and an upper electrode 62j, and non-polar liquid 213o and polar liquid 213w are accommodated in an accommodating space formed by the lower electrode 62k and the upper electrode 62j.

The lower electrode 62k is provided on a face of the first glass substrate 211 on the side opposing to the second glass substrate 212 as shown in FIG. 30.

Here, the lower electrode 62k is formed so as to surround the periphery of a region of the sensor region RA corresponding to the light receiving region JSa of the photo-sensor element 32. For example, the lower electrode 62k is formed so as to describe a circle. For example, the lower electrode 62k is formed from a dielectric material such as aluminum. And, an insulating film 62kz is formed on the surface of the lower electrode 62k. The lower electrode 62k is formed, for example, from a fluorocarbon type material such as polytetrafluroethylene.

The upper electrode 62j is provided on a face of the second glass substrate 212 on the side opposing to the first glass substrate 211 as shown in FIG. 30.

Here, the upper electrode 62j is formed so as to surround the periphery of a region of the sensor region RA corresponding to the light receiving region JSa of the photo-sensor element 32 similarly to the lower electrode 62k. The upper electrode 62j is provided so as to describe a circle. For example, the upper electrode 62j is formed from a conductive material such as aluminum.

The non-polar liquid 213o is accommodated in the accommodating space formed by the lower electrode 62k and the upper electrode 62j together with the polar liquid 213w as shown in FIG. 30. The non-polar liquid 213o is formed, for example, using silicone oil.

The polar liquid 213w is accommodated in the accommodating space formed by the lower electrode 62k and the upper electrode 62j together with the non-polar liquid 213o as shown in FIG. 30. For the polar liquid 213w, for example, aqueous solution in which electrolyte such as sodium chloride is dissolved is used. This polar liquid 213w is separate from the non-polar liquid 213o, and an interface is formed between them.

In such a liquid crystal lens section 213L as described above, a voltage is applied between the lower electrode 62k and the upper electrode 62j to vary the shape of the interface between the non-polar liquid 213o and the polar liquid 213w. Consequently, the liquid crystal lens section 213L is configured such that the focal position to which incident light H introduced to the non-polar liquid 213o and the polar liquid 213w is to be condensed can be varied.

In the present embodiment, the voltage to be applied between the lower electrode 62k and the upper electrode 62j is controlled to vary the focal position to which the incident light H to be introduced to the non-polar liquid 213o and the liquid crystal layer 213 is to be condensed.

Figure 31:
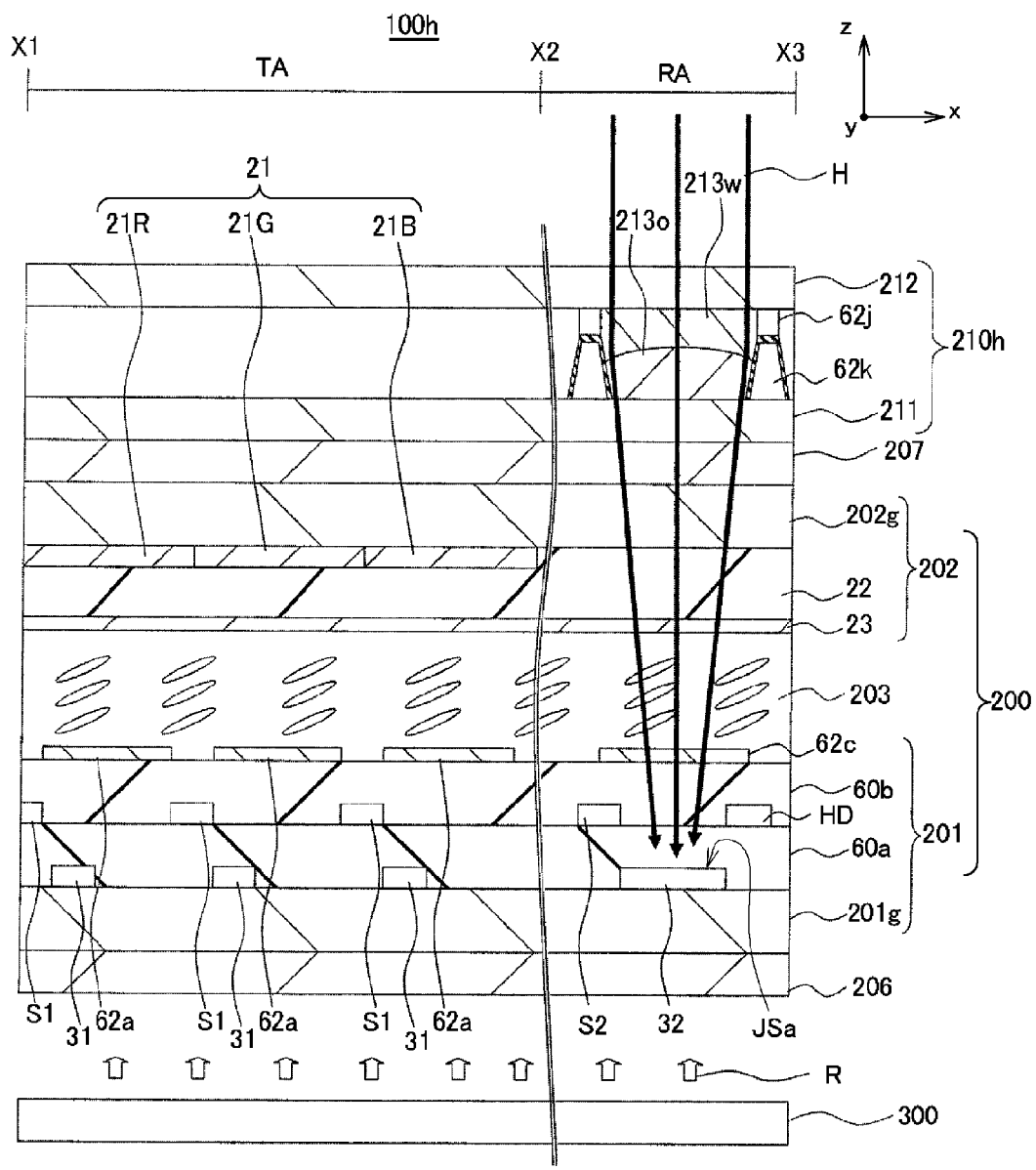
FIG. 31 is a sectional view illustrating a manner when a voltage is applied between a lower electrode and an upper electrode in the embodiment 8.

FIG. 31 is a sectional view illustrating a manner when a voltage is applied between the lower electrode 62k and the upper electrode 62j in such an embodiment 8 as described above.

As shown in FIG. 31, the shape of the interface between the non-polar liquid 213o and the polar liquid 213w is varied by applying a voltage between the lower electrode 62k and the upper electrode 62j. And, as shown in FIG. 31, the focal position to which the incident light H introduced to the non-polar liquid 213o and the polar liquid 213w is condensed can be adjusted to the light receiving region JSa of the photo-sensor element 32.

Therefore, the light amount adjustment section 210h can vary the amount of light to be introduced to the light receiving region JSa of the photo-sensor element 32.

(B) Summary

In this manner, in the present embodiment, since the light amount adjustment section 210 includes a liquid crystal lens, and the amount of the incident light H to be introduced into the photo-sensor element 32 is adjusted by applying a voltage to the liquid crystal lens to vary the focal length of the liquid crystal lens. Here, the light amount adjustment section 210h adjusts the amount of light to be introduced to the light receiving region JSa of the photo-sensor element 32 by varying the focal length of the liquid crystal lens from the front face side to the rear face side of the liquid crystal panel 200.

Accordingly, the present embodiment can assure a dynamic range of the photo-sensor element 32 similar to embodiment 1.

<9. Embodiment 9 (In the Case of an Externally Provided Liquid Convex Lens)>

In the following, an embodiment 9 is described.

(A) Configuration and so Forth of the Liquid Crystal Display Apparatus

Figure 32:
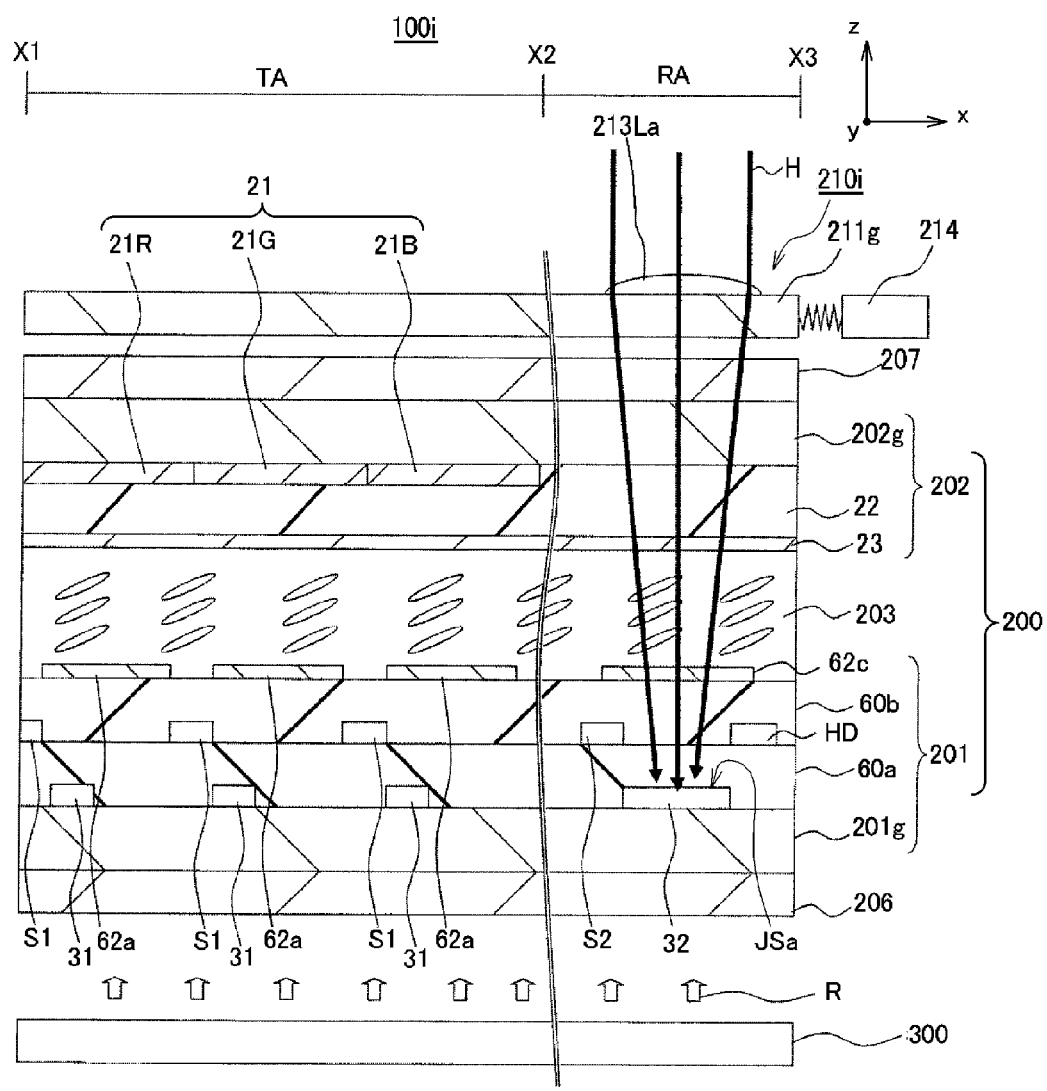
FIG. 32 is a sectional view showing essential part of a liquid crystal display apparatus in an embodiment 9 in an enlarged scale.

FIG. 32 is a sectional view showing essential part of the liquid crystal display apparatus 100i in embodiment 9 in an enlarged scale. In FIG. 32, a portion corresponding to pixels P provided in a pixel region PA is shown.

As shown in FIG. 32, in the present embodiment, a light amount adjustment section 210i is different from that in embodiment 1. Except this, the present embodiment is similar to embodiment 1. Therefore, description of overlapping portions is omitted.

As shown in FIG. 32, the light amount adjustment section 210i has a glass substrate 211g, a lens 213La, and a horizontally movable element 214.

The components of the light amount adjustment section 210i are successively described.

In the light amount adjustment section 210i, the glass substrate 211g is a substrate of an insulator which transmits light therethrough and is formed from glass. The glass substrate 211g is disposed in an opposing relationship to the opposing substrate 202 on the side of the opposing substrate 202 of the liquid crystal panel 200. And, as shown in FIG. 32, the glass substrate 211g has the lens 213La formed on a face thereof on the opposite side to the face opposing to the opposing substrate 202.

In the light amount adjustment section 210i, the lens 213La is, for example, a convex lens made of glass and is formed on a face of the first glass substrate 211g on the opposite side to the face opposing to the opposing electrode 202 as shown in FIG. 32.

Here, the lens 213La is formed so as to correspond to the sensor region RA. The lens 213La refracts incident light at the surface thereof to collect the incident light H to the photo-sensor element 32 provided in the sensor region RA.

In the light amount adjustment section 210i, the horizontally movable element 214 is configured, for example, from a piezoelectric element. The horizontally movable element 214 is provided on one side face of the glass substrate 211g as shown in FIG. 32 and moves the glass substrate 211g.

Here, the horizontally movable element 214 varies the position of the glass substrate 211g with respect to the liquid crystal panel 200 along the faces with which the liquid crystal panel 200 and the glass substrate 211g are opposed to each other. Consequently, since the focal position of the lens 213La moves, the amount of the incident light H to be introduced to the photo-sensor element 32 can be adjusted.

In the present embodiment, the horizontally movable element 214 executes moving operation of the glass substrate 211g based on a control signal outputted from the control section 401.

Figure 33:
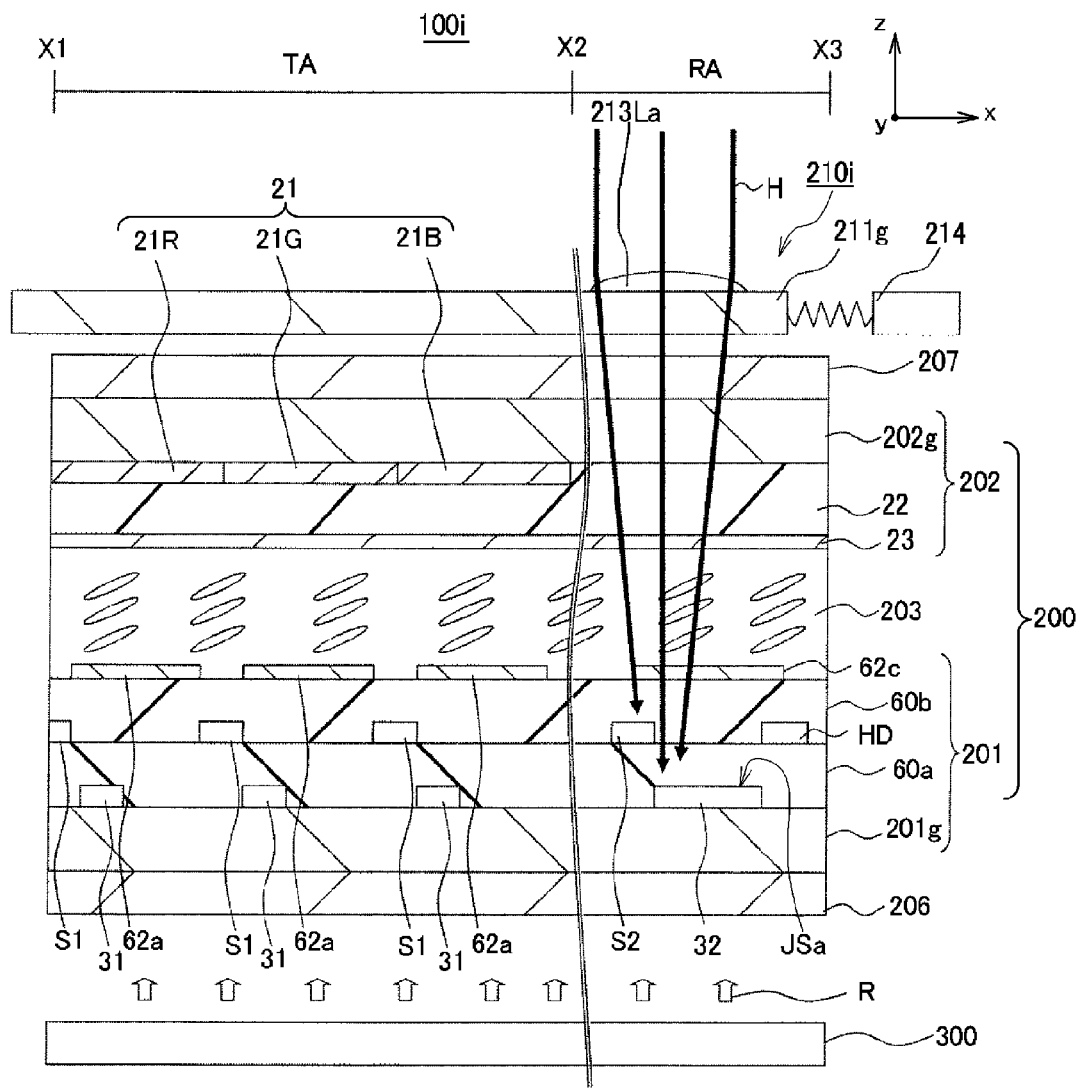
FIG. 33 is a sectional view illustrating a manner when a horizontal moving element moves a glass substrate in the embodiment 9.

FIG. 33 is a sectional view illustrating a manner when the horizontally movable element 214 moves the glass substrate 211g in embodiment 9.

As shown in FIG. 33, the horizontally movable element 214 moves the glass substrate 211g so as to displace the focal position of the lens 213La away from the light receiving region JSa. For example, where the value of reception light data generated by the photo-sensor element 32 is an upper limit value of the dynamic range, in order to reduce the amount of the incident light H to be introduced into the light receiving region JSa of the photo-sensor element 32, the glass substrate 211g is moved in such a manner as described above.

(B) Summary

Accordingly, the present embodiment can assure a dynamic range of the photo-sensor element 32 similarly to embodiment 1.

<10. Embodiment 10 (In the Case Wherein a Liquid Crystal Lens is Built in and a Light Blocking wall 203S is Installed)>

In the following, an embodiment 10 is described.

(A) Configuration and so Forth of the Liquid Crystal Display Apparatus

Figure 34:
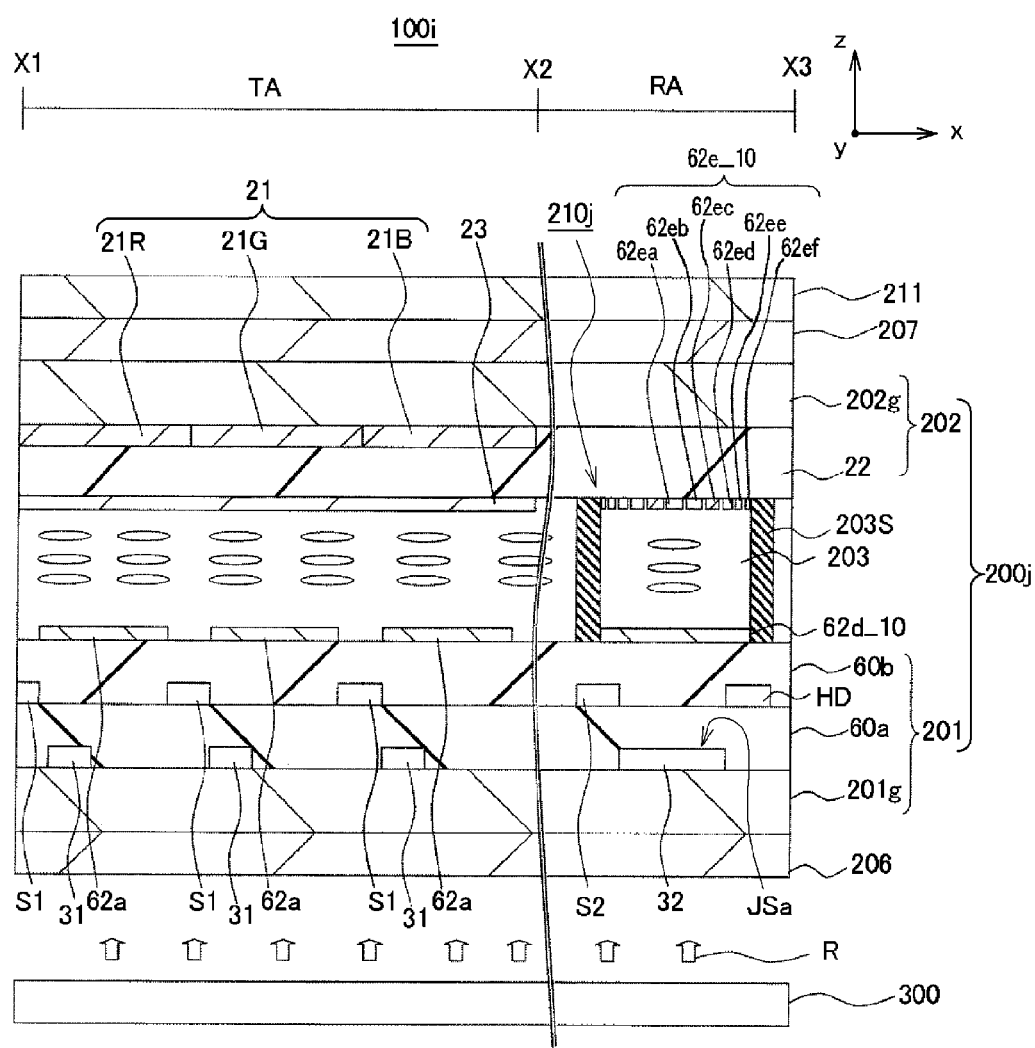
FIG. 34 is a sectional view showing essential part of a liquid crystal display apparatus in an embodiment 10 in an enlarged scale.

FIG. 34 is a sectional view showing essential part of the liquid crystal display apparatus 100j in embodiment 10 in an enlarged scale. In FIG. 34, a portion corresponding to pixels P provided in a pixel region PA is shown.

As shown in FIG. 34, in the present embodiment, a liquid crystal panel 200j has a first transparent electrode 62d-10 of a light amount adjustment section 210j formed on a TFT array substrate 201. Together with this, a second transparent electrode 62e_10 of the light amount adjustment section 210j is formed on the opposing substrate 202. Further, a light blocking wall 203S is provided. Except this, the present embodiment is similar to the embodiment 6. Therefore, description of overlapping portions is omitted.

The first transparent electrode 62d-10 and the second transparent electrode 62e_10 are formed similarly to the first transparent electrode and the second transport electrode of the embodiment 6 except that the positions are different, respectively.

As shown in FIG. 34, the liquid crystal layer 203 is provided between the TFT array substrate 201 and the opposing substrate 202. Here, the light blocking wall 203S is formed so as to surround the periphery of the region of the sensor region RA corresponding to the light receiving region JSa of the photo-sensor element 32. For example, the light blocking wall 203S is provided so as to describe a circle. For example, the light blocking wall 203S is formed from a resin material which contains black pigment. And, the light blocking wall 203S accommodates liquid crystal therein. For example, the liquid crystal is accommodated by ODF (One Drop Fill) and functions as a liquid crystal lens similarly as in the embodiment 6.

Figure 35:
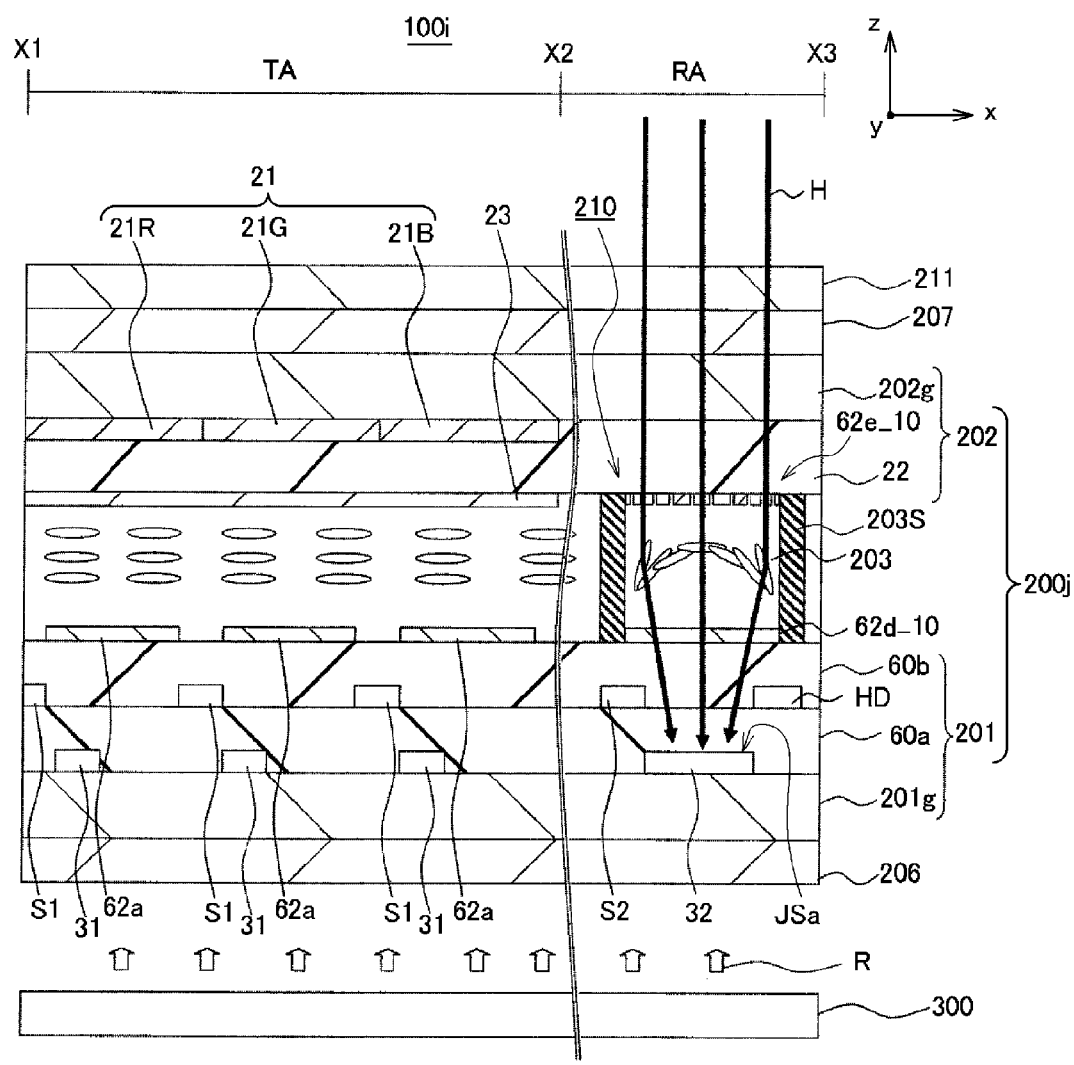
FIG. 35 is a sectional view illustrating a manner when a portion of a liquid crystal layer corresponding to a sensor region functions as a liquid crystal lens in embodiment 10.

FIG. 35 is a sectional view illustrating a manner when the portion of the liquid crystal layer 203 corresponding to the sensor region RA functions as a liquid crystal lens in the embodiment 10 according to the present invention.

As shown in FIG. 35, the incident light H can be condensed on the light receiving region JSa of the photo-sensor element 32 by causing a potential difference to be generated between the first transparent electrode 62d-10 and the second transparent electrode 62e_10.

(B) Summary

In this manner, in the present embodiment, the light blocking wall 203S is formed so as to surround the periphery of the region of the photo-sensor element 32 corresponding to the light reception region JSa. Therefore, since light incident from another pixel P neighboring with the photo-sensor element 32 can be prevented from being admitted into the photo-sensor element 32, reception light data of a high S/N ratio can be obtained.

<11. Embodiment 11 (In the Case Wherein an Externally Provided Liquid Crystal Lens is of the Fixed Focus Type)>

In the following, an embodiment 11 is described.

(A) Configuration and so Forth of the Liquid Crystal Display Apparatus

Figure 36:
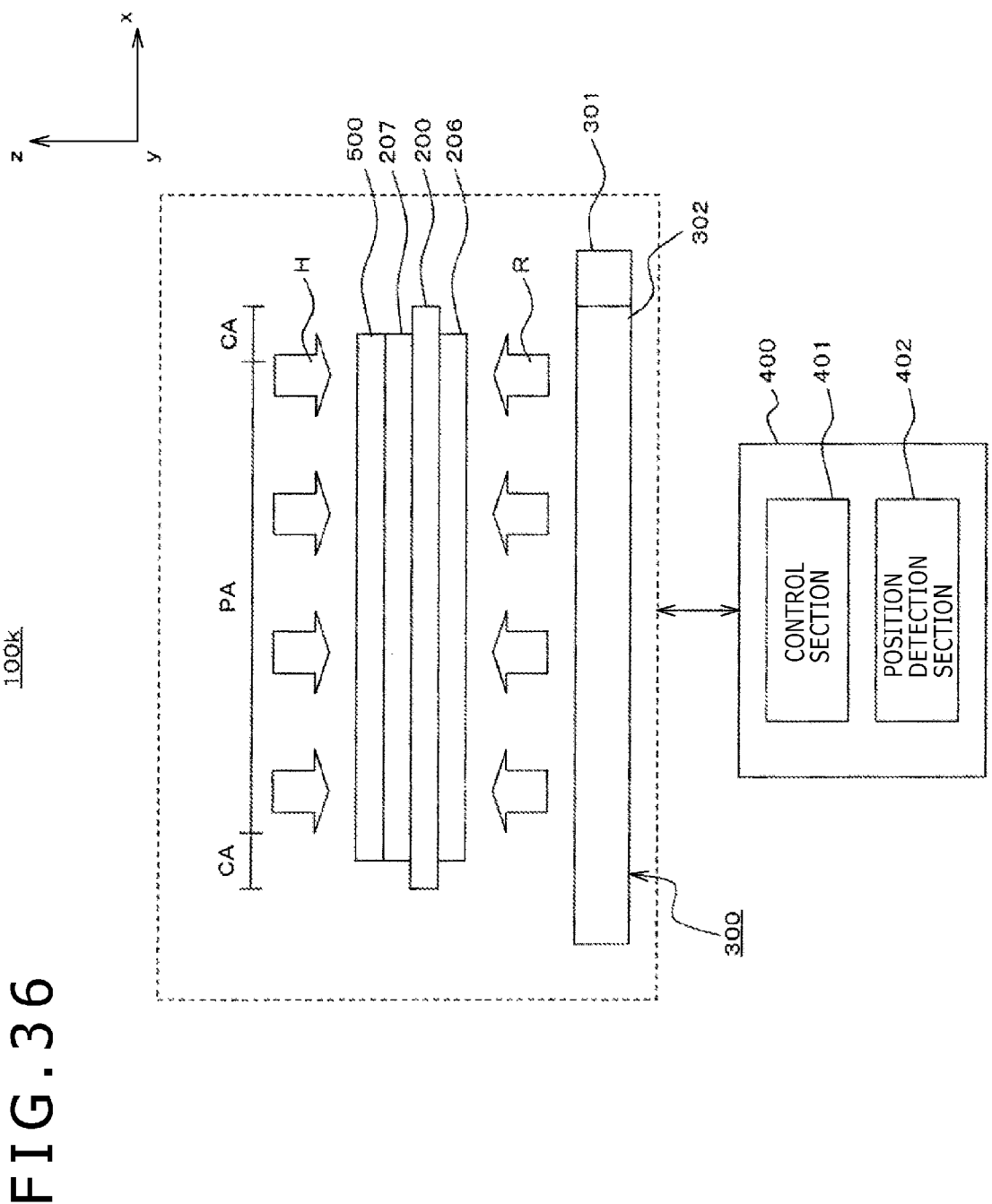
FIG. 36 is a sectional view schematically showing a configuration of essential part of a liquid crystal display apparatus in an embodiment 11.

FIG. 36 is a view schematically showing a configuration of essential part of the liquid crystal display apparatus 100k in embodiment 11.

As shown in FIG. 36, the liquid crystal display apparatus 100k of the present embodiment includes a lens unit 500 disposed therein in place of the light amount adjustment section. Except this, the present embodiment is similar to embodiment 1. Therefore, description of overlapping portions is omitted.

Figure 37:
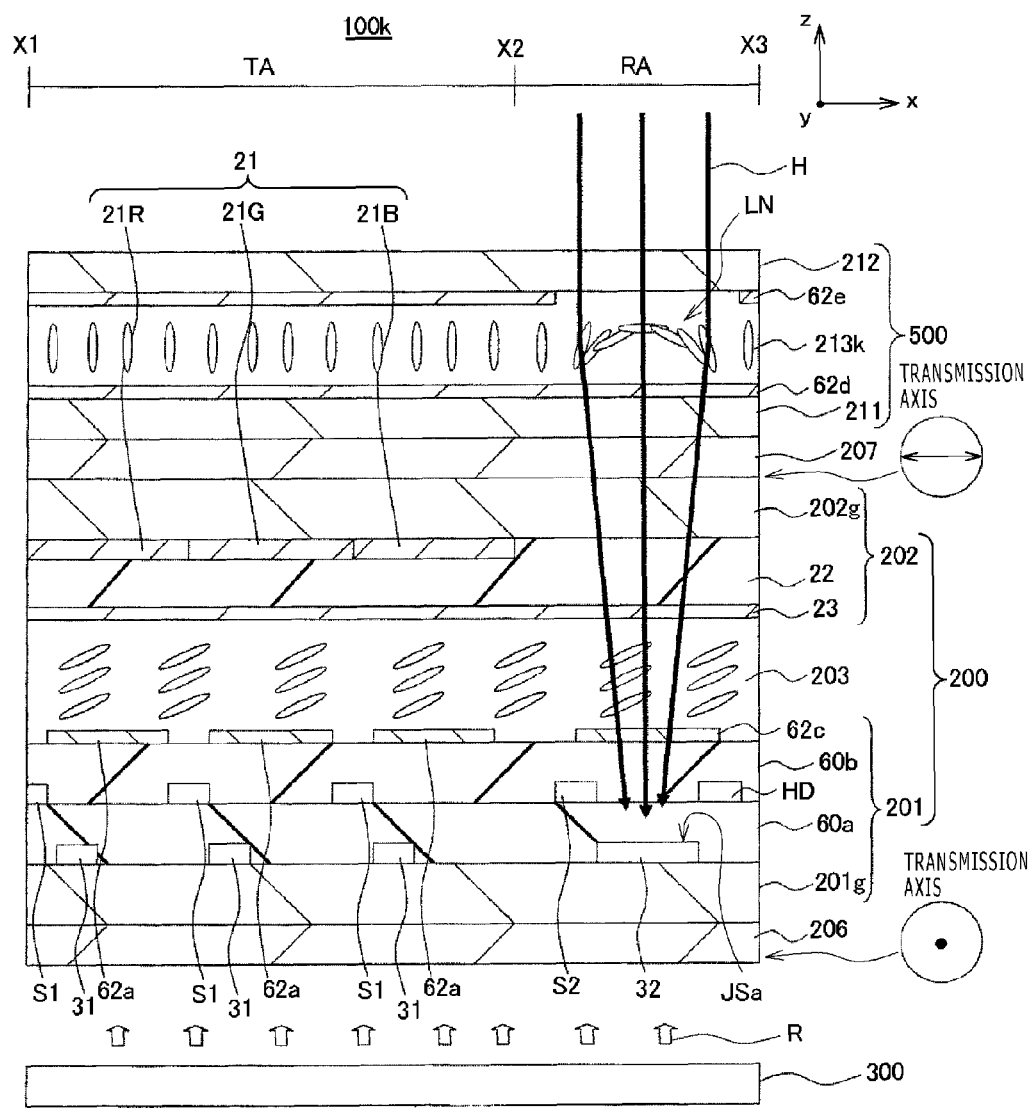
FIG. 37 is a sectional view showing essential part of the liquid crystal display apparatus in embodiment 11 in an enlarged scale.

FIG. 37 is a sectional view showing essential part of the liquid crystal display apparatus 100k in to embodiment 11 in an enlarged scale. In FIG. 37, a portion corresponding to pixels P provided in the pixel region PA is shown.

As shown in FIG. 37, the liquid crystal layer 213k is different from the light amount adjustment section of embodiment 1 as shown in FIG. 37. Except this, the lens unit 500 is similar to the light amount adjustment section of the embodiment 1. Therefore, description of overlapping portions is omitted.

As shown in FIG. 37, in the lens unit 500, the liquid crystal layer 213k includes a liquid crystal lens LN whose focal length is fixed. The liquid crystal lens LN is formed, for example, by hardening of ultraviolet curing liquid crystal. Or else, the liquid crystal lens LN is formed by hardening of thermosetting liquid crystal.

Therefore, when the position of a detection object body is detected in the present embodiment, operation for adjusting the focal position of the liquid crystal lens LN as in embodiment 1 is not carried out.

As shown in FIG. 37, the liquid crystal lens LN of the fixed focus type condenses incident light H on the light receiving region JSa of the photo-sensor element 32.

Since the liquid crystal lens LN has polarized light dependency, where the direction of the refractive index difference distribution in the liquid crystal lens LN coincides with the x direction, as shown in FIG. 37, the incident light H is transmitted as polarized light, which is oscillating in the x direction, to the second polarizing plate 207.

As shown in FIG. 37, the second polarizing plate 207 is disposed such that the transmission axis runs along the x direction. Therefore, in the present embodiment, the incident light H can be condensed on the light receiving region JSa of the photo-sensor element 32 as described hereinabove.

And, the incident light H condensed on the photo-sensor element 32 from the front face side of the liquid crystal panel 200 is received by the photo-sensor element 32 at the light receiving region JSa and photo-electrically converted to generate reception light data as described hereinabove.

Figure 38:
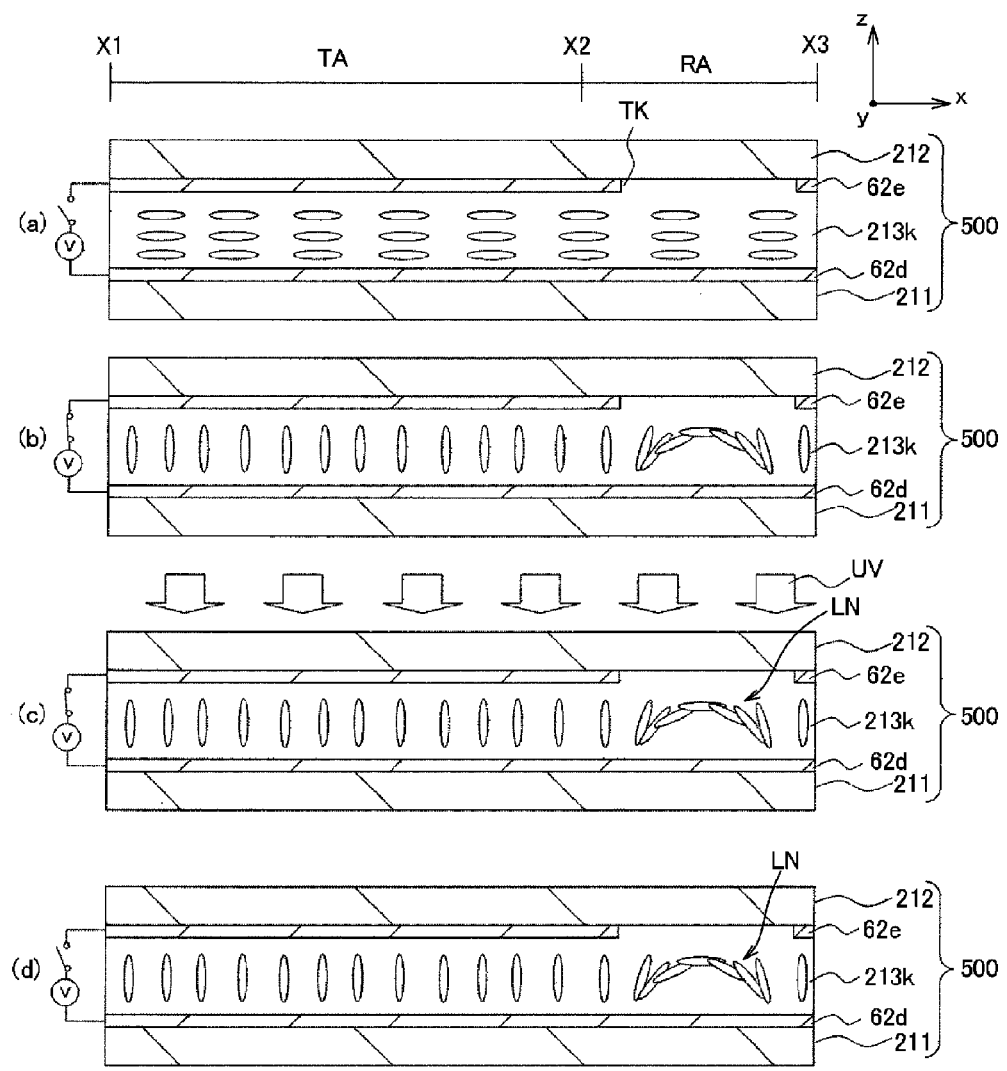
FIG. 38 is views illustrating a procedure of fabricating a lens unit in embodiment 11.

FIG. 38 is views illustrating a procedure of fabricating the lens unit 500 in embodiment 11.

First, a first transparent electrode 62d is formed on one of faces of a first glass substrate 211 as shown in (a) of FIG. 38. Here, the first transparent electrode 62d is formed in such a manner as to cover all over the overall area of one of the faces of the first glass substrate 211.

Further, a second transparent electrode 62e is formed on one of faces of a second glass substrate 212 as shown in (a) of FIG. 38. Here, after the second transparent electrode 62e is formed in such a manner as to cover all over the overall area of one of the faces of the second glass substrate 212, an opening TK is provided as shown in FIG. 7 in embodiment 1.

And, the first glass substrate 211 and the second glass substrate 212 are pasted in an opposing relationship to each other such that the first transparent electrode 62d and the second transparent electrode 62e are opposed in a spaced relationship from each other as shown in (a) of FIG. 38. Here, on the faces of the first glass substrate 211 and the second glass substrate 212 which oppose to each other, a liquid crystal orientation film (not shown) is provided, and then, the outer periphery is sealed to paste them to each other.

Thereafter, liquid crystal material is encapsulated between the first glass substrate 211 and the second glass substrate 212 to provide a liquid crystal layer 213k as shown in (a) of FIG. 38. For example, nematic liquid crystal material ($\Delta n=0.11$, $\lambda=589$ nm) of the ultraviolet curing type is encapsulated. Consequently, the liquid crystal layer 213k is oriented horizontally such that the major axis direction of the liquid crystal molecules coincide with the direction of the faces at which the first glass substrate 211 and the liquid crystal layer 213 are opposed to each other.

Then, a voltage is applied between the first transparent electrode 62d and the second transparent electrode 62e to vary the orientation direction of the liquid crystal molecules of the liquid crystal layer 213k as shown in (b) of FIG. 38. Here, the liquid crystal molecules are oriented in a bow shape as shown in (b) of FIG. 38. At this time, also ultraviolet curing monomer (RM82) compounded in the liquid crystal is oriented similarly to the liquid crystal molecules.

Then, while the state in which a voltage is applied between the first transparent electrode 62d and the second transparent electrode 62e is maintained, ultraviolet rays UV are irradiated upon the liquid crystal layer 213k as illustrated in (c) of FIG. 38. Consequently, since the ultraviolet curing monomer dispersed in the liquid crystal is polymerized, the liquid crystal molecules are hardened in the state in which they are oriented in a bow shape thereby to form a liquid crystal lens LN of the fixed focus type.

Then, the voltage application between the first transparent electrode 62d and the second transparent electrode 62e is stopped as illustrated in (d) of FIG. 38. Also in this state, since the liquid crystal layer 213k is in a hardened state, the liquid crystal molecules are maintained in the state in which they are oriented in a bow shape.

(B) Summary

As described above, in the present embodiment, the liquid crystal lens LN which is a refractive index distribution type lens which does not utilize refraction at the surface is used to condense incident light H on the light receiving region JSa of the photo-sensor element 32. Where a lens such as a spherical lens which utilizes refraction at the surface is used, incident light is sometimes reflected regularly at the surface of the lens to decrease the visibility. However, in the present embodiment, since a liquid crystal lens whose surface is flat is used, appearance of this failure can be suppressed. Further, since the liquid crystal lens has polarization dependency, it does not have a bad influence on display light which is polarized light, and deterioration of the image quality on the liquid crystal panel can be prevented.

Further, since, in the present embodiment, the liquid crystal lens LN is of the fixed focus type, the power consumption can be reduced in comparison with that of the variable focus type, and the shape of the module can be simplified.

<12. Others>

(A) The Size of the Lens

While, in the embodiments described hereinabove, a liquid crystal lens is formed in the sensor region RA, the embodiments are not limited to this. For example, the second transparent electrode 62e_2 described hereinabove with reference to FIG. 12 may be formed not only in the sensor region RA but also in the display region TA extensively. In this instance, it is possible to carry out image pickup and display time-divisionally to carry out condensation of light more efficiently thereby to condense a greater amount of light on the light receiving region JSa. Therefore, image pickup can be carried out at a high S/N ratio.

Further, while, in the present embodiments described above, image pickup and display are carried out time-divisionally, the present invention is not limited to this. The embodiments can be applied also where they are carried out at the same time.

(B) On the Case in Which Infrared Rays or the Like are Received

While, in the embodiments described hereinabove, the backlight irradiates visible rays as illumination light, the embodiments are not limited to this. For example, illumination light may be irradiated in such a manner as to include invisible rays such as infrared rays. And, a configuration wherein reflected light when infrared rays are reflected by a detection object body is received by the photo-sensor element 32 to generate reception light data may be used. In this instance, even in a case in which black display is carried out in the pixel region, since infrared rays can be introduced to the photo-sensor element, position detection can be carried out further suitably. Further, since the influence of external light decreases, the S/N ratio of the reception light data can be improved, and position detection can be carried out suitably.

Figure 39:
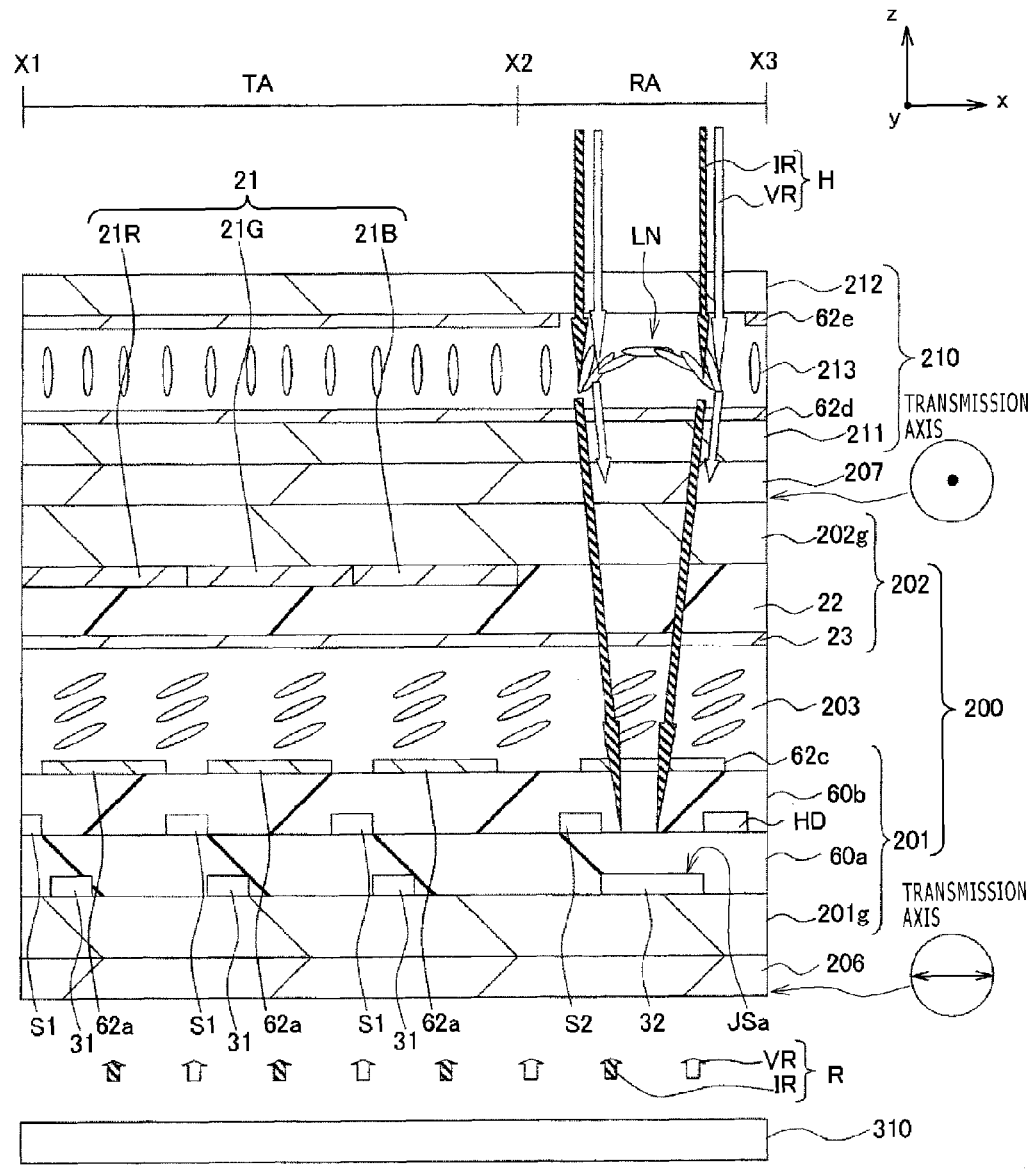
FIG. 39 is a view showing essential part where reflection light when infrared rays are reflected is received by a photosensor element in the embodiments.
Figure 40:
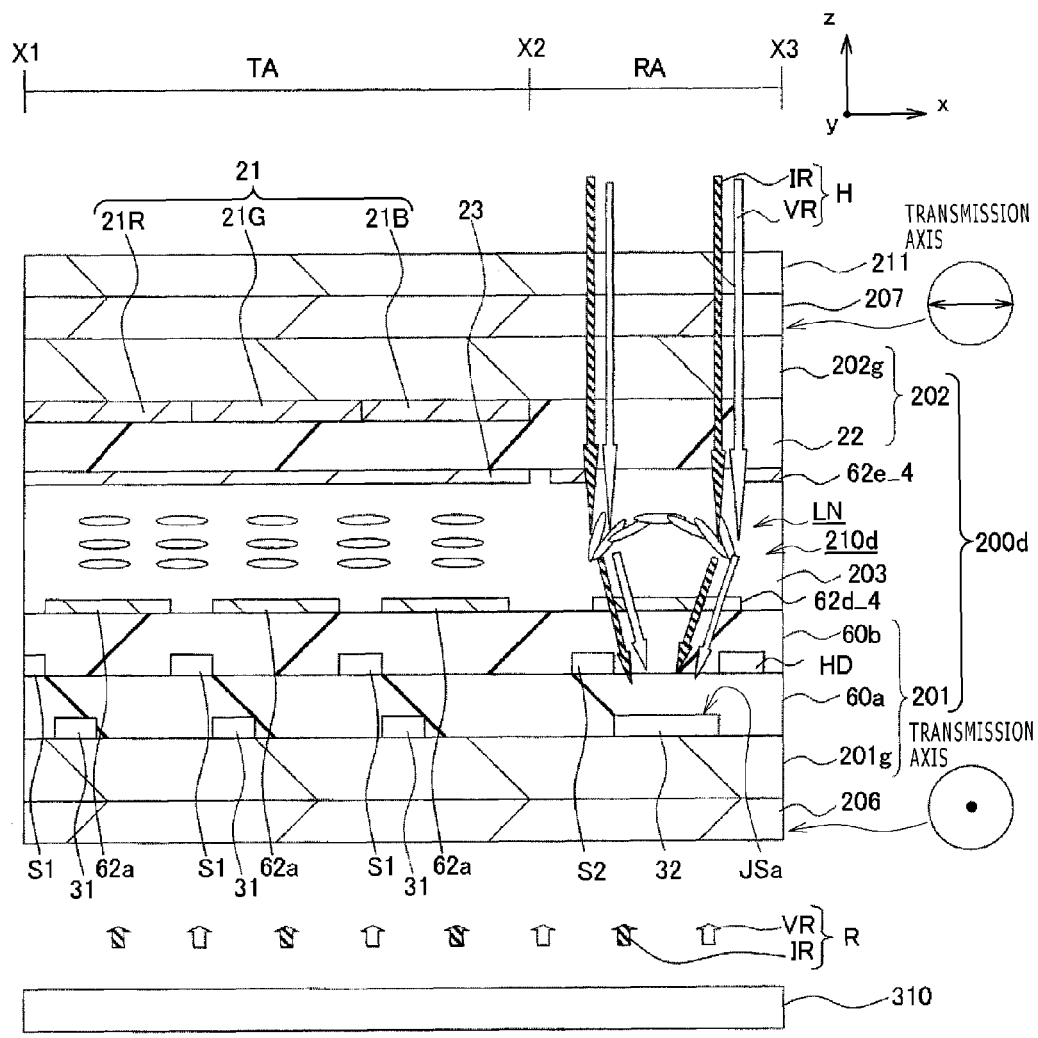
FIG. 40 is a view showing essential part where reflection light when infrared rays are reflected is received by a photosensor element in the embodiments.

FIGS. 39 and 40 are views illustrating manners in which reflected light including infrared rays is received by the photo-sensor element 32 in the embodiments.

Here, FIG. 39 is a sectional view illustrating a case in which a liquid crystal lens LN is externally provided for a liquid crystal panel 200 as in the embodiment 1 and so forth. Meanwhile, FIG. 40 is a sectional view illustrating a case in which a liquid crystal lens LN is built in a liquid crystal panel 200d as in the embodiment 4 and so forth.

As shown in FIGS. 39 and 40, a backlight 310 irradiates illumination light R, which includes an infrared ray IR together with a visible ray VR, upon the rear face of the liquid crystal panel 200 or 200d. Though not shown, the backlight 310 includes both of a visible light source (not shown) and an infrared ray source (not shown) as light sources. For example, the backlight 310 includes a white LED as a visible light source and irradiates a visible ray VR which is white light. Further, the backlight 310 includes, for example, an infrared LED as an infrared ray source and irradiates an infrared ray IR. For example, the backlight 310 irradiates an infrared ray IR whose center wavelength is 850 nm.

And, the visible ray VR and the infrared ray IR irradiated from the individual light sources are diffused by a light guide plate which configures the backlight 310 so that it is irradiated as planar light upon the rear face of the liquid crystal panel 200 or 200d and then is transmitted to the upper face side.

Thereafter, the visible ray VR and the infrared ray IR are reflected by a detection object body (not shown) positioned in the proximity of the upper face of the liquid crystal panel 200 or 200d as shown FIG. 39 or 40. Then, the reflected light is introduced as incident light H to the upper face of the liquid crystal panel 200 or 200d. This incident light H enters as randomly polarized light.

Where the liquid crystal lens LN is externally provided for the liquid crystal panel 200 as shown in FIG. 39, different from the case of the embodiment 1, it is preferable to dispose the second polarizing plate 207 such that the transmission axis of the second polarizing plate 207 runs along the y direction. In other words, it is preferable to dispose the second polarizing plate 207 such that the transmission axis thereof runs along the y direction perpendicular to the x direction which is the direction of the refractive index distribution of the liquid crystal lens LN provided in the light amount adjustment section 210. Also where the liquid crystal lens LN is of the fixed focus type, it is preferable to dispose the second polarizing plate 207 in such a manner as described above. And, the first polarizing plate 206 is disposed such that the transmission axis thereof runs in the x direction as illustrated in FIG. 39.

In this instance, the incident light H is condensed on the light receiving region JSa of the photo-sensor element 32 by the liquid crystal lens LN as illustrated in FIG. 39.

Here, as illustrated in FIG. 39, the infrared ray IR of the condensed incident light H is transmitted through the second polarizing plate 207 and enters the light receiving region JSa of the photo-sensor element 32. This is because a polarizing plate generally has a property of transmitting light on the longer wavelength side with respect to near infrared rays therethrough without absorbing the same.

Meanwhile, the visible ray VR of the condensed incident light H is absorbed much and blocked by the second polarizing plate 207.

Therefore, since infrared rays can selectively enter the light receiving region JSa of the photo-sensor element 32, position detection can be carried out more suitably. Further, since the influence of external light decreases as described hereinabove, the SN ratio of reception light data can be improved and position detection can be carried out suitably.

Further, by utilizing such a property of the polarizing plate as described above, reception light data can be obtained with a high sensitivity through condensation of infrared rays by means of a liquid crystal lens of a greater area without having an influence on visible rays for display.

In contrast, where the liquid crystal lens LN is built in the liquid crystal panel 200d as shown in FIG. 40, the second polarizing plate 207 is disposed such that the transmission axis of the second polarizing plate 207 runs along the x direction similarly as in the case of the embodiment 1. And, the first polarizing plate 206 is disposed such that the transmission axis thereof runs along the y direction as shown in FIG. 40.

In this instance, each of the visible ray VR and the infrared ray IR included in the incident light H is transmitted through the second polarizing plate 207 and enters the liquid crystal lens LN as illustrated in FIG. 40. Here, the visible ray VR is transmitted as polarized light through the second polarizing plate 207 and enters the liquid crystal lens LN.

Then, each of the visible ray VR and the infrared ray IR included in the incident light H is condensed on the light receiving region JSa of the photo-sensor element 32 by the liquid crystal lens LN.

Though not shown, where the liquid crystal lens LN is built in the liquid crystal panel 200d, different from the case of the embodiment 1, the second polarizing plate 207 may be disposed such that the transmission axis thereof runs in the y direction. And, in this instance, the first polarizing plate 206 is disposed such that the transmission axis thereof runs along the x direction.

In this instance, since the visible ray VR transmitted as polarized light through the second polarizing plate 207 has the polarization direction different from the direction of the refractive index difference distribution of the liquid crystal lens LN, it enters the light receiving region JSa of the photo-sensor element 32 without being condensed by the liquid crystal lens LN. And, since the infrared ray IR transmitted through the second polarizing plate 207 includes a component in the direction of the refractive index distribution of the liquid crystal lens LN, it is condensed by the liquid crystal lens LN and enters the light receiving region JSa of the photo-sensor element 32.

Therefore, also where the liquid crystal lens LN is built in the liquid crystal panel 200d, the effect described hereinabove can be achieved.

(D) On the Pixel Switching Element

While, in the embodiments described hereinabove, the pixel switching element 31 is formed as a thin film transistor of the bottom gate type, the present invention is not limited to this.

Figure 41:
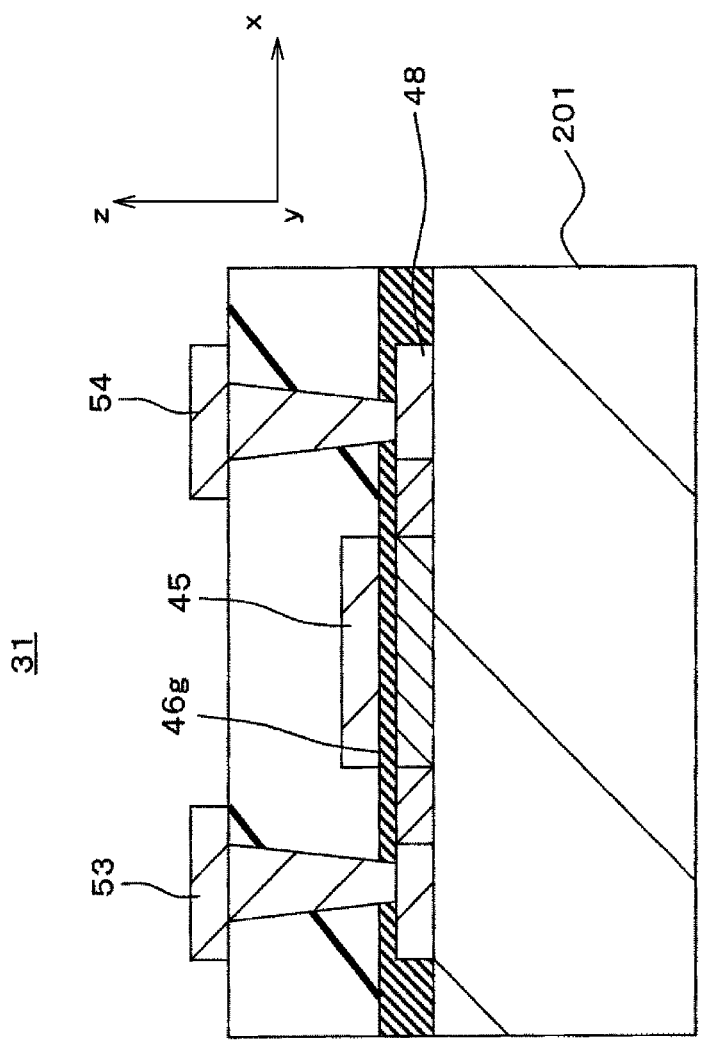
FIG. 41 is a sectional view showing a modified form of a configuration of a pixel switching element in the embodiments.

FIG. 41 is a sectional view showing a modification to the configuration of the pixel switching element 31 in the embodiments according to the present invention.

As shown in FIG. 41, for example, a TFT of the top gate type may be formed as the pixel switching element 31. Or, the pixel switching element 31 may be formed such that it has a dual gate structure.

(E) On the Configuration of the Photo-Sensor Element

While, in the embodiments described hereinabove, a plurality of photo-sensor elements 32 are provided in a corresponding relationship to a plurality of pixels P, the present invention is not limited to this. For example, one photo-sensor element 32 may be provided for a plurality of pixels P, or conversely a plurality of photo-sensor elements 32 may be provided for one pixel P.

Further, while, in the present embodiments, the photo-sensor element 32 includes a photo-diode of the PIN type, the embodiments are not limited to this. For example, even if a photo-diode of a structure wherein an impurity is doped in an i layer is formed as the photo-sensor element 32, similar effects can be achieved. Further, a photo-transistor may be provided as the photo-sensor element 32.

(F) Others

Further, the present invention can be applied to liquid crystal panels of various types such as the IPS (In-Plane-Switching) type and the FFS (Field Fringe Switching) method. Furthermore, the present invention can be applied also to other display apparatus such an organic EL display element or electronic paper.

Further, adjustment of the amount of light to the photo-sensor element 32 is not limited to the case in which, based on reception light data obtained in advance by the photo-sensor element 32, the focal position of the lens is varied. For example, a configuration may be adopted wherein, in the image pickup mode, where an image of an article spaced by a certain fixed distance is picked up, the focal position of the lens is adjusted to the fixed focal length for the position.

Further, a configuration may be used wherein, in the image pickup mode, the focal position of the lens is varied based on the reception light data to adjust the focal length like automatic focusing of a camera.

Further, the photo-sensor element 32 may be provided in a region other than the pixel region in which image display is carried out. For example, the photo-sensor elements 32 may be disposed like in arrangement like a picture frame around the pixel region while the lenses which configure the light amount adjustment section 210 are provided in such a manner as to correspond to the photo-sensor elements 32.

Further, the liquid crystal display apparatus 100 and so forth of the present embodiments can be applied as parts of various electronic apparatus.

FIGS. 42 to 46 are views showing electronic apparatus to which the liquid crystal display apparatus 100 of the embodiment according to the present invention is applied.

Figure 42:
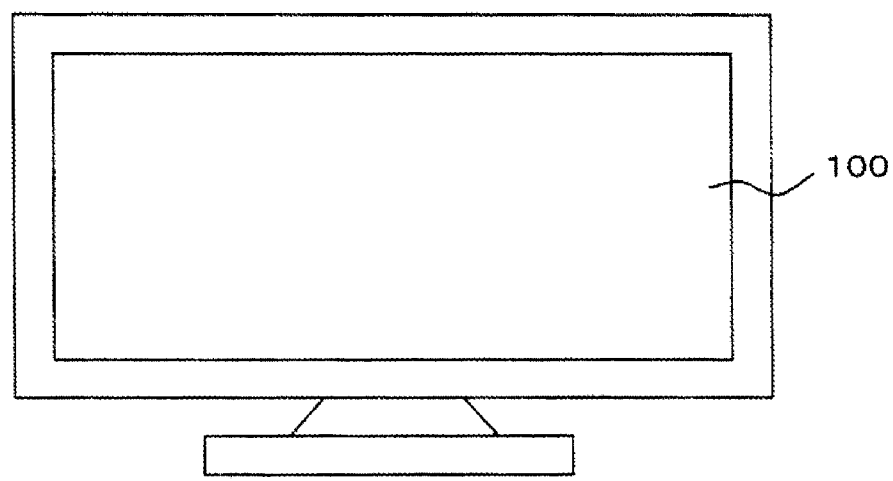
FIG. 42 is a view showing an electronic apparatus to which the liquid crystal display apparatus of any of the embodiments.

As shown in FIG. 42, the liquid crystal display apparatus 100 can be applied as a display apparatus of a television receiver for receiving and displaying a television broadcast which displays the received image on a display screen and to which an operation instruction of an operator is inputted.

Figure 43:
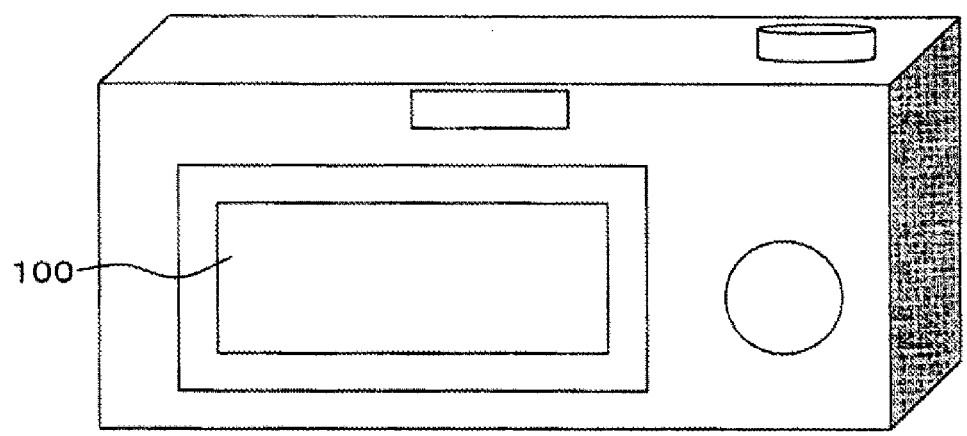
FIG. 43 is a view showing another electronic apparatus to which the liquid crystal display apparatus of any of the embodiments is applied.

Further, as shown in FIG. 43, the liquid crystal display apparatus 100 can be applied as a display apparatus of a digital still camera which displays an image such as a picked up image on a display screen thereof and to which an operation instruction of an operator is inputted.

Figure 44:
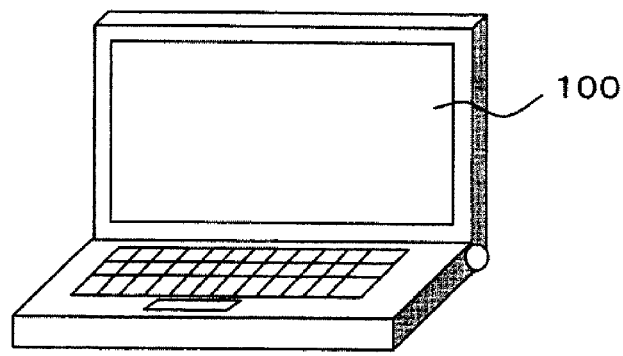
FIG. 44 is a view showing a further electronic apparatus to which the liquid crystal display apparatus of any of the embodiments is applied.

Further, as shown in FIG. 44, the liquid crystal display apparatus 100 can be applied as a display apparatus of a notebook type personal computer which displays an operation image or a like image on a display screen thereof and to which an operation instruction of an operator is inputted.

Figure 45:
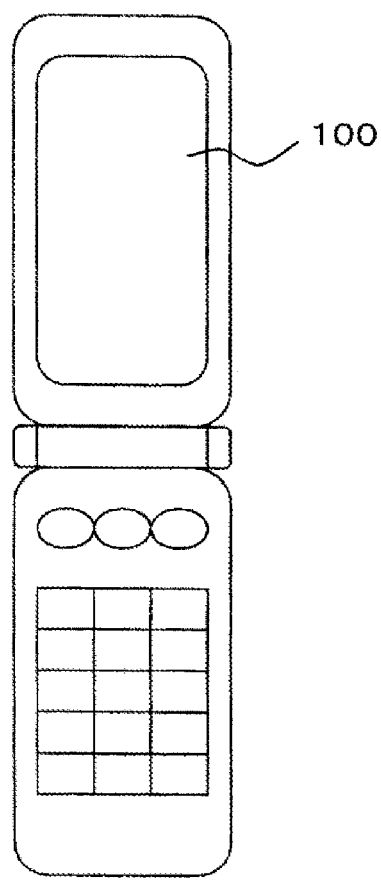
FIG. 45 is a view showing a still further electronic apparatus to which the liquid crystal display apparatus of any of the embodiments is applied.

Further, as shown in FIG. 45, the liquid crystal display apparatus 100 can be applied as a display apparatus of a portable telephone set which displays an operation image or a like image on a display screen thereof and to which an operation instruction of an operator is inputted.

Figure 46:
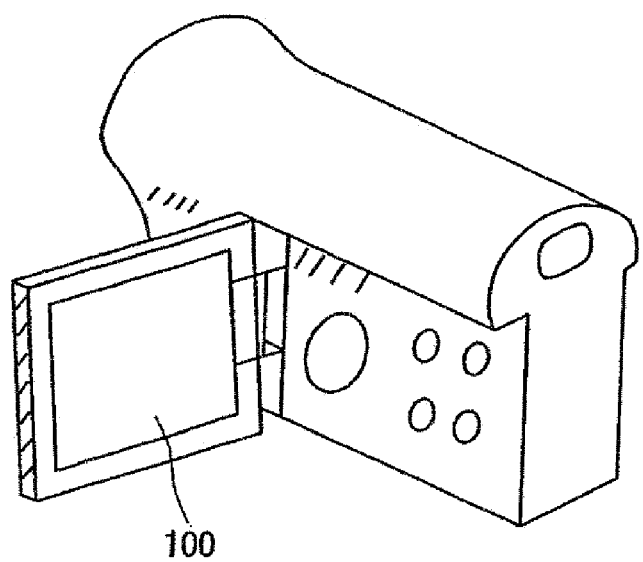
FIG. 46 is a view showing a yet further electronic apparatus to which the liquid crystal display apparatus of any of the embodiments is applied.

Further, as shown in FIG. 46, the liquid crystal display apparatus 100 can be applied as a display apparatus of a video camera which displays an operation image or a like image on a display screen thereof and to which an operation instruction of an operator is inputted.

It is to be noted that, in the embodiments described hereinabove, the liquid crystal display apparatus 100 and 100*b* to 100*k* are merely examples of the display apparatus. Further, in the embodiments described, the liquid crystal panel 200 and 200*d* to 200*j* are merely examples of the display panel or the liquid crystal panel. Further, in the embodiments described, the TFT array substrate 201 is merely an example of the first substrate. Further, in the embodiments described, the opposing substrate 202 is merely an example of the second substrate. Further, in the embodiments described, the liquid crystal layer 203 is merely an example of the liquid crystal layer. Further, in the embodiments described, the light blocking wall 203S is merely an example of the light blocking wall. Further, in the embodiments described, the light amount adjustment section 210 is merely an example of the light amount adjustment section. Further, in the embodiments described above, the position detection section 402 is merely an example of the position detection section. Further, in the embodiments described above, the photo-sensor element 32 is merely an example of the photo-sensor element. Further, in the embodiments described above, the light receiving region JSa is merely an example of the light receiving region. Further, in the embodiments described above, the pixel region PA is merely an example of the pixel region.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A display apparatus comprising:
a display panel including a photo-sensor element having a light receiving region for receiving light to generate reception light data;
a light amount adjustment section adapted to adjust the amount of light to be introduced to the light receiving region of said photo-sensor element; and
a control section adapted to control operation of said light amount adjustment section, wherein
the light amount adjustment section includes a lens provided corresponding to the light receiving region of said photo-sensor element and said light amount adjustment section varies the focus position of said lens with respect to the light receiving region of said photo-sensor element to adjust the amount of light to be introduced to said light receiving region.

2. The display apparatus according to claim 1, wherein said control section controls the operation of said light amount adjustment section based on the reception light data generated by said photo-sensor element.

3. The display apparatus according to claim 2, wherein said lens is greater than the light receiving region.

4. The display apparatus according to claim 3, wherein said lens of said light amount adjustment section is a liquid crystal lens, and said light amount adjustment section applies a voltage to liquid crystal which configures said liquid crystal lens to vary the orientation direction of liquid crystal molecules of the liquid crystal to vary the focal length of said liquid crystal lens to adjust the amount of light to be introduced to said photo-sensor element.

5. The display apparatus according to claim 4, wherein the liquid crystal lens is a Fresnel lens.

6. The display apparatus according to claim 4, wherein the display panel includes:
a first substrate;
a second substrate opposed in a spaced relationship from said first substrate; and
a liquid crystal layer sandwiched between said first substrate and said second substrate and oriented at the liquid crystal molecules thereof, wherein the photo-sensor element is provided on a face of said first substrate on the side opposing to said second substrate, the liquid crystal lens is provided at a portion, which corresponds to the light receiving region, of a face of said second substrate on the opposite side to the side opposing to said first substrate, and the light amount adjustment section varies the focal length of said liquid crystal lens to adjust the amount of light to be introduced to the light receiving region of said photo-sensor element from the side of said first substrate toward the side of said second substrate.

7. The display apparatus according to claim 6, further having a polarizing plate disposed on a face of said second substrate on the side opposite to the side opposing to said first substrate, wherein the polarizing plate is provided such that a transmission axis thereof runs in a direction of a refractive index difference distribution of said liquid crystal lens, and the photo-sensor element receives incident light including a visible ray at the light receiving region thereof to generate the reception light data.

8. The display apparatus according to claim 4, wherein the display panel includes:

a first substrate;

a second substrate opposed in a spaced relationship from said first substrate; and a liquid crystal layer sandwiched between said first substrate and said second substrate and oriented at the liquid crystal molecules thereof, wherein the photo-sensor element is provided on a face of said first substrate on the side opposing to said second substrate, the liquid crystal lens is configured such that a focal length thereof varies in response to a voltage applied to the liquid crystal at a portion of said liquid crystal layer corresponding to the light receiving region, and the light amount adjustment section varies the focal length of said liquid crystal lens to adjust the amount of light to be introduced to the light receiving region of said photo-sensor element from the side of said first substrate toward the side of said second substrate.

9. The display apparatus according to claim 8, further having a polarizing plate disposed on a face of said second substrate on the side opposite to the side opposing to said first substrate, wherein the polarizing plate is provided such that a transmission axis thereof runs in a direction of a refractive index difference distribution of said liquid crystal lens, and the photo-sensor element receiving incident light including a visible ray at the light receiving region thereof to generate the reception light data.

10. The display apparatus according to claim 8, wherein the display panel has a light blocking wall provided in such a manner as to surround portions of said first substrate and said second substrate corresponding to the light receiving region.

11. The display apparatus according to claim 3, wherein the lens of said light amount adjustment section is a liquid lens, and said light amount adjustment section applies a voltage to said liquid lens to vary the focal length of said liquid lens to adjust the amount of light to be introduced to said photo-sensor element.

12. The display apparatus according to claim 11, wherein the display panel includes:

a first substrate;

a second substrate opposed in a spaced relationship from said first substrate; and a liquid crystal layer sandwiched between said first substrate and said second substrate and oriented at the liquid crystal molecules thereof, wherein the photo-sensor element is provided on a face of said first substrate on the side opposing to said second substrate, the liquid lens is provided at a portion, which corresponds to the light receiving region, of a face of said second substrate on the opposite side to the side opposing to said first substrate, and the light amount adjustment section varies the focal length of said liquid lens to adjust the amount of light to be introduced to the light receiving region of said photo-sensor element from the side of said first substrate toward the side of said second substrate.

13. The display apparatus according to claim 3, wherein the light amount adjustment section includes a lens moving section for moving said lens so that the focus position of said lens moves in a direction of a face of said display panel to adjust the amount of light to be introduced to said photo-sensor element.

14. The display apparatus according to claim 1, wherein the control section adjusts operation of said light amount adjustment section such that, when the reception light data generated by said photo-sensor element is higher than a reference value, the amount of light to be introduced to said photo-sensor element is reduced.

15. The display apparatus according to claim 14, further comprising a position detection section adapted to detect the position of a detection object body positioned on the side of one face of said display panel, wherein the display panel is configured such that an image is displayed on the side of the one face thereof, the photo-sensor element is configured such that a plurality of such photo-sensor elements are disposed in the pixel region of said display panel in which an image is displayed and receive light advancing from the side of the one face of said display panel toward the side of the other face, and the position detection section detects the position of the detection object body based on the reception light data generated by the plural photo-sensors disposed in the pixel region.

16. The display apparatus according to claim 15, wherein the control section controls so that image pickup operation for causing said photo-sensor elements to receive light and display operation for causing said display panel to display an image are executed time-divisionally with each other.

17. A display apparatus comprising:

a display panel on which a photo-sensor element which receives incident light at a light receiving region thereof to generate reception light data;

a polarizing plate disposed on a face of said display panel to which the incident light is introduced; and a liquid crystal lens adapted to condense the incident light on the light receiving region;

a light amount adjustment section adapted to adjust the amount of the light to be introduced to the light receiving region of the photo-sensor element, wherein the polarizing plate is disposed such that a transmission axis thereof runs in a direction of a refractive index difference distribution of said liquid crystal lens, the light amount adjustment section includes the liquid crystal lens provided corresponding to the light receiving region of the photo sensor element, and the light amount adjustment section varies the focus position of the liquid crystal lens with respect to the light receiving region of the photo-sensor element to adjust the amount of the light to be introduced to the light receiving region.

18. The display apparatus according to claim 17, wherein the display panel includes:
  a first substrate;
  a second substrate opposed in a spaced relationship from said first substrate; and
  a liquid crystal layer sandwiched between said first substrate and said second substrate and oriented at the liquid crystal molecules thereof, wherein
  the photo-sensor element is provided on a face of said first substrate on the side opposing to said second substrate,
  the liquid crystal lens is provided at a portion, which corresponds to the light receiving region, of a face of said second substrate on the opposite side to the side opposing to said first substrate, and
  incident light which is successively transmitted through said liquid crystal lens and said polarizing plate and is introduced to said photo-sensor element is received by said photo-sensor element at the light receiving region.

19. The display apparatus according to claim 18, wherein the liquid crystal lens is formed by hardening of ultraviolet curing liquid crystal or thermosetting liquid crystal and has a fixed focal length.

20. The display apparatus according to claim 17, wherein the display panel includes:
  a first substrate;
  a second substrate opposed in a spaced relationship from said first substrate; and
  a liquid crystal layer sandwiched between said first substrate and said second substrate and oriented at the liquid crystal molecules thereof, wherein
  the photo-sensor element is provided on a face of said first substrate on the side opposing to said second substrate,
  the liquid crystal lens is formed by application of a voltage to liquid crystal at a portion of said liquid crystal layer which corresponds to the light receiving region, and
  incident light which is successively transmitted through said liquid crystal lens and said polarizing plate and is introduced to said photo-sensor element is received by said photo-sensor element at the light receiving region.

* * * * *